United States Patent
Hasegawa et al.

(10) Patent No.: US 6,342,956 B1
(45) Date of Patent: Jan. 29, 2002

(54) INK JET RECORDING APPARATUS RECORDING IMAGES WHEN AN INK JET HEAD IS INSTALLED THEREON AND READING IMAGES WHEN AN IMAGE READING HEAD IS INSTALLED THEREON

(75) Inventors: Koh Hasegawa; Toshihide Wada, both of Yokohama; Shinya Asano, Tokyo, all of (JP); Tadashi Hanabusa, Irvine, CA (US); Tetsuji Kurata, Yokohama (JP); Tetsuyo Ohashi, Kamakura (JP); Toshihiko Bekki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,125

(22) Filed: Apr. 8, 1999

Related U.S. Application Data

(62) Division of application No. 08/630,538, filed on Apr. 10, 1996, now Pat. No. 6,091,514.

(30) Foreign Application Priority Data

| Apr. 11, 1995 | (JP) | ................................ 7-085774 |
| Apr. 11, 1995 | (JP) | ................................ 7-085775 |
| Apr. 11, 1995 | (JP) | ................................ 7-085776 |
| May 31, 1995 | (JP) | ................................ 7-134153 |
| May 24, 1995 | (JP) | ................................ 7-124871 |

(51) Int. Cl.$^7$ ........................... H04N 1/024; H04N 1/21
(52) U.S. Cl. ........................ 358/472; 358/296
(58) Field of Search ................ 358/472, 474, 358/401, 496, 296, 497; 347/3

(56) References Cited

U.S. PATENT DOCUMENTS

| 4,323,611 A | 4/1982 | Pöll ................. 428/67 |
| 4,525,748 A | 6/1985 | Carbone ............ 358/456 |
| 4,687,352 A | 8/1987 | Igi et al. ............ 400/73 |
| 5,208,610 A | 5/1993 | Su et al. ............ 347/49 |
| 5,264,949 A | 11/1993 | Stemmle ............ 358/474 |
| 5,352,883 A | 10/1994 | Kitani et al. ......... 250/208.1 |
| 5,373,368 A | 12/1994 | Taniquro ............ 358/296 |
| 5,428,380 A | 6/1995 | Ebisawa ............ 347/35 |
| 5,844,695 A | * 12/1998 | Suzuki ............ 358/475 |
| 5,880,852 A | * 3/1999 | Asano et al. ......... 358/296 |
| 5,936,740 A | * 8/1999 | Fukazawa et al. ...... 358/296 |
| 5,987,186 A | * 11/1999 | Oida et al. .......... 382/274 |
| 6,091,514 A | * 7/2000 | Hasegawa et al. ...... 358/296 |
| 6,114,837 A | * 9/2000 | Nakanishi ........... 320/136 |
| 6,191,873 B1 | * 2/2001 | Mizoguchi et al. ..... 358/516 |

FOREIGN PATENT DOCUMENTS

| EP | 0 641 114 | 3/1995 |
| EP | 0 641 115 | 3/1995 |
| EP | 0 692 904 | 1/1996 |
| GB | 1 431 234 | 4/1976 |
| JP | 59-99860 | 6/1984 |
| JP | 2-21711 | 5/1990 |
| JP | 2-21712 | 5/1990 |

\* cited by examiner

*Primary Examiner*—Cheukfan Lee
(74) *Attorney, Agent, or Firm*—Fitzpatrick, Cella, Harper & Scinto

(57) ABSTRACT

An ink jet recording apparatus is provided with a recording function to record images on a sheet material by installing an ink jet recording head that discharges ink from the ink discharge ports, and also, with an image reading function to read images from a sheet material by installing an image reading head exchangeably. This apparatus includes the discharge port surface of the ink jet recording head having the ink discharge ports formed on it, the image reading surface of the image reading head to read images to this head from the image reading surface, and a member that abuts upon the ink discharge port surface arranged to be in contact with the ink discharge port surface of the ink jet recording head. This member is arranged so as not to be in contact with the image reading surface of the image reading head. Thus the image reading surface of the image reading head is prevented from being stained by ink. Also, this apparatus can be made smaller with a simple structure to provide both reading and recording functions.

7 Claims, 40 Drawing Sheets

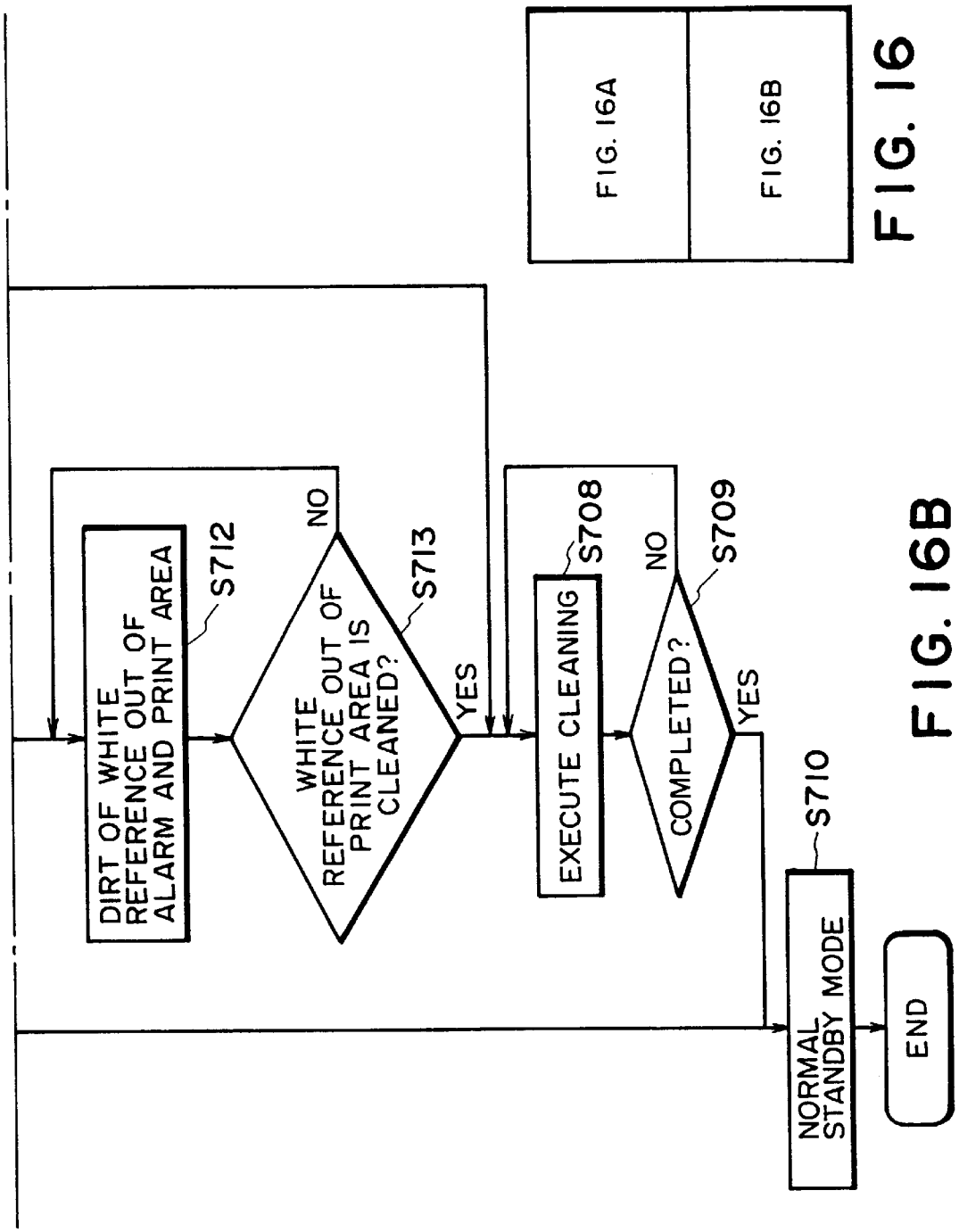

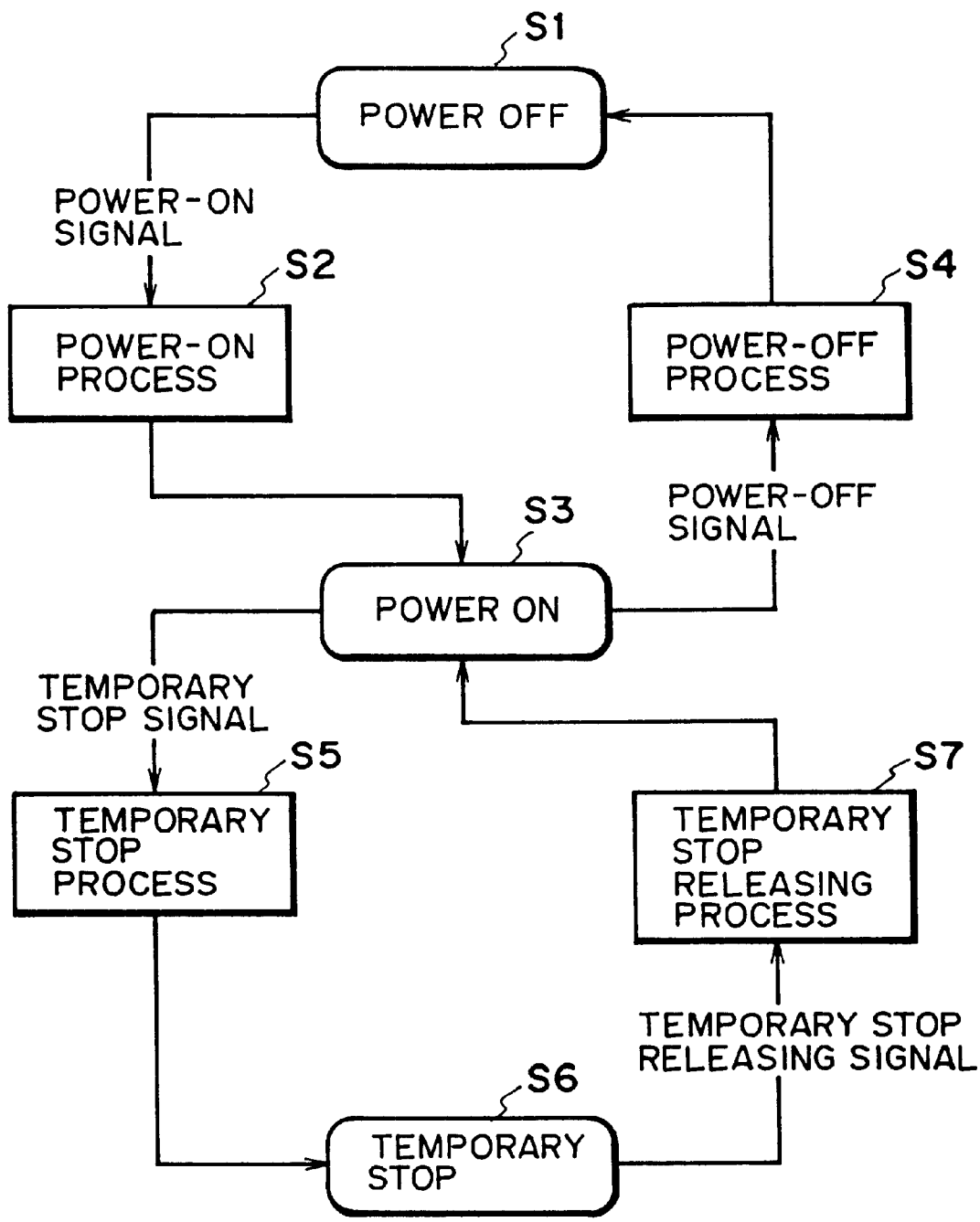
F I G. 32

INK JET RECORDING APPARATUS RECORDING IMAGES WHEN AN INK JET HEAD IS INSTALLED THEREON AND READING IMAGES WHEN AN IMAGE READING HEAD IS INSTALLED THEREON

This is a divisional application of U.S. patent application Ser. No. 08/630,538 filed Apr. 10, 1996 U.S. Pat. No. 6,091,514.

BACKGROUND OF THE INVENTION

1. Field of the Invention

The present invention relates to an ink jet recording apparatus. More particularly, the invention relates to an ink jet recording apparatus capable of reading images, having an installation unit for installing an image reading head.

2. Related Background Art

Conventional printers are generally of such a type as to receive data from a computer and record data on a recording sheet in accordance with the contents of the data thus received. In recent years, however, there have been made available those printers provided not only with a printing function, but also with the function to read image data recorded on a recording sheet, such as are used for copying machine and facsimile equipment, among others. Complex type printers, which are capable of recording and reading, are increasingly in demand.

To meet with such demands, there have been proposed printers in which the image reading function is added to the recording function (as disclosed in the specifications of Japanese Patent Publication No. 1-20832, Japanese Patent Publication No. 2-21711, Japanese Patent Publication No. 2-21712, for example).

In any one of these publications, it is intended to make those functions possible by exchanging the head units for reading and recording, while sharing the sheet feeding system for both uses.

Meanwhile, as recording methods of a printer, the ink jet method takes the lead currently over the dot-impact, thermal transfer, electronic photography, and other methods. An ink jet printer is one that discharges liquid ink from the recording head to record on a recording sheet. The carriage having a recording head and an ink tank or an ink supply mechanism, such as ink supply tube, installed on it, is caused to travel in the scanning direction for recording on the sheet.

For an ink jet printer, a cap is provided to prevent the recording head from drying out, and also, to close the nozzle surface of the head in an air-tight manner so as to avoid any ink leakage from the recording head when recording does not occur. Here, in this respect, if dust particles clog the nozzles of the recording head or air enters them, defective recording may ensue. In order to recover them under such conditions, the aforesaid cap is provided with a recovery mechanism having a pump to suck ink by arranging a conductive connection between the pump and the cap.

FIG. 46 shows one structural example of the information processing apparatus provided with the conventional ink jet recording apparatus described above.

The printer unit 401 (recording apparatus) of the information processing apparatus 400 shown in FIG. 46 comprises an aperture 406a for use in cleaning the white reference; an aperture 406b for use in the exchanging operation; and an aperture 406c for use in jamming disposition. However, there is a trend to make the recording apparatus, serving as the printer unit 401 or the information processing apparatus and others using such recording apparatus smaller. The need for its portable use is increasing, making it necessary to provide a housing that provides a higher rigidity so that the apparatus withstands being carried around.

Also, for an ink jet printer of this kind, it is necessary to discharge ink from the ink discharge ports as a liquid. Therefore, the circumference of the recording head (ink jet recording head) tends to be wet due to the ink. It is inevitable that the circumference of the cap becomes wet when capping is conducted to cover the ink discharge ports of the recording head. Also, the fine droplets created separately from the discharged ink liquid or finely spreading droplets created when the ink liquid impacts upon a recording medium, that is, the so-called ink mist, tend to float in the space in the apparatus. Such ink mist often occurs in a larger quantity in the case of a color recording where plural kinds of color ink liquid are impacted one after another; where highly precise recording occurs in which fine ink droplets are impacted in high density; where high speed recording occurs in which the ink discharge is greater per hour; and where recording occurs by means of a small printer whose interior space is small accordingly.

When an image reading head, serving as functional elements to read images, is installed on a carriage or the like for an ink jet printer of the kind, it is found that the influence of ink as described above produces an adverse effect on the performance of the reading head. In other words, a problem is encountered that the quality of reading performance is lowered due to ink adhesion to the reading head and the member providing the white reference for color correction.

Also, it is found that particularly when a printer of a serial scanning type is employed, the unstable speed before the carrier (carriage) arrives at a constant speed produces an adverse effect on recording images or reading them for recording or reading images of the scanner (reading head) immediately after the carrier is caused to start traveling for recording or reading the images provided by a scanner. If any uneven component, especially resulting from such unstable speed, is included in the images read out by the scanner, there is encountered a problem that the quality of recorded images is conspicuously degraded by the presence of such an uneven component that may be combined with the further unevenness occurring at the time of recording.

SUMMARY OF THE INVENTION

With a view to solving the problems described above, it is an object of the present invention to provide an ink jet recording apparatus capable of sufficiently performing the image reading function of the image reading head when an ink jet recording apparatus is used with an image reading head installed on it.

It is a further object of the present invention to provide an ink jet recording apparatus having a recording function to record images on sheet material when an ink jet recording head discharging ink from ink discharge ports is installed thereon, and an image reading function to read images from a sheet material when an image reading head is installed thereon. The ink jet recording head includes a discharge port surface having the ink discharge ports formed thereon. The image reading head includes an image reading surface for reading images. The apparatus comprises a member abutting upon and arranged to be in contact with the ink discharge port surface of the ink jet recording head when the ink jet recording head is installed. The member is also arranged so as not to be in contact with the image reading surface of the image reading head when the image reading head is installed.

In addition, according to another aspect of the present invention, the apparatus comprises a carriage capable of mounting the ink jet recording head and the image reading head, a head contacting member provided opposed to the carriage in a moving area of the carriage, an image reading head positioning mechanism for positioning the image reading head on the carriage when the image reading head is installed on the ink jet recording apparatus. The mechanism positions and mounts the image reading surface of the image reading head at a position out of contact with the head contacting member. Also provided is a recording head positioning mechanism for positioning the ink jet recording head on the carriage when the ink jet recording head is installed on the ink jet recording apparatus. The recording head positioning mechanism positions and mounts the recording head discharge port surface at a position contactable by the head contacting member.

It is another object of the invention to provide an ink jet recording apparatus capable of preventing the reading quality of the image reading head from being degraded due to ink adhesion to the head and the white reference member when the image reading head is installed on an ink jet recording apparatus.

It is still another object of the invention to provide an ink jet recording apparatus capable of preventing ink from adhering to the image reading head from the member that abuts upon the ink jet recording head when the image reading head is installed on an ink jet recording apparatus.

It is a further object of the invention to provide an ink jet recording apparatus capable of preventing ink from adhering to the image reading head from the member that recovers ink discharged by the ink jet recording head when the image reading head is installed on an ink jet recording apparatus.

It is still a further object of the invention to provide an ink jet recording apparatus capable of preventing the reading quality of the image reading head from being degraded due to the adhesion of ink mist created in the apparatus to the white reference member when the image reading head is installed on an ink jet recording apparatus.

It is another object of the invention to provide an ink jet recording apparatus capable of easily cleaning off the ink mist in the apparatus that adheres to the white reference member, and also, preventing the rigidity of the housing of the apparatus from being lowered when the image reading head is installed on an ink jet recording apparatus.

It is still another object of the invention to provide an ink jet recording apparatus having a recording function to record images on a sheet material by installing on it the ink jet recording head that discharges ink from the ink discharge ports, and an image reading function to read images from a sheet material by installing the image reading head on the ink jet recording apparatus, including the following:

the discharge port surface of the ink jet recording head where the ink discharge ports are formed;

the image reading surface of the image reading head where images are read out to the image reading head; and a member abutting upon the ink discharge port surface arranged to be in contact with the ink discharge port surface of the ink jet recording head, this member abutting upon the ink discharge port surface being arranged so as not to be in contact with the image reading surface of the image reading head.

It is a further object of the invention to provide an ink jet recording apparatus of a serial type having a carrier capable of installing a recording head cartridge or a scanner head whose configuration is substantially the same as the recording head cartridge, being caused to scan in a direction orthogonal to the feeding direction of a sheet and in parallel to one face of such sheet, wherein the distance from one face of the sheet to the reading face of the scanner head is larger than the distance from one face of such sheet to the discharge port surface of the recording head cartridge.

It is still a further object of the invention to provide an ink jet recording apparatus of a serial type provided with a carrier detachably installing a recording head cartridge and a scanner head to cause them to travel selectively for recording on a recording medium when the recording head cartridge is installed, and reading a source document being fed in the same sheet path as the aforesaid recording medium when the scanner head is installed, wherein the gap between a source document and the closest part of the scanner head to the source document is larger than the gap between a recording medium and the closest part of the recording head cartridge to the recording medium.

It is another object of the invention to provide an ink jet recording apparatus provided exchangeably with traveling means for holding recording means for recording by use of ink, and reading means; recovering means for recovering the performance of the recording means; and sheet feeding means for feeding a sheet, including the following:

controlling means for making the traveling range of traveling means smaller at the time of reading means being installed on the traveling means than the traveling range at the time of recording means being installed.

It is still another object of the invention to provide an ink jet recording apparatus of a serial type having a carrier capable of installing a recording head cartridge or a scanner head whose configuration is substantially the same as the recording head, being caused to scan in the direction different from the feeding direction of a sheet and along one face of the sheet, wherein the standard stop position of the carrier at the time of the scanner head being installed thereon is different from the standard stop position of the carrier at the time of the recording head cartridge being installed thereon depending on the scanning directions of the carrier.

It is a further object of the invention to provide an ink jet recording apparatus of a serial type provided with a carrier detachably installing a recording head cartridge and a scanner head to cause them to travel selectively for recording on a recording medium when the recording head cartridge is installed, and reading a source document being fed in the same sheet path as the recording medium when the scanner head is installed, wherein the standard stop position of the carrier at the time of the scanner head being installed thereon is different from the standard stop position of the carrier at the time of the recording head cartridge being installed thereon depending on the scanning directions of the carrier; and the gap between the source document and the closest portion of the scanner head to the source document is larger than the gap between the recording medium and the closest portion of the recording head cartridge to the recording medium.

It is still a further object of the invention to provide an ink jet recording apparatus capable of installing recording means for recording on a recording sheet and optically reading means for reading images from the recording sheet on a carrier that reciprocates on the straight line in directions orthogonal to the feeding direction of the recording sheet, wherein the white reference serving as the reference of the reading level of the optically reading means is arranged in a plurality on the traveling path of the carrier facing the optically reading means. It is another object of the invention to provide an ink jet recording apparatus of a serial type being housed in a housing, comprising:

a carrier capable of installing a recording head cartridge or a scanner head whose configuration is substantially the same as the recording head cartridge, and being caused to scan in a direction orthogonal to the feeding direction of a sheet and in parallel to one face of the sheet; and a white reference capable of being read by the scanner head within the scanning range of the carrier, and being arranged on the side opposite to the home position where the ink discharge ports of the recording head cartridge are capped, wherein:

the exchanging position of the recording head cartridge and the scanner head to be installed on or removed from the carrier is set at a location close to the white reference; and apertures are arranged for the housing to be utilized when installing or removing the recording head cartridge or the scanner head on or from the carrier, and also, when cleaning the white reference.

BRIEF DESCRIPTION OF THE DRAWINGS

FIG. 5 shows the circumference of the recovery devices of the ink jet recording apparatus in accordance with one embodiment of the present invention.

FIG. 19 shows one embodiment of the scanner head of an ink jet recording apparatus in accordance with the present invention.

FIG. 32 is a flowchart which shows the on-off process of the power-supply of an information processing apparatus incorporating therein an ink jet recording apparatus in accordance with the present invention.

DETAILED DESCRIPTION OF THE PREFERRED EMBODIMENTS

Hereinafter, with reference to the accompanying drawings, a detailed description will be provided of the embodiments in accordance with the present invention.

Figure 1:
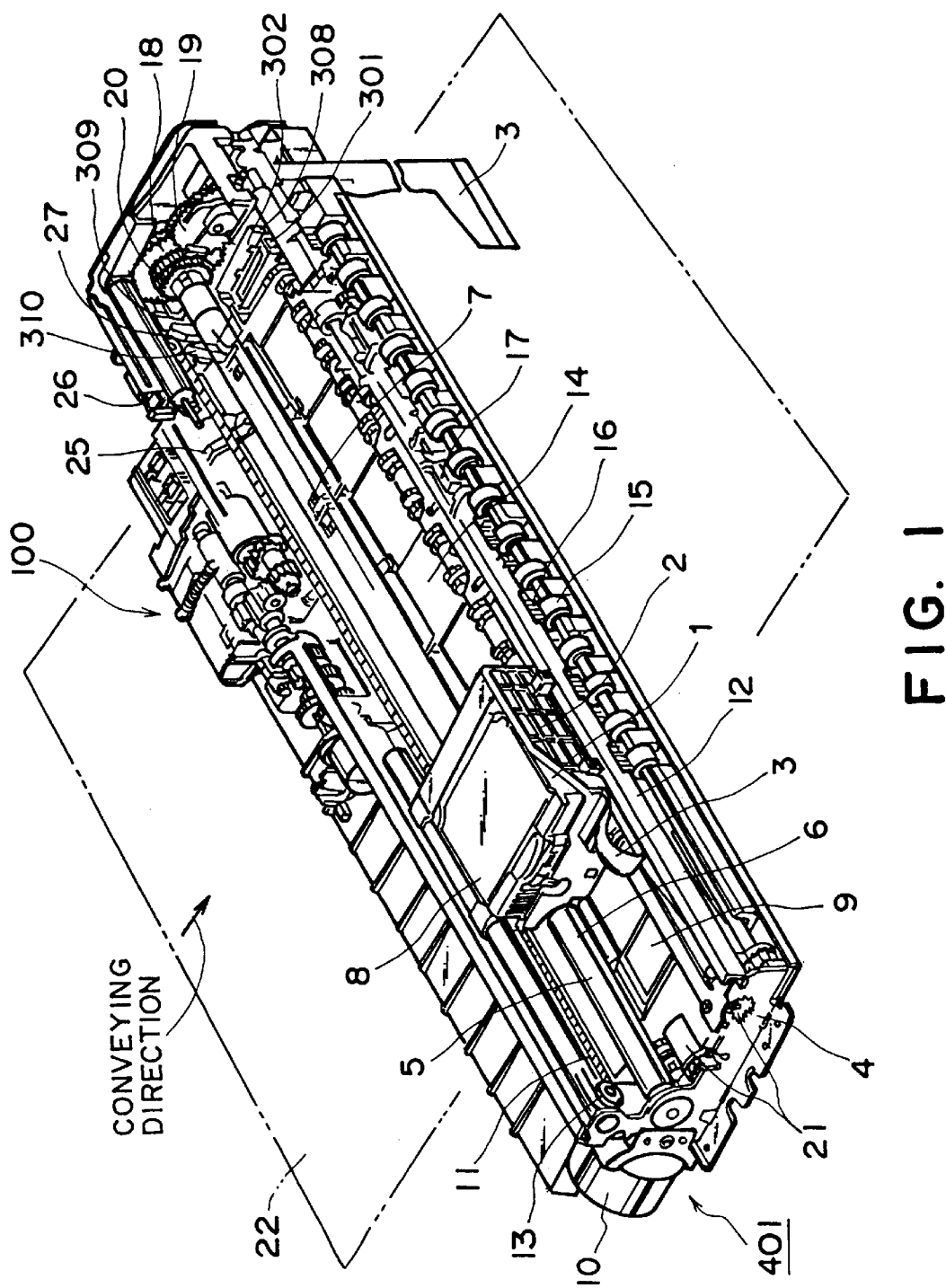
FIG. 1 is a perspective view which schematically shows one embodiment of an ink jet recording apparatus in accordance with the present invention.
Figure 2:
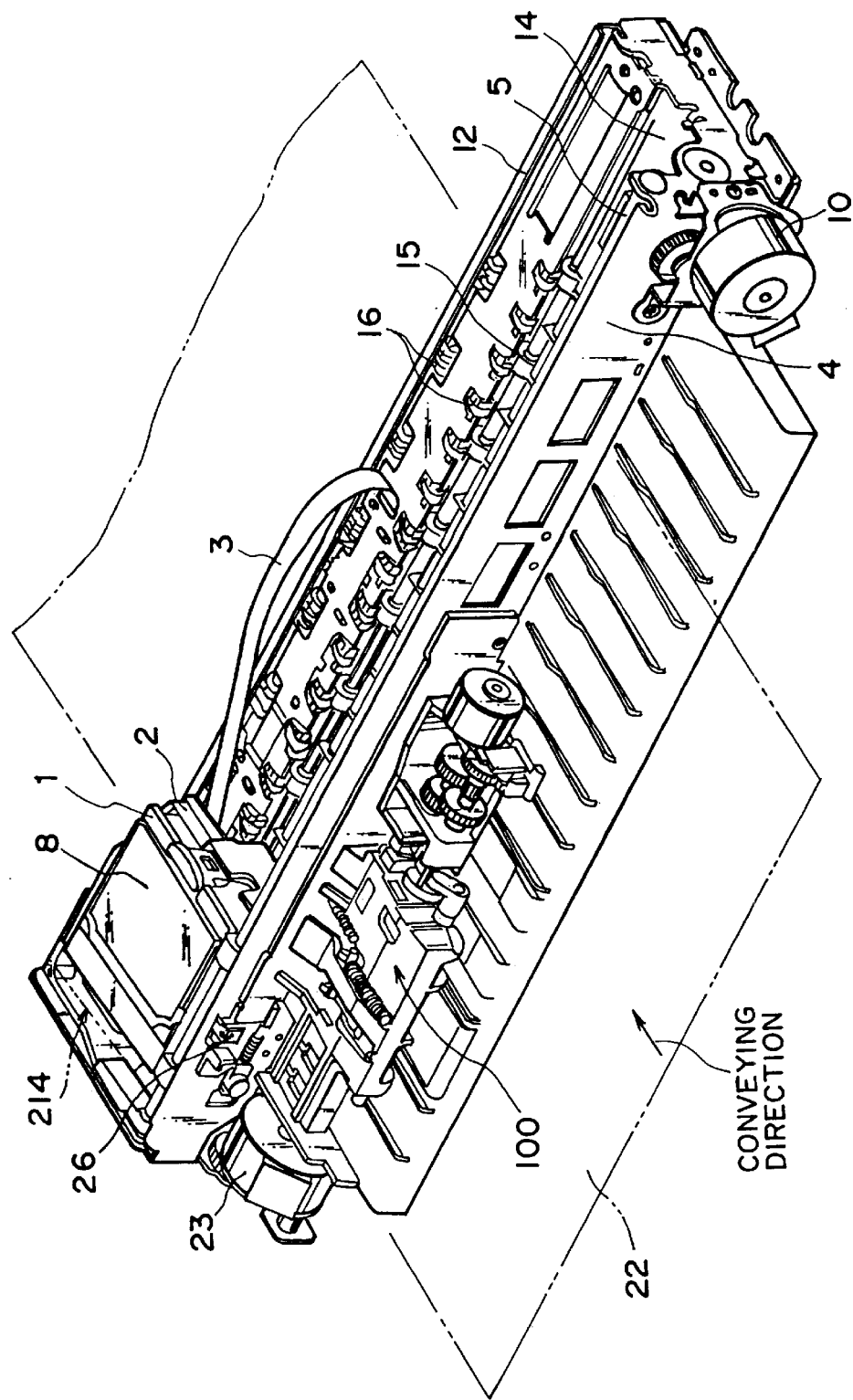
FIG. 2 is a perspective view which schematically shows one embodiment of the ink jet recording apparatus in accordance with the present invention, observed from a different direction.

FIG. 1 is a perspective view showing one embodiment of a recording apparatus in accordance with the present invention. FIG. 2 is a perspective view showing the ink jet recording apparatus represented in FIG. 1, observed from a different direction.

In FIG. 1, the ink jet recording apparatus is provided with a carrier 2 capable of detachably holding a recording head cartridge 1. The carrier 2 is supported on a guide shaft 5 and a guide rail 12 whose respective ends are fixed to a frame 4 to arrange them to be parallel to each other, so as to enable the carrier to slide in a direction different from the conveying direction of a recording sheet (a recording medium including a flexible recording sheet such as a plastic sheet) 22, namely, in a direction substantially orthogonal thereto, for example, and also, in a direction substantially parallel with the surface of the recording sheet 22. The carrier 2 is coupled to a part of a belt 11 tensioned around a driving pulley 13 driven by a carrier motor 10 to rotate by means of a gear train (not shown), and an idle pulley 27a rotatively supported. The structure is arranged so that when the carrier motor 10 is driven, the belt 11 is driven, accordingly, to cause the carrier 2 to reciprocate along the guide shaft 5 and the guide rail 12 in the direction described above.

Also, an ink tank 8 is detachably installed on the recording head cartridge 1. When ink is consumed completely by recording, it is possible to replace ink tanks 8 for the performance of the next recording operation.

Also, there are provided a home position sensor 26 to sense the position of the carrier 2 by detecting the passage of the carrier 2, and a flexible cable 3 that transmits electric signals from a control board (not shown) to the recording head cartridge 1.

Now, a description will be provided of the structure to convey a recording sheet 22.

A sheet feeding roller 6 is rotatively supported on the frame 4. To the shaft end of the sheet feeding roller 6, an LF gear 18 is fixed. The sheet feeding roller 6 is driven by means of a sheet feeding motor 23 shown in FIG. 2.

A pinch roller 7 is in contact under pressure with the sheet feeding roller 6 from below by means of a spring (not shown). The recording sheet 22, which is pinched by the sheet feeding roller 6 and pinch roller 7, is conveyed by the driving of the sheet feeding motor 23. Also, a sheet exhausting roller 15 is provided to exhaust the recording sheet 22 when recording is completed. To the sheet exhausting roller 15, a driving force is transmitted from the sheet feeding roller 6 through an idle gear train 21, thus enabling the sheet exhausting roller to rotate in synchronism with the rotation of the sheet feeding roller 6. A spur 16 is in contact under pressure with the sheet exhausting roller 15 to pinch the recording sheet 22 between the sheet exhausting roller 15 and the spur to convey the sheet.

Further, there are provided a sheet sensor 25 to detect the presence and absence of a recording sheet 22 immediately before the sheet feeding roller 6, and an exhaust sheet sensor 17 to detect the presence and absence of the recording sheet 22 in the vicinity of the sheet exhausting roller 15.

The function of this apparatus as a recording apparatus is to record one line on the recording sheet 22 by enabling the recording head cartridge 1 to discharge ink downward in FIG. 1 in accordance with recording signals in synchronism with the reciprocation of the carriage 2 described above. In other words, the recording head cartridge 1 comprises fine liquid discharge ports (orifices), liquid paths, energy activation units arranged for each of the liquid paths, and energy generating means arranged for each energy activation unit for generating energy that acts upon liquid to form droplets.

As energy generating means for generating such energy as described above, there are available a recording method that uses electromechanical transducing elements such as piezo-elements; a recording method that uses energy generating means for discharging droplets by the function of heat generated by the irradiation of electromagnetic waves such as laser; or a recording method that uses energy generating means for discharging droplets by heating liquid by means of electrothermal transducing elements, such as heat generating elements having heat resistors.

Of these methods, the recording head used for the ink jet recording method, which discharges liquid by the application of thermal energy, makes it possible to record data with high resolution, because the liquid discharge ports can be arranged in a high density for discharging recording liquid in the form of droplets for recording.

Of the heads that adopt this method, the recording head, which uses the electrothermal transducing elements as the source to generate the energy, can be made compact easily. Here, it is also possible to fully utilize the advantages of the IC technologies and micro-processing techniques. The advancement of technologies and enhancement of its reliability are conspicuous in the semiconductor field in recent years; hence making it possible to facilitate the highly dense assembly of the elements at lower costs of manufacture of the heads, among other advantages.

Also, the structure is arranged so that when one-line recording is completed by causing the recording head cartridge 1 to travel, the recording sheet 22 is conveyed by means of the sheet feeding motor 23 for the one-line portion in the direction indicated by an arrow on the recording sheet 22 in FIG. 1 as the conveying direction, and then, recording is performed on the next line.

For the printer unit 401, an automatic sheet feeding unit 100 is arranged to feed recording sheets from its stack by separating them one-by-one. The structure thereof will be described later.

Figure 4:
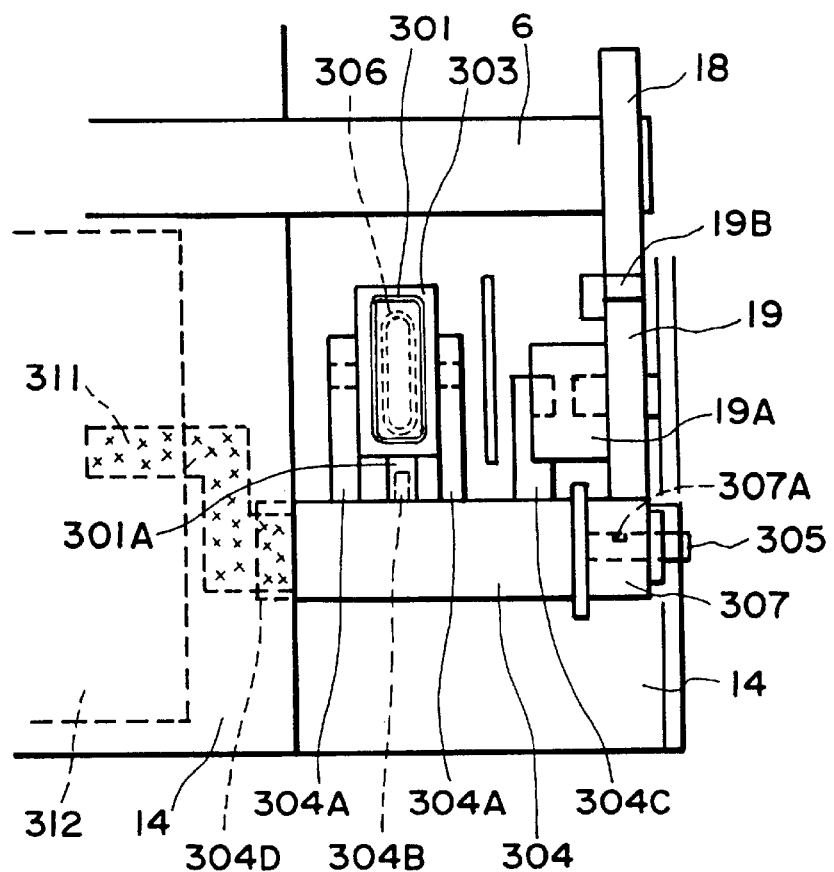
FIG. 4 is a plan view which schematically shows the circumference of the recovery device of an ink jet recording apparatus in accordance with one embodiment of the present invention.
Figures 5A, 5B:
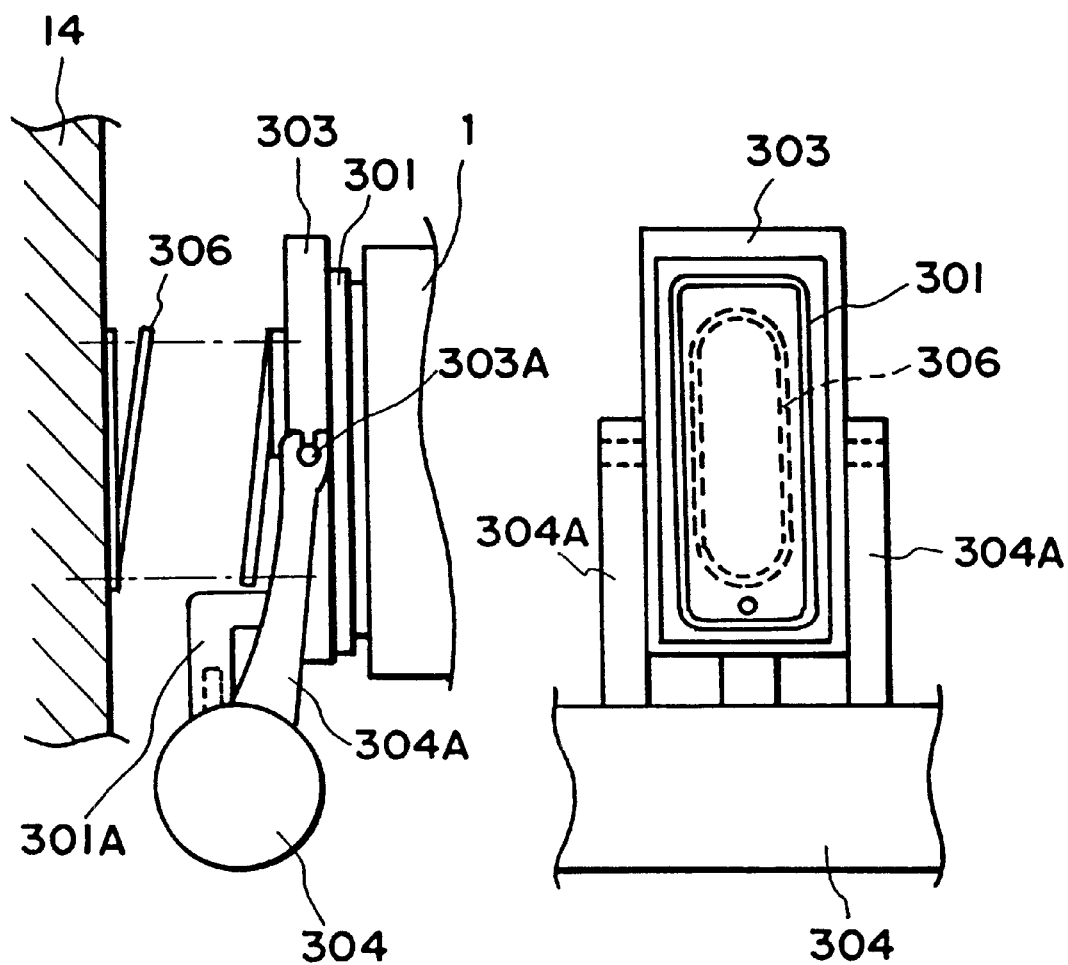
FIG. 5(A) is the enlargement of a plan view schematically showing the device.
FIG. 5(B), a side view thereof.

Now, a description will be provided of a pumping mechanism to perform the recovery operation of the recording head cartridge 1 for the maintenance or recovery of the ink discharge function. FIG. 4 is a (plan view which schematically shows the circumference of the recovery device in accordance with one embodiment of the present invention. FIG. 5(A) and FIG. 5(B) are enlarged plan and side views, respectively, showing the circumference of the recovery device in accordance with one embodiment of the present invention.

In FIG. 1, FIG. 4, FIG. 5(A) and FIG. 5(B), a cap 301 is formed by an appropriate flexible material, such as chlorinated butyl rubber, to cover the ink discharge ports of the recording head cartridge 1 so as to close the ink discharge ports and the circumference thereof in an air-tight manner. The cap 301 is integrally held by a cap holder 303. The cap holder 303 is rotatively held by an arm 304A integrally extended from a cylinder 304.

The cylinder 304 is provided with a piston (not shown) in its interior. When the piston shaft 305 is driven, a negative pressure is generated in the cylinder 304. Also, the cap 301 is provided with a joint 301A integrally formed with the cap 301. The cylinder 304 and the cap 301 engage each other in a sealed condition when the joint 301A press fits with interference in a joint 304B arranged in the cylinder 304.

Now, a description will be provided of a method to keep the cap 301 to be in contact under pressure with the recording head cartridge 1 or remove it from the cartridge.

As described above, the cap 301 integrally held by the cap holder 303 engages with the cylinder airtightly. Further, the cap holder 303 is rotatively held by an arm 304A with respect to the cylinder 304.

Here, as shown in FIG. 5, a cap spring 306 is installed between the cap holder 303 and the base 14 that faces the holder. The cap spring 306 biases the cap holder 303 to the recording head cartridge 1 side at all times. Then, the cylinder 304 is supported by the base 14 to be rotatable around the cylinder shaft.

As a result, a rotational force is given to the cylinder 304 and the cap 301 by means of the cap spring 306 centering on the cylinder shaft. Also, for the cylinder 304, a cylinder controller 304C is integrally formed as shown in FIG. 1 and FIG. 4. The leading end of the cylinder controller 304C is in contact with the pump cam gear unit 19A rotatively supported on the base 14.

Therefore, the rotation of the cylinder 304 is controlled by means of the cam unit 19A of the pump cam gear 19 through the cylinder controller 304C. In other words, when the cylinder controller 304C moves up and down (movement in the direction perpendicular to the surface of FIG. 4) along the cam unit 19A of the pump cam gear 19, the cap 301 is in contact under pressure with the recording head cartridge 1 or such contact is released through the cylinder 304.

In this respect, the pump cam gear 19 and the driving force transmission unit held on the base 14 are arranged on the right end portion to avoid the sheet path (the passage of the recording sheet). The pump cam gear 19 can be connected selectively with the LF gear 18 axially coupled by press fit to the sheet feeding roller 6. The driving of the sheet feeding motor 23 is transmitted to the LF gear 18 through a gear train (not shown) to operate the clutch, thus pressing the clutch gear 20 to the LF gear 18 side by means of the movement of the carrier 2. In this way, it is possible to transfer the driving of the sheet feeding motor 23 to the pump cam gear 19.

The pump cam gear 19 is connected with the cylinder cap gear 307. Further, when the boss 307A arranged on the inner wall of the cylinder cap gear 307 is fitted into the lead groove of the piston shaft 305, the rotational motion of the pump cam gear 19 can be transformed to the linear motion of the piston shaft 305.

Here, in this respect, if the carrier 2 does not conduct any clutching operation, the transmission of the LF gear 18 is cut off, because the pump cam gear 19 is provided with a partly toothless portion 19B. Thus the driving is not transmitted to the pump cam gear 19.

Figure 6:
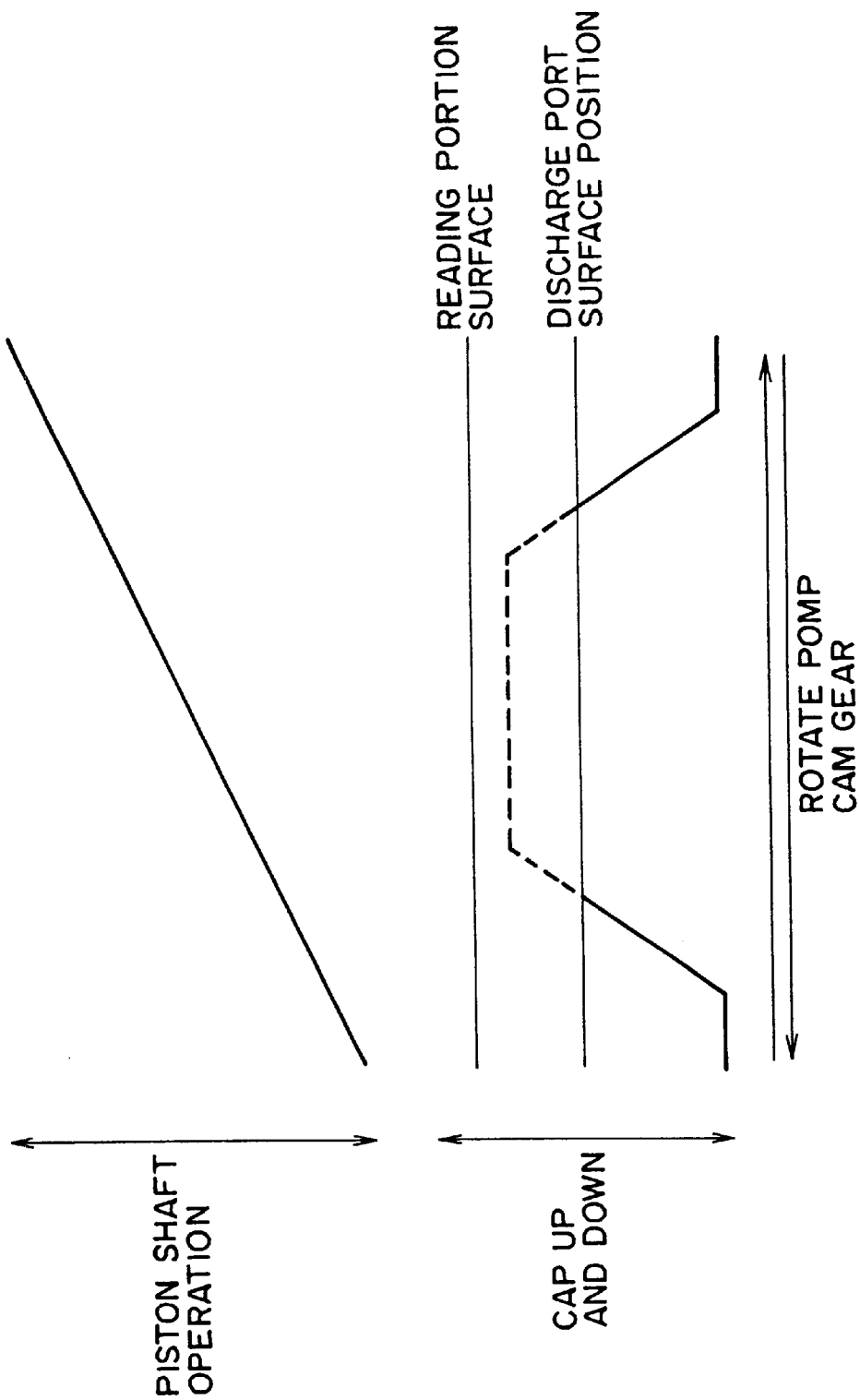
FIG. 6 is an operational chart which describes the operation of the recovery device of an ink jet recording apparatus in accordance with one embodiment of the present invention.

FIG. 6 is a chart showing the operation of the piston shaft 305 and cap 301 to be executed by the rotation of the pump cam gear 19 when the sheet feeding motor 23 is driven to cause the pump cam gear 19 to rotate after the carrier 2 actuates the clutch.

The axis of the abscissa indicates the rotational angles of the pump cam gear 19. The capping direction is shown in the upper part of the operational chart of the cap 301. The direction in which the negative pressure is generated is shown in the upper part of the chart regarding the piston shaft 305. The position of the discharge port surface indicated by the axis of the abscissa shows the relationship between the discharge port surface and the cap 301. When the upper face of the cap 301 arrives at this position, the capping operation is completed. The portion indicated by dotted line represents the overstroked portion of the cap 301. In other words, this portion represents the operation of the cap 301 when the recording head cartridge 1 is not installed.

As is understandable from this chart, the status changes from the released condition to the capping condition along the rotation of the pump cam gear 19. At the same time, the negative pressure is being generated. As a result, the negative pressure resides in the interior of the cap after the capping is completed, making it possible to suck ink from the nozzles of the recording head cartridge 1 used for recording. In this respect, the structure is arranged to allow the pump cam gear 19 to return to the original position when the rotation is reversed after it arrives at the right side end indicated in the chart.

As described above, the cap spring 306 is held by the base 14 to lie between the base 14 and the cap holder 303 in the pump mechanism unit, hence enabling the cap 301 to be in contact under pressure with the recording head cartridge 1. Therefore, when recording is at rest, the recording head cartridge 1 is capped to prevent nozzles from being dried. At the same time, discharges can be normalized when sucking ink from the nozzle portion of the recording head cartridge 1 by the operation of the pump unit if any defective discharges occur due to bubbles generated in the nozzles and dust particles adhering to the nozzle portion.

By use of the pump mechanism unit described above, ink is sucked from the recording head cartridge 1 through the cap 301 and disposed as waste ink. This waste ink enters the cylinder 304. Then, by the movement of a piston (not shown), it is exhausted from the cylinder end 304D. The cylinder end 304D is inserted into the base 14, and then, rotatively supported by the base 14. To the cylinder end 304D, a cylinder absorbent 311 is inserted. The cylinder absorbent 311 is formed by foam sponge, for which a material having a good ink transferability is selected. In other words, a good performance is required to effectively exhaust the waste ink retained in the cylinder 304 to the outside.

The cylinder absorbent 311 is in contact with a waste ink absorbent 312 arranged in the base 14. For the waste ink absorbent 312, a material having a high ink retaining capability, such as a laminated sheet or a polymer absorbent, is used.

With the structure described above, the waste ink sucked from the recording head cartridge 1 is carried to the waste ink absorbent 312 arranged in the base 14 through the cylinder 304 and cylinder absorbent 311, and then retained in the waste ink absorbent 312.

Now, a description will be provided of the blade mechanism provided for cleaning the recording head for the maintenance or the recovery of the ink discharge function of the recording head cartridge 1.

In FIG. 1, a reference numeral 302 designates a thin plate type blade formed by an elastic material, such as urethane rubber, silicon rubber, chloroprene rubber. The lower part of the blade 302 is fixedly supported by a blade holder, while the upper end is made free. The upper end of the blade 302 is formed in a length good enough to allow it to contact the discharge port surface of the recording head cartridge 1 as the recording head cartridge 1 passes above such end when the carrier motor 10 is driven. Therefore, when the discharge port surface of the recording head cartridge 1 is caused to pass above the blade 302, the upper end of the blade 302 abuts upon the discharge port surface of the recording head cartridge. Thus, the upper end of the blade 30 is bent, and rubs the discharge port surface while it is in contact with the surface.

With this operation, the dust particles and other foreign substances adhering to the circumference of the nozzles on the discharge port surfaces are removed to make normal recording possible (or, to perform the intended wiping).

Further, the blade holder 308 is retracted to the location where it does not touch the discharge port surface while falling down in the direction away from the cap 301 to move accordingly in that direction parting from the discharge port surface. The blade holder 308 is rotatively supported on the base 14 to make this retraction possible.

In this respect, the structure is arranged as shown in FIG. 1, and when the carrier 2 moves to the right, the carrier 2 causes the blade releasing lever 305 to move to the right so that the aforesaid retracting operation is performed.

Also, the structure is arranged so that from such state as described above, the carrier 2 moves in the opposite direction, that is, moves to the left, and then, the extrusion (not shown) of the carrier 2 causes the blade lever 310 to fall down to the left so as to release the retracting operation of the blade holder 308. In this way, the holder is allowed to return to the location where it is in contact with the discharge port surface.

Figure 7:
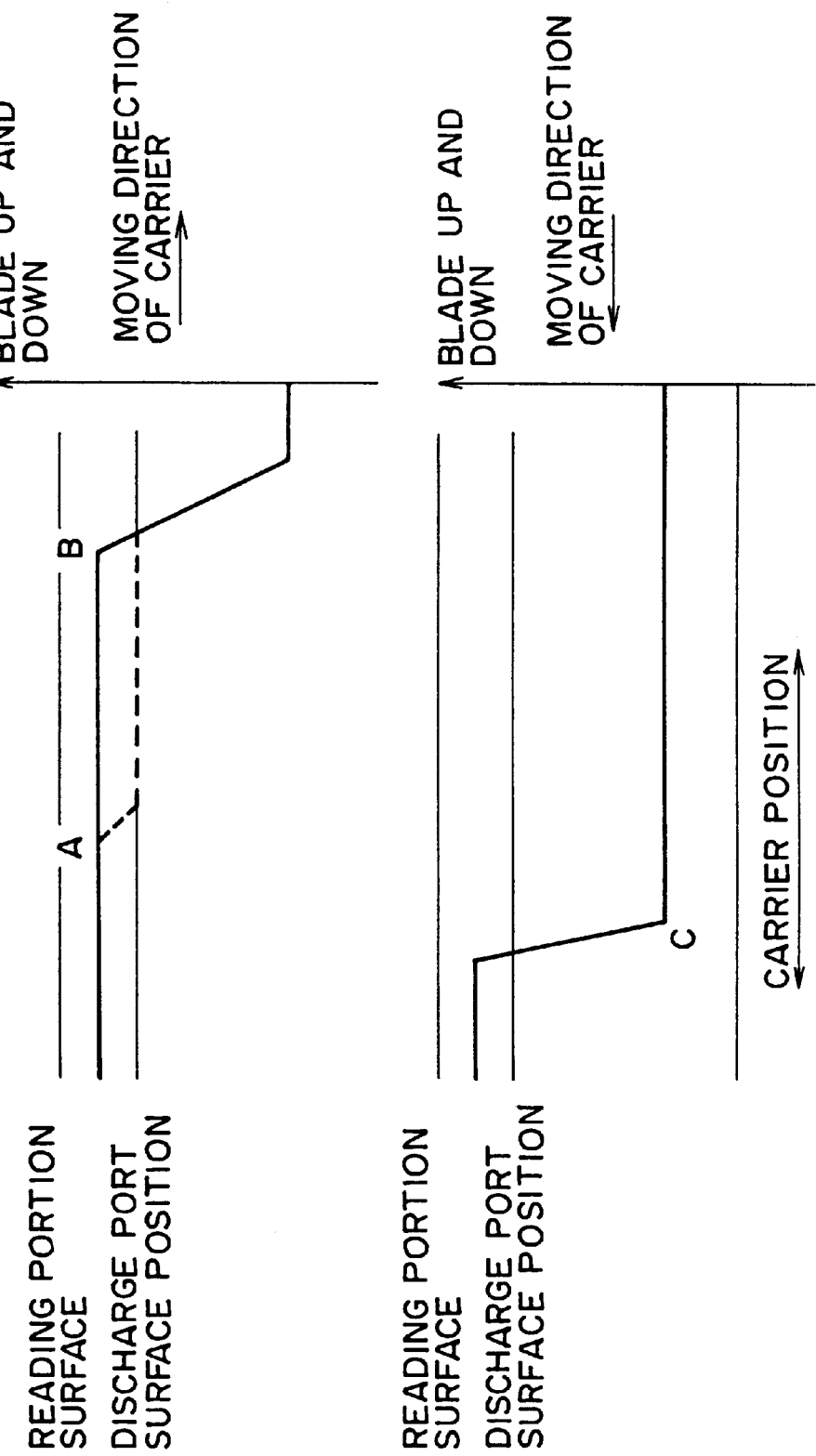
FIG. 7 is an operational chart which describes the operational relationship between the blade and carrier of an ink jet recording apparatus in accordance with one embodiment of the present invention.

FIG. 7 is a chart describing this operation.

The view shown in the upper part of FIG. 7 represents the case where the carrier moves to the right. The one shown in the lower part of FIG. 7 represents the case where the carrier moves to the left. In both views, the ordinate axis indicates the height of the leading end of the blade 302, and it abuts upon the discharge port surface when it ascends in that direction. The abscissa axis indicates the positions of carrier 2.

Also, in FIG. 7, a horizontal line indicated as the discharge port surface position represents the position of discharge port surface with respect to the blade 302. When the leading end of the blade 302 resides above such line (in the region indicated by dotted line in FIG. 7), the leading end of the blade 302 is bent to that extent in the bending direction to perform the wiping operation. In other words, the dotted line in FIG. 7 indicates the bending movement of the leading end of the blade 302, while being in contact with the discharge port surface, when the recording head cartridge is installed.

In the upper view of FIG. 7, when the carrier 2 moves in the right-hand direction, the contact between the blade 302 and the discharge port surface begins at the point A (that is, the beginning of the wiping operation indicated by the dotted line in FIG. 7 as described above). With the further movement of the carrier 2, the blade releasing lever begins to fall down when the carrier 2 arrives at the point B. Then, the blade 302 is caused to part from the discharge port surface to terminate the wiping operation.

In the lower view of FIG. 7, it is shown that the carrier 2 moves from the right end in the left-hand direction. At the point C, the extrusion (not shown) of the carrier 2 causes the blade lever 310 to fall down to the right. Thus, the leading end of the blade 302 is allowed to return to the original position where it is on standby for the next wiping operation.

With the structure described above, when the carrier 2 moves to the right end in FIG. 1, the wiping operation of the discharge port surface of the recording head cartridge 1 is performed. Therefore, only if this operation is executed as required, is it possible to obtain recorded images in normal condition.

Now, a description will be provided of the head that can be installed on this apparatus.

In the descriptions so far, the example has been shown, in which the recording head cartridge 1 is detachably installed on the carrier 2 of the apparatus embodying the present invention. Regarding this aspect, a further description will be provided in detail with reference to FIG. 3, FIG. 8, FIG. 9, and FIG. 10.

Figure 8:
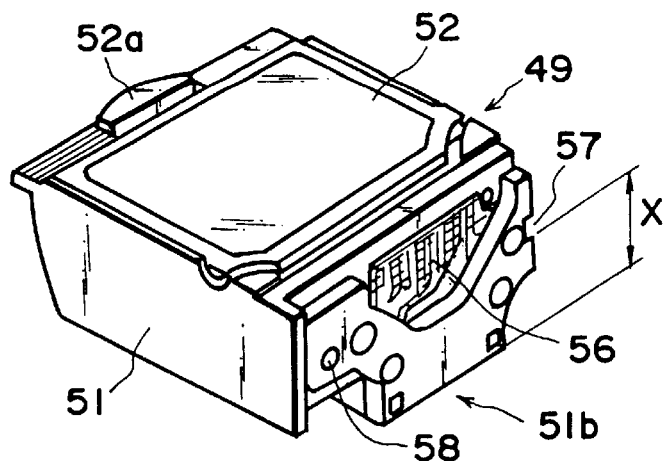
FIG. 8 is a perspective view which schematically shows the monochromatic recording head unit of an ink jet recording apparatus in accordance with one embodiment of the present invention.
Figure 9:
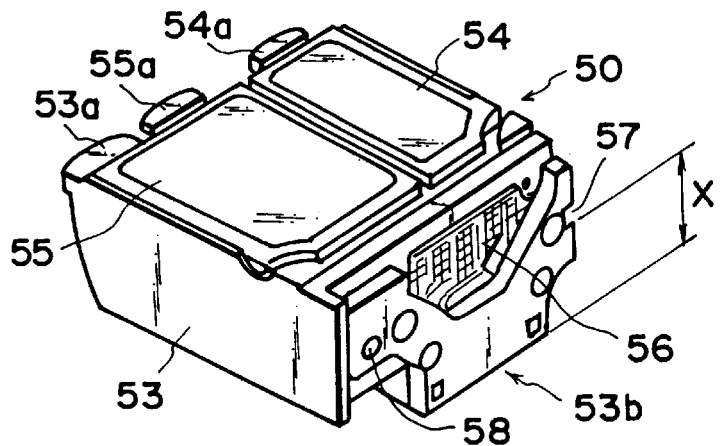
FIG. 9 is a perspective view which schematically shows the color recording head of an ink jet recording apparatus in accordance with one embodiment of the present invention.
Figure 10:
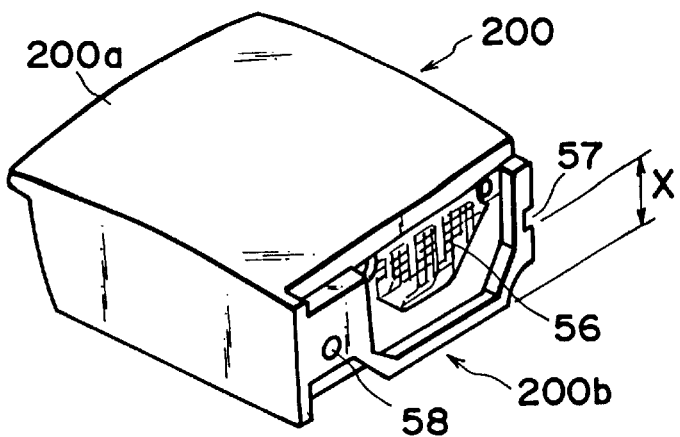
FIG. 10 is a perspective view which schematically shows the scanner head of an ink jet recording apparatus in accordance with one embodiment of the present invention.

In particular, the recording head cartridge 1 is classified into two kinds. One is a monochromatic recording head unit 49 as shown in FIG. 8, and the other is a color recording head unit 50 as shown in FIG. 9. Further, as a third kind, there exists a scanner head 200 capable of reading a source document to be inserted in place of the recording sheet 22 as shown in FIG. 10. Therefore, a total of three kinds of heads can be installed individually on the carrier 2 of the apparatus. Hereinafter, whenever those three kinds, namely, the monochromatic recording head unit 49, the color recording heat unit 50, and the scanner head 200, are collectively referred to as a "head unit".

Figure 3:
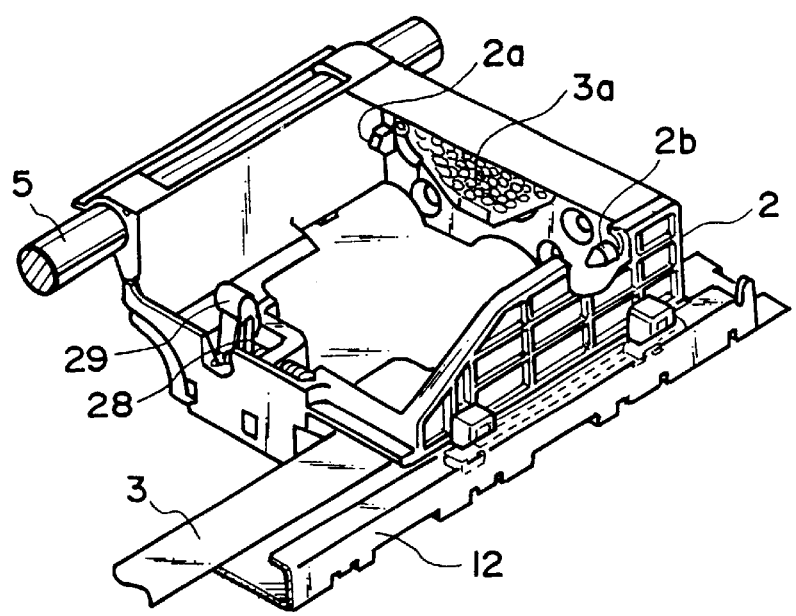
FIG. 3 is a perspective view which schematically shows one embodiment of the carrier of the ink jet recording apparatus in accordance with the present invention.

At first, a description will be provided of the detachable installation of those three kinds of head units in accordance with FIG. 3.

FIG. 3 is a perspective view which shows the carrier 2 when none of the heads shown in FIG. 8 to FIG. 10 is installed on it.

On one end of the carrier 2, the cable terminal 3a of the flexible cable 3 is provided. With the cable terminal 3a, each of the cable terminals 56 (see FIG. 8, FIG. 9 and FIG. 10) of the head units is connected when either one of the monochromatic recording head unit 49, color recording head unit 50 and scanner head 200 is installed on the carrier. The electrical connection with the head units is then established through the terminals.

On the surface where the cable terminal 3a of the carrier 2 resides, two extrusions 2a and 2b are arranged to position each of the head units. In a state that the head unit is installed on the carrier 2, the head positioning extrusion 2a is fitted into the positioning cut-off 57 on the head unit side, and the head positioning extrusion 2b, into the positioning hole 58 on the head unit side, respectively. Thus the head unit is exactly positioned with respect to the carrier 2.

Further, in a position facing the cable terminal 3a on the carrier 2, a contact spring 28 is arranged. To the leading end thereof, a head guide 29 formed by resin is fixed. In other words, the head guide 29 is elastically supported by the carrier 2.

In a state that the head unit is installed on the carrier 2, the head guide 29 biases the head unit 48 to the cable terminal 3a side. Thus the electrical connection is established between the cable terminal 3a and the head terminal.

Also, the head guide 29 makes it possible to detachably install the head unit by bending itself when the head units are exchanged, and also, to provide a function that it can support the installed head unit 48 so as not to allow it to be off in the upward direction.

With the structure described above, when the user replaces the head units, the head terminal 56 side of the head unit is inserted so that it faces the cable terminal 3a of the carrier 2, and then, the upper surface of the head unit 48 is pressed downward. The head guide 29 is being bent, and when the user feels the clicking sense, the installation of the head unit is completed. The electrical connection is also completed at that time.

Also, when the head unit is removed, the head unit detaching operators 51a, 53a, or 200a arranged for the head unit can be pulled up by fingers. Then the head guide 29 is bent to enable the head unit to be removed from the carrier 2.

Now, in conjunction with FIG. 8, FIG. 9, and FIG. 10, the head units will be described.

FIG. 8 is a perspective view which shows a monochromatic recording head unit 49 for use in printing a monochrome color (usually, in black). In FIG. 8, a reference numeral 51 designates the monochromatic recording head cartridge. On the front part of this recording head cartridge 51, the discharge port surface 51b is formed to provide the nozzle unit for discharging ink for recording. A reference numeral 56 designates the head terminal to receive electric signals for discharging ink. The electric signals are transmitted from the printer unit 401 to the monochromatic recording head cartridge 51 through the head terminal 56. Then, in FIG. 8, ink is discharged downward from the nozzles arranged for the discharge port surface 51b to perform recording. The reference numeral 57 designates the positioning cut-off and 58, the positioning hole. These positioning cut-off 57 and positioning hole 58 assure the exact positioning with respect to the carrier 2 when being coupled with the head unit positioning extrusions 2a and 2b.

A reference numeral 52 designates a monochromatic ink tank. In its interior, ink is retained. The monochromatic ink tank 52 is detachably fixed to the monochromatic recording head cartridge 51 by means of its latch unit 52a. Also, the monochromatic ink tank 52 and the monochromatic recording head cartridge 51 form an ink path by means of the detachable joint unit (not shown).

Therefore, when ink is completely consumed by recording, and no ink remains in the monochromatic ink tank 52, the monochromatic ink tank 52 is removed from the monochromatic recording head cartridge 51 by bending the latch unit 52a. Then a new monochromatic ink tank 52 is installed to continue recording.

FIG. 9 is a perspective view which shows a color recording head unit 50 for recording in colors.

Here, the differences with the monochromatic recording head unit 49 will be described. On the discharge port surface 53b, four kinds of nozzle groups are arranged individually to discharge four different colors, yellow, magenta, cyan, and black, in order to perform color recording. A reference numeral 54 designates a black ink tank. In this black ink tank 54, black ink is retained. Through the detachable joint (not shown), this ink tank is coupled with the black nozzle group arranged on the discharge port surface 53b described above.

Also, a reference numeral 55 designates a color ink tank. The interior of the color ink tank 55 is divided into three individual volumes. In each of them, yellow ink, magenta ink, and cyan ink are retained, respectively. Like the black ink tank 54, the color ink tank 55 is arranged to connect yellow ink to the yellow nozzle group, magenta ink to the magenta nozzle group, and cyan ink to the cyan nozzle group, respectively, through each of the individually detachable joints (not shown).

A reference numeral 54*a* designates a latch unit for replacing black ink tanks 54, and 55*a*, and a latch unit for replacing the color ink tanks 55.

As described above, with the color recording head unit 50 installed on the printer unit 401, color recording can be performed. At the same time, if black ink is completely consumed, only the black ink tank 54 need be replaced. If either one of yellow, magenta, and cyan, or all of them are completely consumed, only the color ink tank need be replaced.

FIG. 10 is a perspective view showing the scanner head 200, which will be described later in detail.

In FIG. 8 and FIG. 9, a reference mark X designates the distance from the positioning cut-off 57 to the discharge port surfaces 51*b* and 53*b*. This distance represents one and the same value both for the monochromatic recording head cartridge 51 and the color recording head cartridge 53, which is approximately 13 mm in accordance with the present invention. In contrast, a reference mark Y in FIG. 10 designates the distance from the positioning cut-off 57 to the reading unit surface 200*b* of the scanner head 200, which is set to be shorter. This distance is approximately 9 mm in accordance with the present invention.

This value Y is plotted in the charts describing the operation of the cap 301 and that of the blade 302 in FIG. 6 and FIG. 7, and represented by the horizontal line indicated as the reading portion surface. Here, the difference in the vertical direction of the horizontal lines indicating the discharge port surface position and the reading portion surface is equivalent to 4 mm, which is the difference between 13 mm and 9 mm described above.

From FIG. 6 and FIG. 7, it is understandable that when the scanner head 200 is installed, neither the cap 301 nor the blade 302 is in contact with the reading portion surface 200*b* of the scanner head 200 even if the capping and wiping operations are conducted.

As the result of such structural formation, it is possible to prevent the reading portion surface 200*b* from being contaminated by the ink-stained cap 301 and blade 302 when the scanner head 200 is installed.

Further, with reference to FIG. 11 to FIG. 14, a description will be provided of another embodiment of the ink jet recording apparatus capable of preventing ink from adhering to an image reading head by the members abutting upon the ink jet recording head when the image reading head is installed on the ink jet recording apparatus for use.

A reference numeral 602 designates a carriage to install a recording head (not shown) or reading heads 601 and 604, and a carriage motor to drive the carriage 602. The carriage 602 can travel in the main scanning direction along the shaft 603. The reference position of the carriage 602 is determined when the carriage extrusion 602*a* arranged therefor is detected by the reference position sensor 624. Hence, by means of the positional control to be executed by an encoder 605 based on this reference, the recording range or the reading range is decided.

On the plane facing the carriage 602, a feeding unit 607 is arranged. A recording sheet or a source document to be read passes the gap thus arranged. Both ends of the feeding unit 607 are supported by a chassis 608. This unit comprises two feed rollers 610, a pinch roller 611 and spurs 612 arranged adjacent to each other; and a feed motor 614.

Also, adjacent to the feeding unit 607, a recording head recovery unit 631 is provided. The cap 631*a*, which is incorporated in the recording head recovery unit 631, covers the ink discharge surface of nozzles of the recording head. Then ink is sucked from the recording head to recover the discharging function of the recording head. Also, a blade 631*b* arranged on the side thereof wipes and removes ink adhering to the recording head.

At first, a description will be provided of the case where the recording head is installed on the carriage 602.

When there is no input of recording data, the carriage 602 is on standby in the recovery position (at R in FIG. 11) that faces the recording head recovery unit 631. The recording head is covered by the cap 631*a* in an air-tight manner. When there is an input of recording data, the cap 631*a* is retracted from the recording head by means of a motor driving (not shown). Here, the carriage 602 travels in the direction toward the feeding unit 607. At this juncture, its reference position is recognized by means of the reference position recognition sensor 624. Thereafter, the recording width is decided in accordance with the reference position (at H in FIG. 11) thus recognized. Then, recording is performed on a recording sheet. Here, with the input of recording data, the recording sheet is fed by an amount equivalent to the recording nozzle width of the recording head. The carriage 602 scans on the feeding unit 607 per line and performs recording.

When the recording is completed, the carriage 602 returns to the reference position H. If there is no input of next recording data within a specific period of time, the carriage 602 moves to the recovery position R where it is covered by the cap 631 in an air-tight manner. Also, at that time, the blade 631*b* of the recording head recovery unit 631 is in contact with the moving recording head to clean the discharge surface of the recording nozzles of the recording head.

Also, particularly, with a manual recovery conducted for recovering the recording quality, the carriage 602 moves to the recovery position to perform ink suction by means of a pump (not shown).

Figure 11:
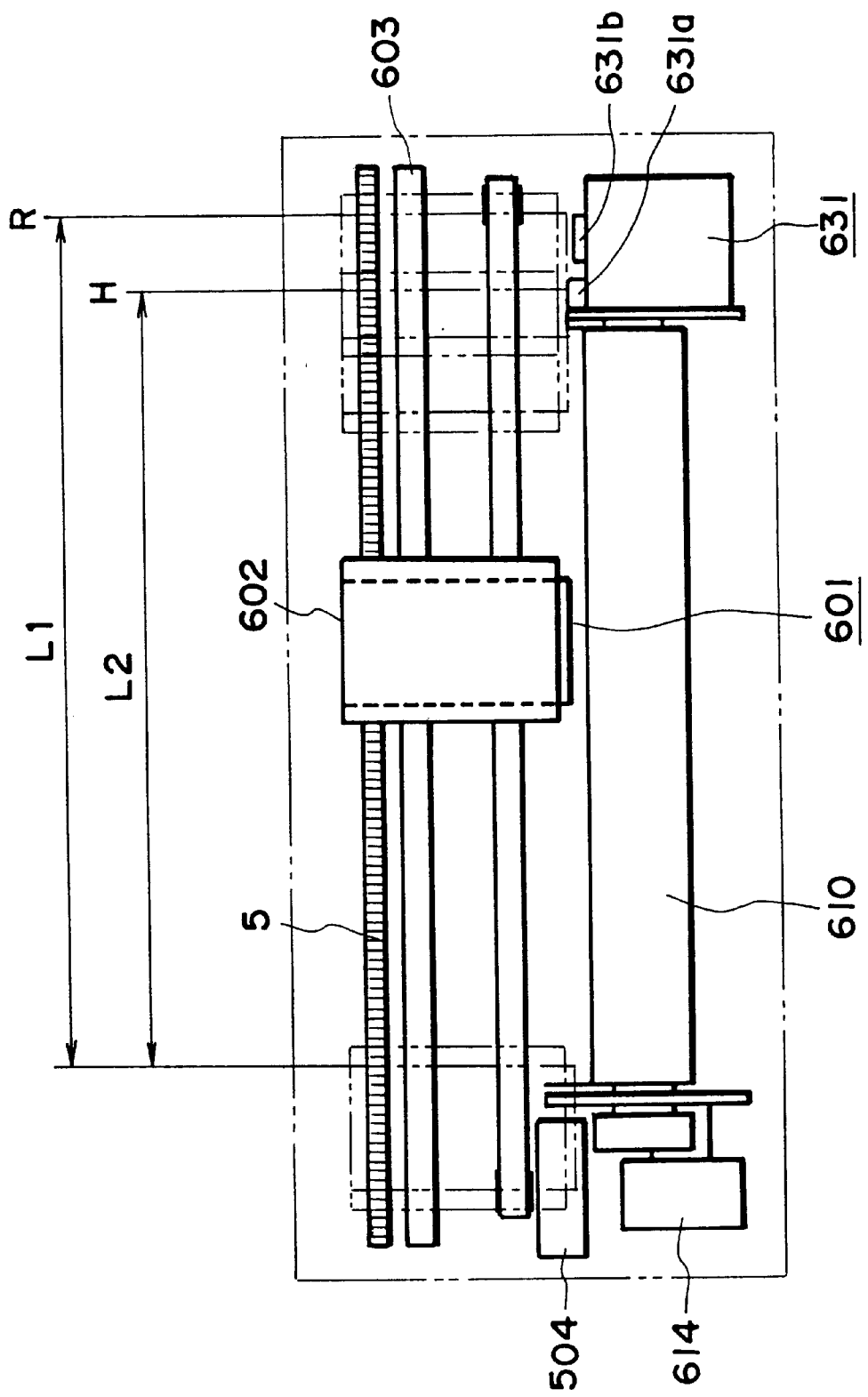
FIG. 11 is a front view which shows an ink jet recording apparatus in accordance with another embodiment of the present invention.

In accordance with the present embodiment arranged as described above, the scanning range needed for recording is a range designated by a reference mark L1 in FIG. 11.

Now, a description will be provided of the case where the reading head 601 is installed on the carriage 602.

The recording head and the reading head 601 are exchanged when the carriage 602 is at the reference position H to which the carriage.602 moves according to the head exchanging command to be issued.

In the recording head, resistor chips having different resistance values are buried. A controller (not shown) of the apparatus main body reads the ID indicated by the resistor chips through the head contact, thus detecting the presence of the reading head 601 installed on the carriage 602. In this respect, the detection of the ID may be conducted by means of the ON/OFF operation of a microswitch or some other means, for example, although it can be detected by the application of the resistance value of the resistor chips as described above.

When the controller recognizes the installation of the reading head 601 on the carriage 602, it controls the carriage 602 so as not to allow the carriage to enter the recording head recovery unit 631 side from the reference position in accordance with the position detecting signals from the reference position detecting sensor 624 and the encoder 605 as well. As a result, there is no possibility that the carriage 602 moves to the recovery position R even when there is no input of recording data. Here, if a reading command is issued, a recording sheet is fed by an amount equivalent to the reading width of the reading head 601. The carriage scans on the feeding unit 607 per line to perform reading. When the reading operation is completed, the carriage returns to the reference position H to be on standby for the next operation.

In the situation described above, the traveling range of the carriage 602 required to perform reading is a range indicated at L2. Therefore, on reading, the reading head 601 is not in contact with the blade 631b or the cap 631a of the recording head recovery unit 631, thus making it possible for the reading head 601 to perform its reading without causing any contamination of the lens, the lamp, and other components of its reading unit due to ink stains, and to obtain read-out images in good condition.

Figure 14:
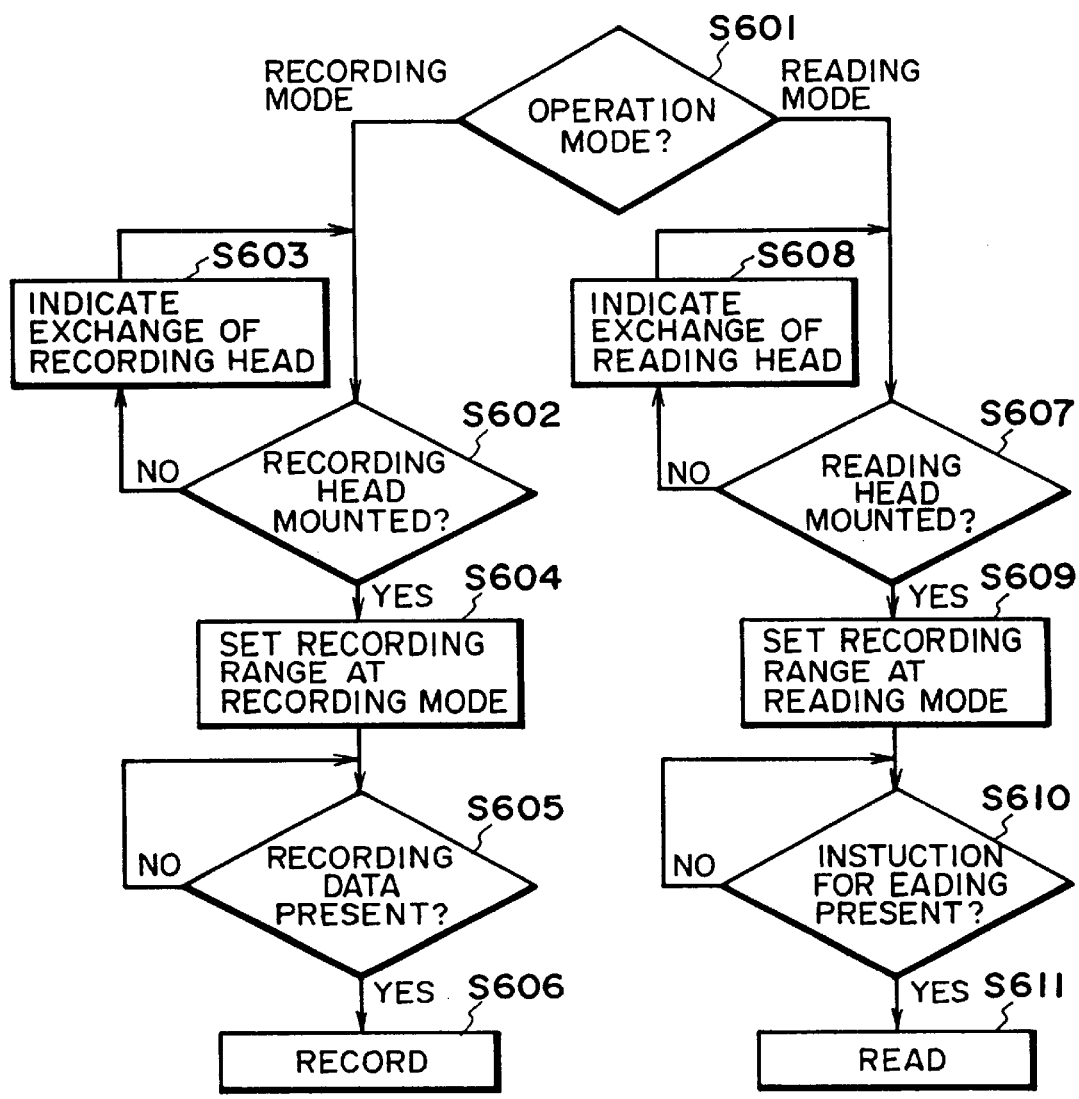
FIG. 14 is a flowchart which shows the control operation of another embodiment of an apparatus represented in FIG. 11 embodying the present invention.

FIG. 14 is a flowchart showing a part of the control of the controller of the apparatus main body in accordance with the embodiment described above, which deals with the operation to set the different recording ranges in accordance with operational modes.

At first, the controller confirms the current operational mode (step S601). It if is in the recording mode, the controller confirms the presence of the recording head installed on the recording head (step S602). If no recording head is installed, an indication is made to instruct exchanging the head with a recording head (step S603). In the step S602, if it is confirmed that a recording head is already installed, the recording range (at L1 in FIG. 11) in the recording mode should be defined. After that, the presence and absence of data to be recorded are confirmed (step S605), and then recording is executed (step S606).

Also, in the step S601, if it is confirmed that the current mode is for reading, the installation of a reading head 601 should be examined. If no reading head 601 is installed, an indication is made to instruct exchanging the head with a reading head 601 (step S608). In the step S607, if it is confirmed that a reading head 601 is already installed, the recording range (at L2 in FIG. 11) for the reading mode should be defined (step S609). After that, the presence and absence of the reading command is confirmed (step S610), and then reading is performed (step S611).

Figure 12:
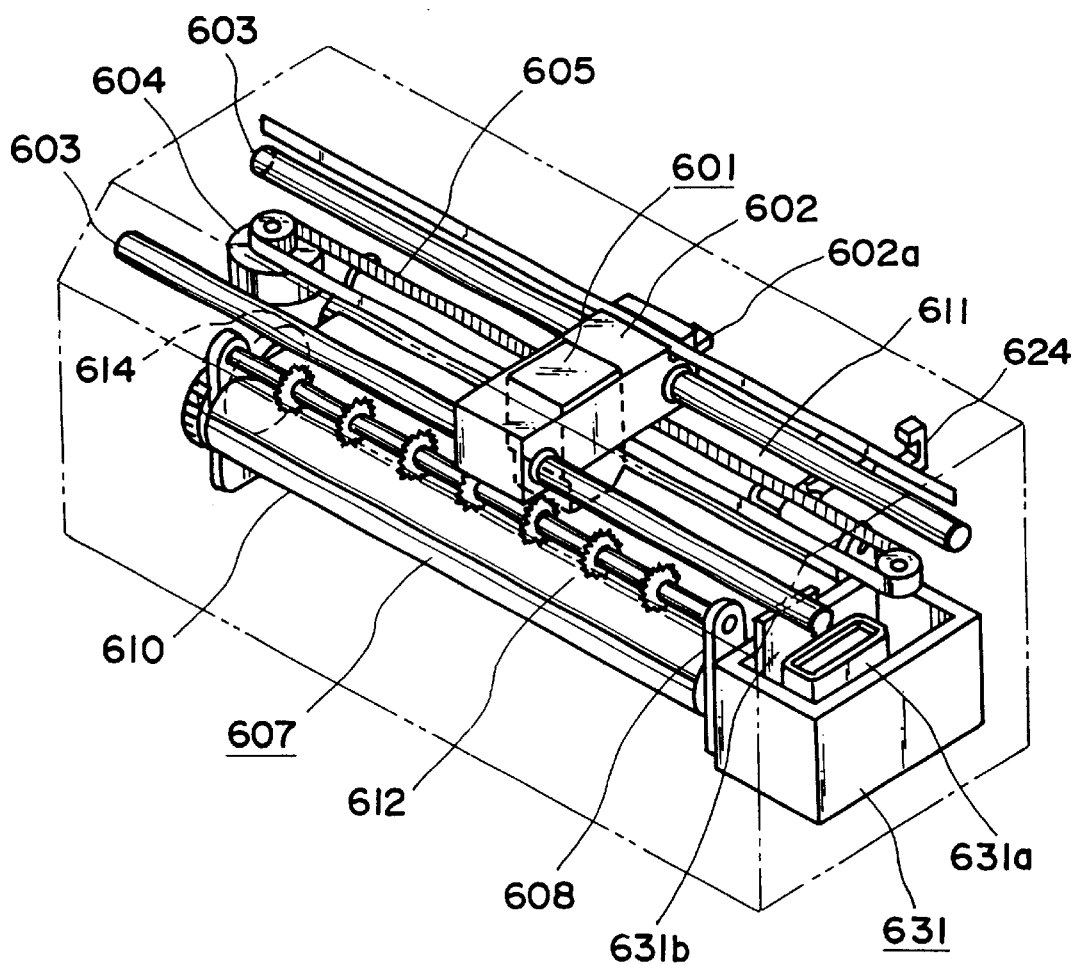
FIG. 12 is a front view which shows the mechanical unit at the time of installing the recording head thereon in accordance with the embodiment represented in FIG. 11.
Figure 13:
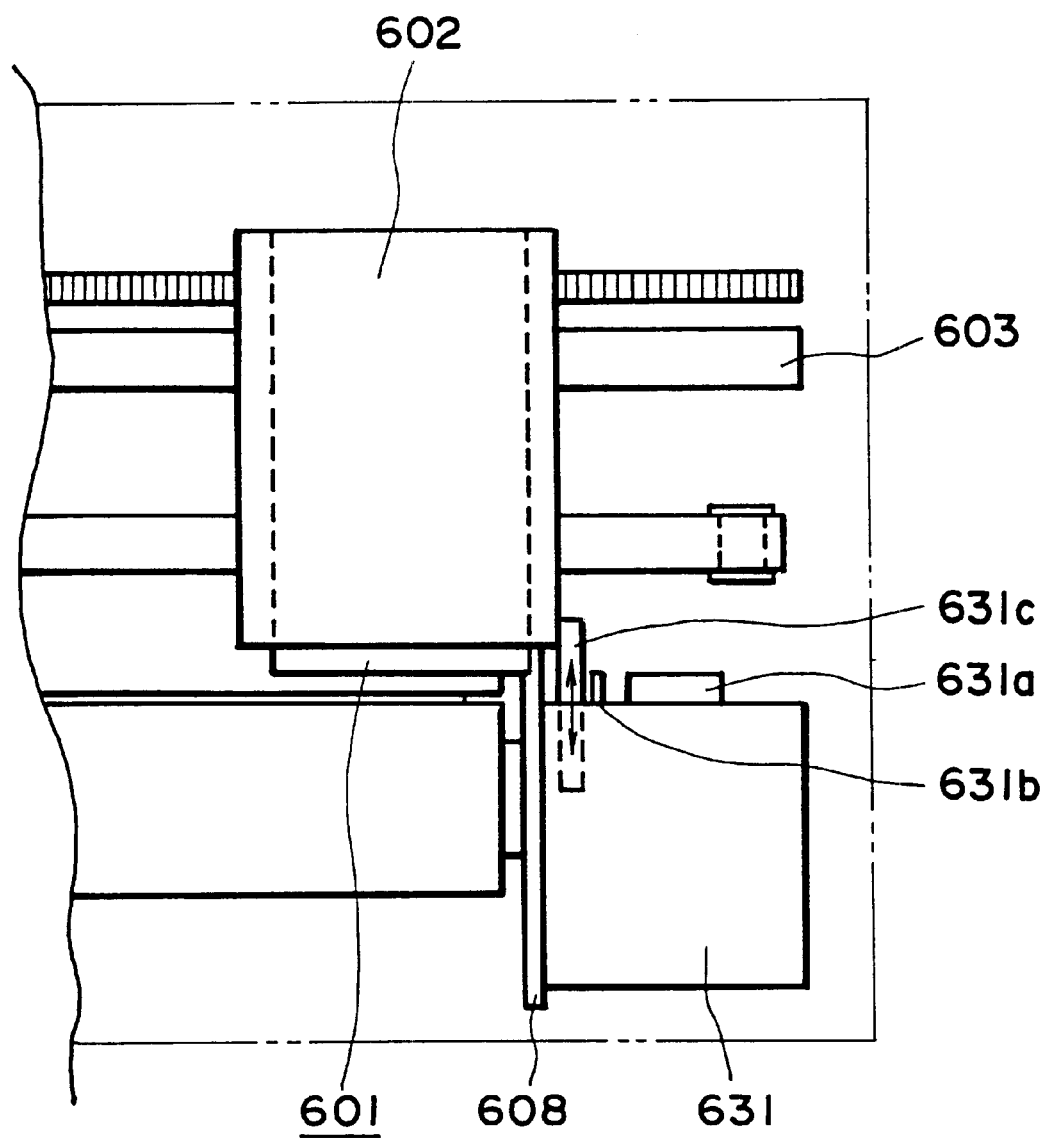
FIG. 13 is a front view which shows the structure of the principal part of another embodiment of the apparatus represented in FIG. 11 embodying the present invention.

FIG. 13 is a view showing the principal part of another embodiment of the embodiment represented in FIG. 11. In accordance with the present embodiment, a stopper lever 631c, which can be extrusive in the direction of the carriage 602 by the control of the controller of the apparatus main body, is provided for the recording head recovery unit 631 of the embodiment shown in FIG. 12. All the other structures are the same as those shown in FIG. 11 and FIG. 12. The same reference marks appearing in FIG. 11 and FIG. 12 are applied to them, and a description thereof will be omitted.

When the controller of the apparatus main body confirms the installation of the reading head 601, it causes a motor (not shown) to be driven so that the stopper lever 631c can extrude in the direction of carriage 602. The motor functions dually as a motor to cause the cap 631a to ascend or descend, and its operation is switched over depending on the rotational direction thereof.

The stopper lever 631c that blocks the carriage 602 is arranged in a location closer to the center of the apparatus than the cap 631a. Therefore, the traveling range of the carriage 602 is more greatly regulated than the traveling range at L2 shown in FIG. 11.

The controlling operation of the controller of the embodiment represented in FIG. 13 is such that when the installation of the reading head is confirmed in the step S607 in the flowchart shown in FIG. 14, the stopper lever 631c is extruded in the direction of the carriage 602, and then, in the step S601, the process proceeds to the confirmation of a scanning command. All the steps are the same as those appearing in the flowchart shown in FIG. 14.

In accordance with the embodiment represented in FIG. 13, the regulation of the traveling range is executed by a mechanical control in addition to the regulation by means of the positional detection as in the embodiment represented in FIG. 11. Therefore, even if the control should fail, the power-supply is cut off, or it a similar event is encountered, the carriage 602 does not abut upon the recording head recovery unit 631, hence making it possible to regulate the traveling range of the carriage 602 more reliably.

FIG. 11 is a cross-sectional view and perspective view showing the scanner head 200.

In FIG. 11, a reference numeral 206 designates the LED used for illuminating the surface of a source document 209. The LED rays 207 emitted from the LED 206 illuminate the surface of the source document 209 through the LED aperture 211. The optical path of the image rays 208 from the surface of the source document 209 is bent at right angles by means of a mirror 203 after passing a field lens 204 provided for the sensor aperture 212, then, passing the focusing lens, the images are formed on the sensor 202.

The center of the sensor aperture 212 is larger than the distance from the positioning surface where the ink discharge ports 213 of each recording head, the monochromatic recording head 51 and the color recording head 53, are positioned with respect to the carrier 2. In accordance with the present embodiment, there is a gap of approximately 4 mm.

The LED 206 and sensor 202 are electrically connected, and drawn out externally by means of a printed circuit board 205. For the head terminal 56 of the printed circuit board 205, an electrode is arranged, which is in contact under pressure with the electrode of the carrier 2 (not shown) to transmit signals to the controller on the apparatus main body.

The outer appearance of the scanner head 200 is in the same configuration as the recording head cartridge 1 having an ink tank 8 installed in it. Like the recording head cartridge 1, the scanner head can be installed on the carrier 2 by means of the latch of a nail 210 formed as a part of the external constituents of the scanner head. Also, when removing the scanner head, the latch of the nail 210 is released by lifting the head attachment 200a. This arrangement facilitates the removal of the scanner head.

When the scanner head is installed on the carrier 2, a CPU 502 reads the printing head cartridge/scanner recognition signal through the printed circuit board 205, and enters the scanning mode. This operation will be described later in detail in conjunction with FIG. 23.

When the CPU 502 receives scanner reading signals from an application currently executed, the key board 402, the external interface 405, or the like, the CPU causes the automatic sheet feeder 100 or the sheet feeding motor 23 to be driven to convey a source document to a given position for reading as in the case of a recording sheet 22. Then, after illuminating the LED 206, the CPU reads the image signals through the scanner driver 513, while driving the carrier motor 10.

Here, it is possible to change the driving speeds of the carrier motor 10 for reading a source document depending on the modes of the scanner head 200. The modes are defined by the combinations of the reading resolution and the gradation of each reading value. The printer unit 401 has a resolution of 360 dpi in the main scanning direction, and the resolution of the sensor 202 of the scanner head 200 is 360 dpi in the sub-scanning direction, thus obtaining an output of 64 gradations. Therefore, it is possible to execute reading in two gradations, for example, with 90 dpi in the main scanning direction and 90 dpi in the sub-scanning direction, each obtainable from the reading of 64 gradations of 360 dpi in the main scanning direction and 360 dpi in the sub-scanning direction. Also, a reading may be arranged at a resolution of 200 dpi in the main scanning direction or in a mode in which the conformity with FAX is considered. For the mode that requires a great amount of data, such as the reading of 64 gradations of 360 dpi in the main scanning direction and 360 dpi in the sub-scanning direction, it takes time to process and transfer such data. Consequently, the carrier driving speed should be made slower, while the carrier speed is made faster for the reading of two gradations each with 90 dpi in the main scanning direction and 90 dpi in the sub-scanning direction. When a reading is completed for one line, the reading for the next line is performed after feeding the recording sheet for the corresponding portion by means of the sheet feeding motor 23. Such operation is repeated to the last line of a source document.

It is unnecessary to set the standby position for the carrier 2 having the scanner head 200 installed on it in the same position in which the carrier 2 should be on standby when it has the recording head cartridge 1 installed on it. If only the reading portion surface 200b of the scanner head 200 is configured so that it can avoid colliding with the recovery unit 300 (a blade 302 and a cap 301) for performing the maintenance of the recording head cartridge 1, it may be possible to shift the standby position of the scanner head to the recovery unit 300 side, and then, utilize the movable zone thus created for the idle running zone in order to increase the running stability of the carrier 2. In accordance with the present embodiment, the line segment 214 in FIG. 2 is the stopping position of the carrier 2 when it installs the scanner head 200 on it.

Also, the white reference 9 is arranged with a reflectance having the reflection density of 0.1 or less as a reference for the purpose of specifying the image signal level as shown in FIG. 1. The CPU 502 causes the carrier 2 having the scanner head 200 installed on it to move to a position above the white reference 9, and then, causes the LED 206 to illuminate for reading the signals from the sensor 202, thus making them the standard of the image signals. Also, the timing that the CPU 502 checks the white reference may be set either immediately after the installation of the scanner head 200, immediately before reading a source document, or in the way of reading the source document.

The embodiment represented in FIG. 15 to FIG. 18 relates to an ink jet recording apparatus capable of discriminating the contaminated condition of the white reference by comparing a plurality of white references whose degrees of contamination are different with the arrangement of the white references that provide the standard of the reading level of an optically reading means on the traveling path of a carrier facing such reading means.

Figure 15:
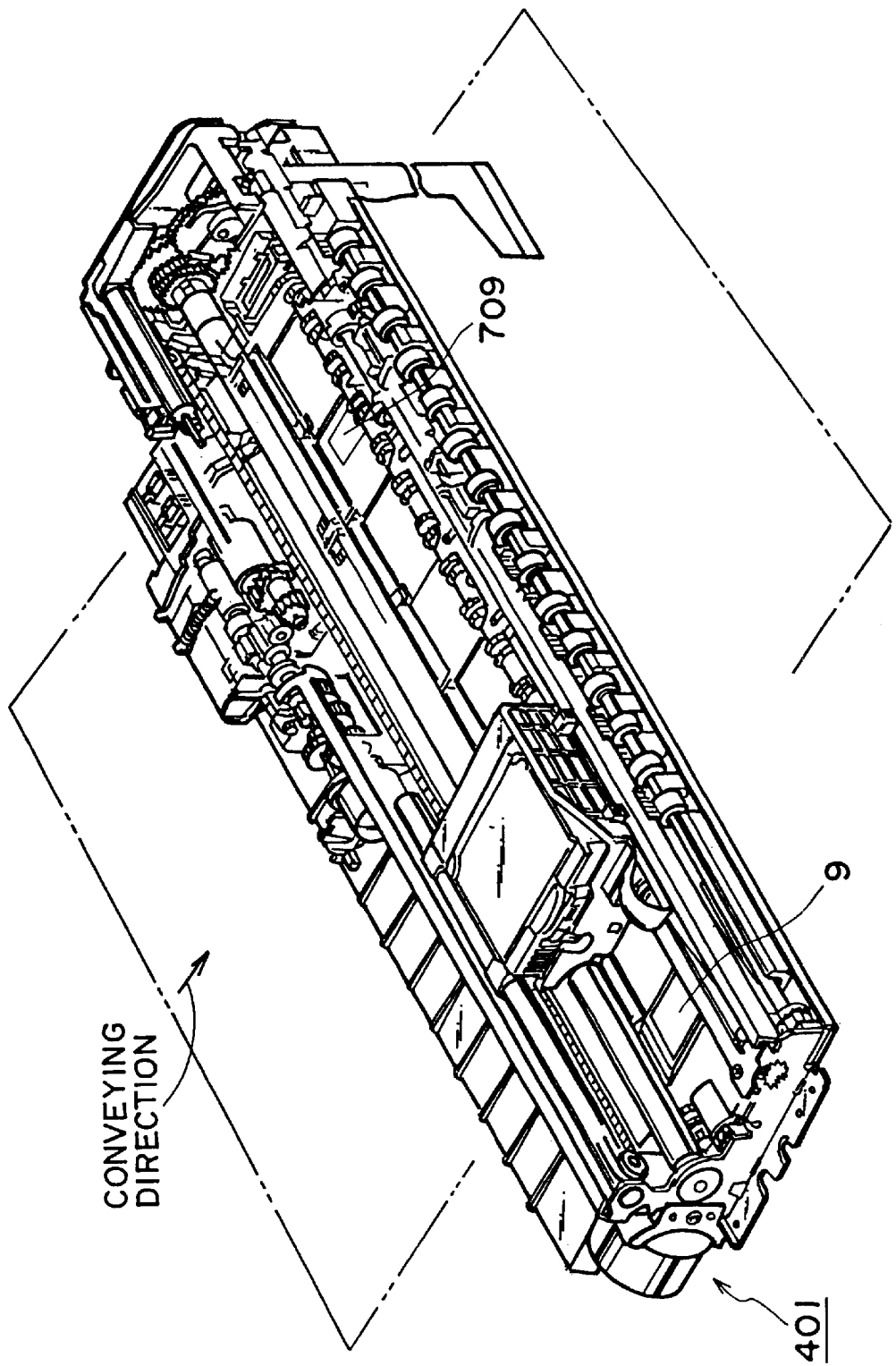
FIG. 15 is a perspective view which schematically shows another embodiment regarding the installation of the white reference member of an ink jet recording apparatus in accordance with the present invention.

As shown in FIG. 15, a white reference 9 that indicates the brightness standard is arranged outside the printing area for the purpose of dealing with the deterioration due to age that changes the levels of the reading sensor and the illumination lamp, while the white reference 709 is arranged within the printing area.

In the ink jet recording apparatus shown in FIG. 15, most of the discharged ink adheres to a recording sheet, but an extremely small amount thereof becomes mist, and floats in the vicinity of the recording head 1. Therefore, when the apparatus is used for a long time, it also adheres to the interior of the recording apparatus. The white reference 9 arranged outside the printing area also changes its white standard level due to the adhesion of such mist.

However, the white reference 709 arranged within the printing area is located on the lower side of a recording sheet P. As a result, the possibility is smaller that this white reference will be contaminated by ink mist. Therefore, by comparing the levels of the white reference 9 and the white reference 709, it is determined whether or not there is any contamination brought about by ink mist. Then, if the white reference 9 is found darker than a predetermined value, an indication is made to promote the cleaning of the white reference.

Meanwhile, although extremely limited, there are some cases when printing is erroneously conducted by an ink jet recording apparatus on the platen 14 without the presence of any recording sheet because of a malfunction resulting from paper jamming or the like. In such case, the white reference 709 is also stained. However, the other white reference 9 is arranged outside the printing area. Therefore, no printing is made on it at that time. Thus, if the white reference 709 is found to be darker than a predetermined value after comparing the levels of the white reference 9 and white reference 709, it is interpreted that printing is conducted on the platen. Then, an indication is made to promote the cleaning of the white reference.

Figure 16A:
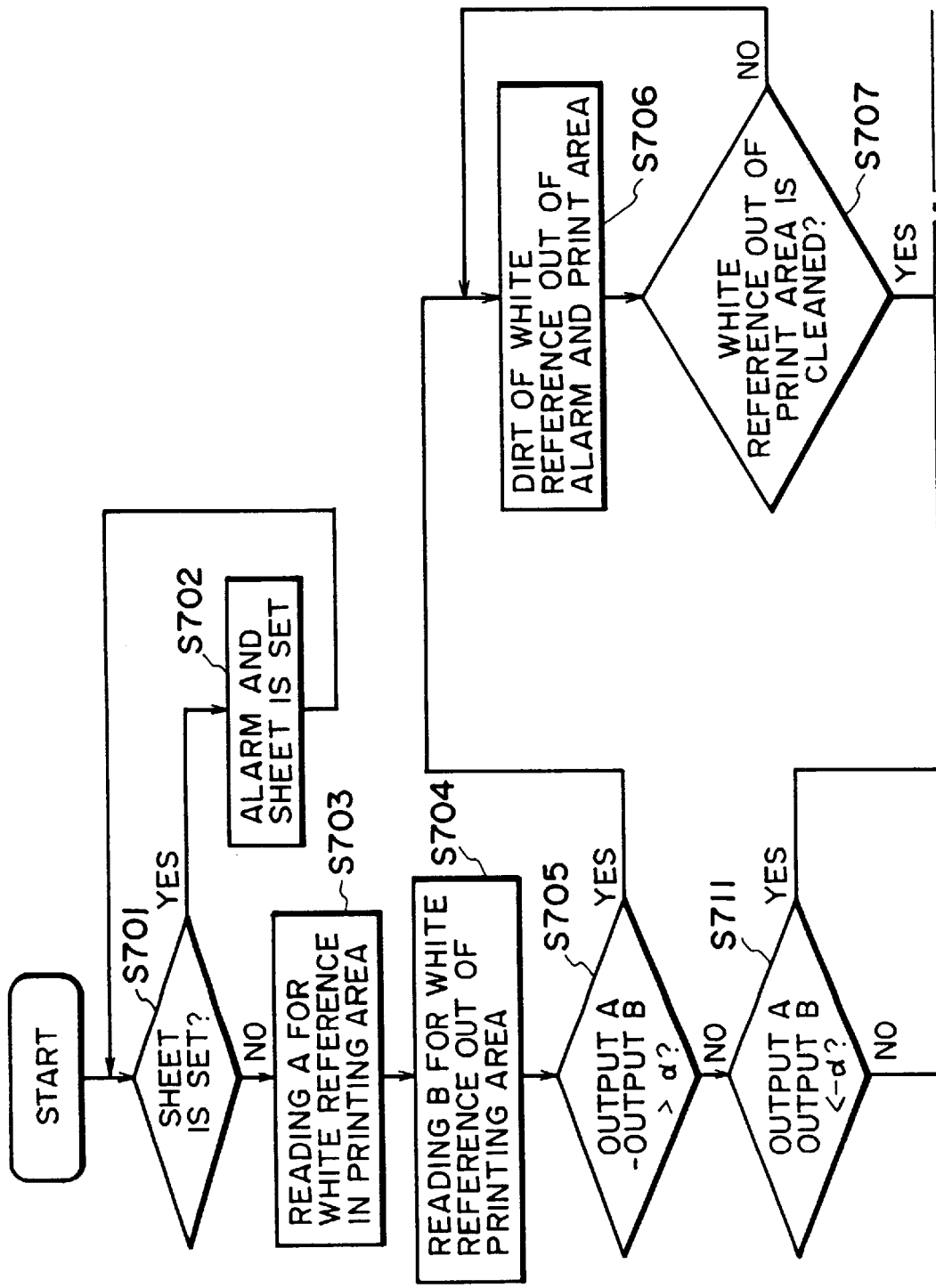
FIG. 16, which is comprised of FIGS. 16A and 16B, is a flowchart which shows the control operation to discriminate the contamination of the white reference member.

FIGS. 16A and 16B are flowcharts showing a control operation to discriminate the contaminated degrees of each of the white references described above.

At first, as shown in FIGS. 16A and 16B, if a recording sheet is found to be set in the printing area in step S701, an alarm is given (step S702). In the step S701, if no sheet is found to be set, the carrier having the scanner unit installed on it is caused to scan over the entire traveling range in order to detect the contamination of the white references, and read each of the white references arranged in and out of the printing area (steps S703 and S704).

Then, in step S705, if the difference between the read-out output A and the read-out output B is found to be greater than the setting value α, it is interpreted that the white reference outside the printing area is stained. Then an alarm is activated (step S706) until it is decided (step S707) that the white reference outside the printing area is to be cleaned.

In step S707, it is decided that the cleaning is carried out, and then, the white reference outside the printing area is cleaned (in step S708). After that, it is determined whether or not the cleaning is completed when a set period of time has elapsed (step S709). When the cleaning is completed, the process will return to the usual standby mode (step S710).

On the other hand, if the difference between the read-out output A and the read-out output B is not greater than the setting value α, and the difference between the read-out output A and the read-out output B is found to be smaller than the setting value −α in step S711, it is interpreted that the white reference in the printing area is stained, and the alarm is activated (step S712) until it is decided that the white reference in the printing area should be cleaned (step S713). After that, the process is executed in the same manner as the aforesaid steps S708 to S710. Here, the levels of the white reference 9 and the white reference 709 are compared, and if the white reference 709 is found to be darker than the predetermined value, it is interpreted that printing is conducted on the platen erroneously, thus indicating to prompt the cleaning of this white reference.

In accordance with the present embodiment, the white references are arranged in the locations in and out of the printing area as described above. Thus, it is possible to discriminate the degrees of the contamination of the white references even if the reading levels of the sensor changes.

Figure 17:
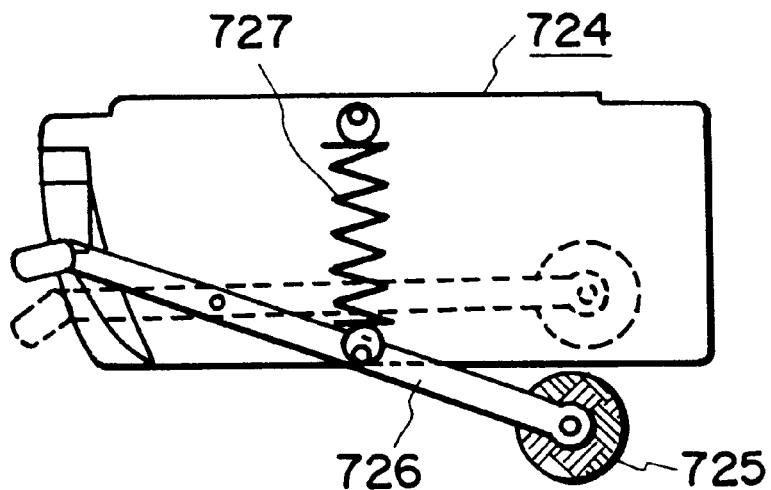
FIG. 17 is a side view which schematically shows another embodiment of a platen cleaning cartridge in accordance with the embodiment represented in FIG. 15.

FIG. 17 is a side view which schematically shows a cartridge for cleaning the platen.

In FIG. 17, the platen cleaning cartridge 724 is used by exchanging it with the head cartridge. On the portion corresponding to the printing unit of the head cartridge, a cleaning member formed by sponge or some other ink absorbent is arranged. The cleaning member 725 is supported by a lever 726, and by means of a spring 727, it is biased so that it can be retained in the cleaning cartridge. The other end of the lever 726 is arranged to be pressed by the side wall of the carrier when the cartridge is installed on the carrier. In this respect, if the cleaning member 725 is not installed on the carrier, this member is fittingly retained in the cartridge, and when the cartridge is installed on the carrier, the cleaning member 725 appears in a given position.

If it is determined that two white references should be cleaned, an indication is made to prompt the user to install the cleaning cartridge in place of the head cartridge of a recording apparatus.

The recording apparatus main body is arranged to discriminate the installation of the cleaning cartridge 724 in order to effectuate the cleaning mode. In the cleaning mode, the carrier is driven to reciprocate several times in the main scanning direction for wiping off ink adhering to the platen. In this mode, the scanning is conducted only within the printing area for the protection of the cap, which is arranged on the platen side and used for capping the printing unit of the recording head.

Figure 18:
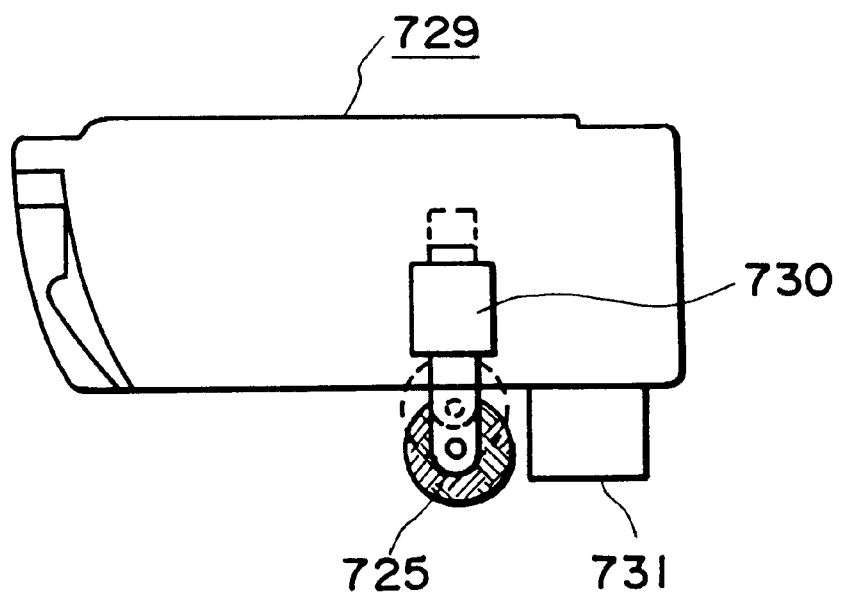
FIG. 18 is a side view which schematically shows still another embodiment of an image reading cartridge in accordance with the embodiment represented in FIG. 15.

FIG. 18 is a side view which schematically shows another embodiment of the image reading cartridge in accordance with the embodiment represented in FIG. 17.

As shown in FIG. 18, the image reading cartridge 729 is integrally formed with a platen cleaning member 725.

The cleaning member 725 is installed in the vicinity of the image reading sensor 731, and the leading end thereof ascends or descends due to the functioning of a solenoid.

Since the platen cleaning device is integrally provided for the image reading device, it is possible to clean the platen automatically if there is no sheet on the platen when determining the contaminated degree of the white reference. Here, even when a sheet is still set on the printer, it is possible to clean the platen immediately if the only indication to that effect is shown to prompt the operator to remove the sheet.

In accordance with the present embodiment, the recording apparatus can record on a recording sheet by means of the recording head cartridge 1, and also, read a source document by means of the scanner head 200 as described above. Therefore, it is to be understood in the description given below that unless the description is limited only to recording, the term "recording sheet 22" is meant to include a source document.

Now, with reference to FIG. 1, FIG. 20, and FIG. 21, an automatic sheet feeder 100 will be described. In FIG. 1, the automatic sheet feeder 100 is fixed on the upstream side of the sheet feed roller 6 in the conveying direction of a recording sheet 22.

Figure 20:
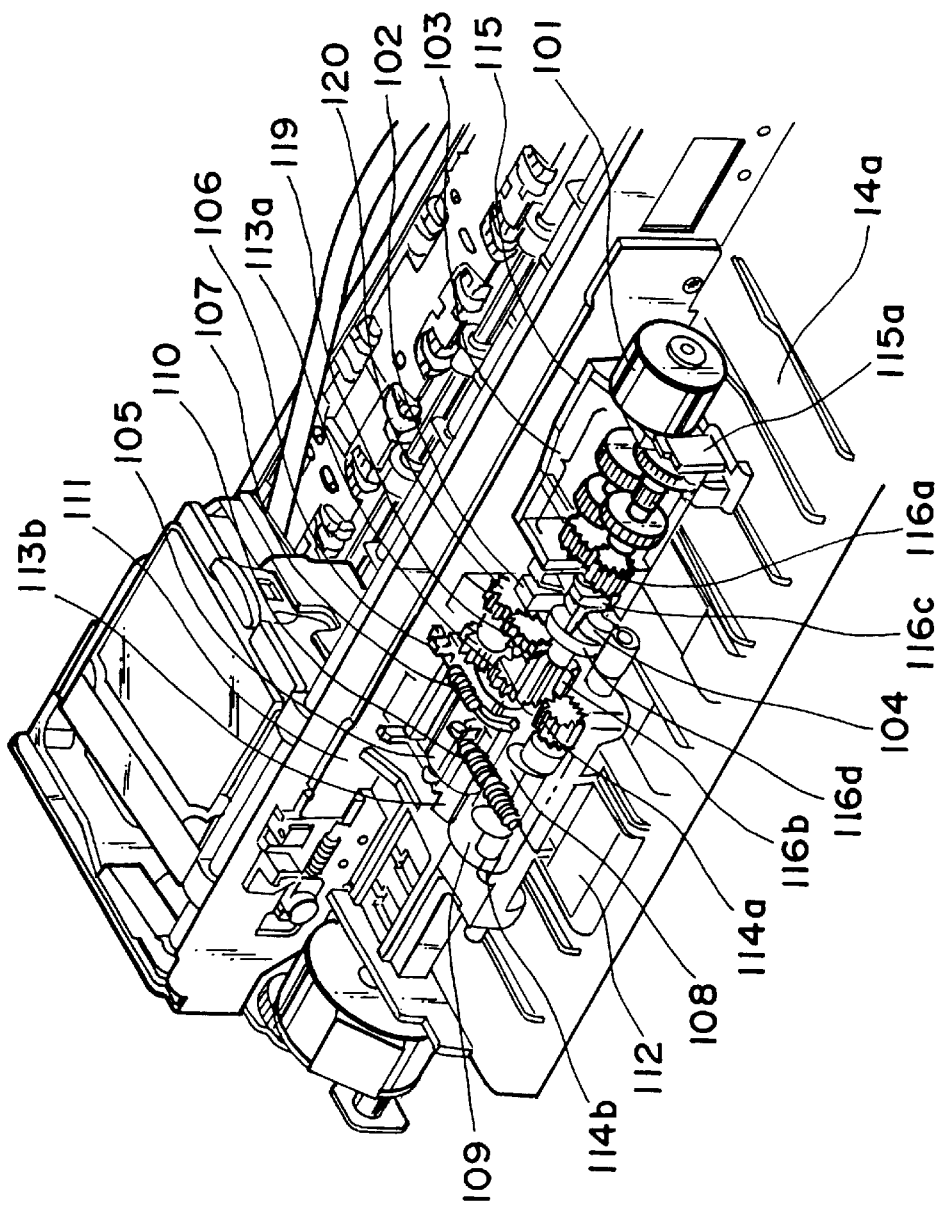
FIG. 20 is a perspective view which schematically shows one embodiment of the automatic sheet feeder of an ink jet recording apparatus in accordance with the present invention.
Figure 21A:
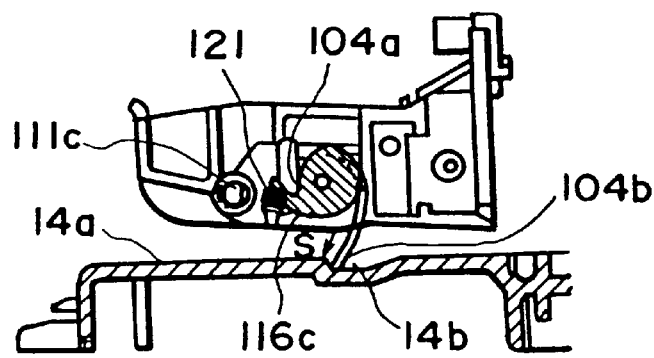
FIGS. 21(A–D) are side views which describe the operation of one embodiment of the automatic sheet feeder of an ink jet recording apparatus in accordance with the present invention.
Figure 21B:
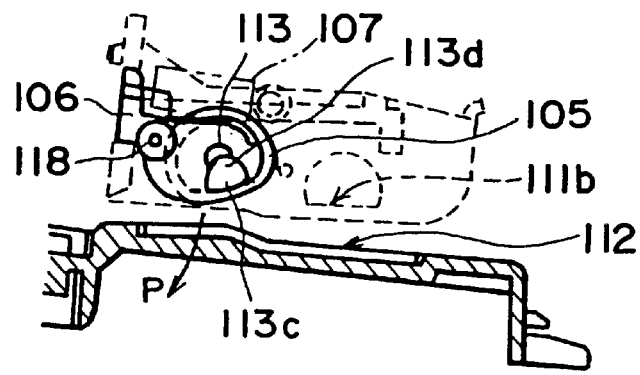
Figure 21C:
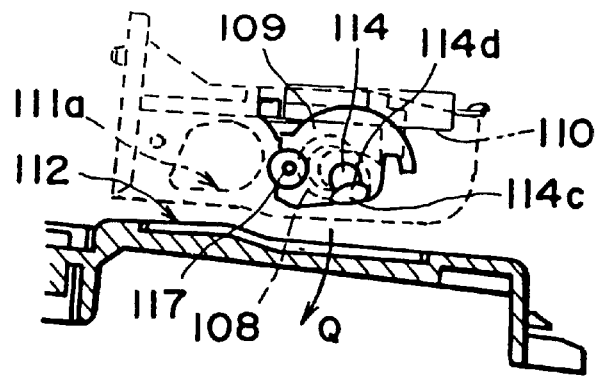
Figure 21D:
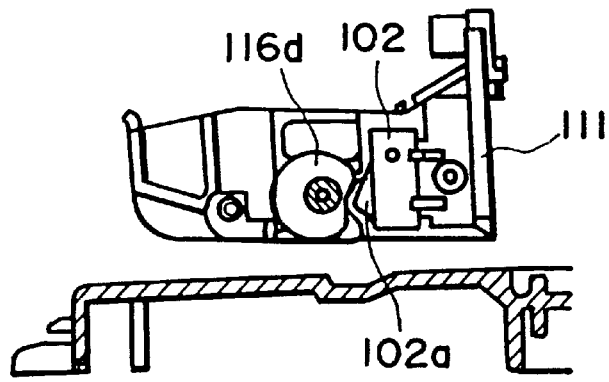
Figure 22A:
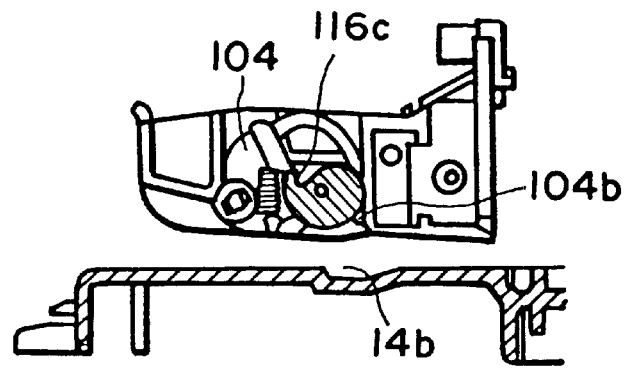
FIGS. 22(A–D) are side views which describe the operation of one embodiment of the automatic sheet feeder of an ink jet recording apparatus in accordance with the present invention.
Figure 22B:
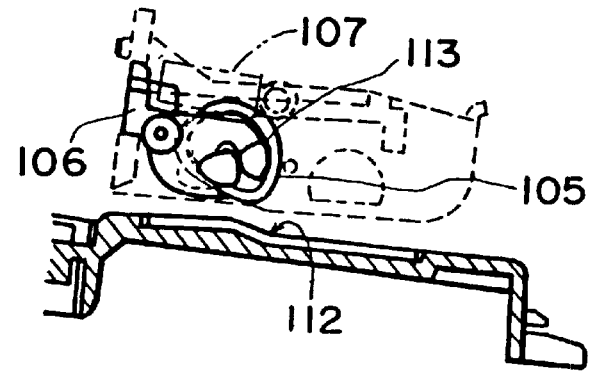
Figure 22C:
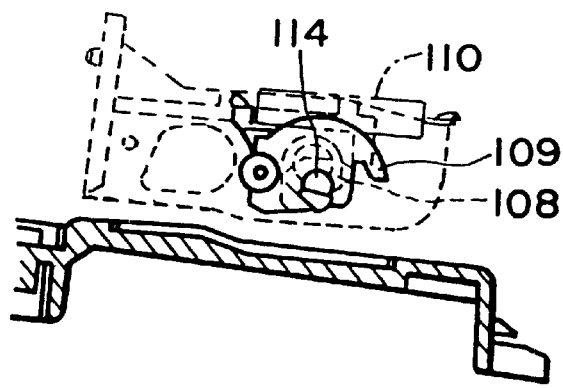
Figure 22D:
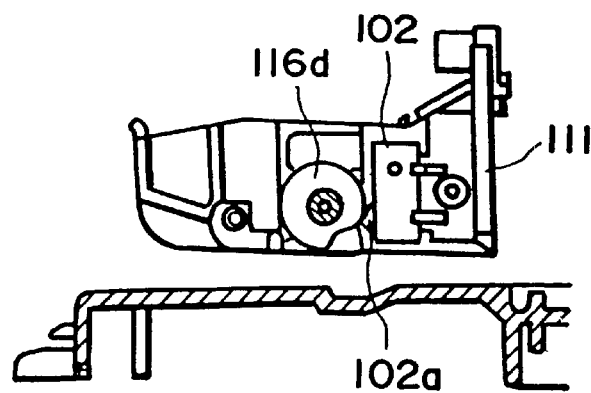
Figure 23A:
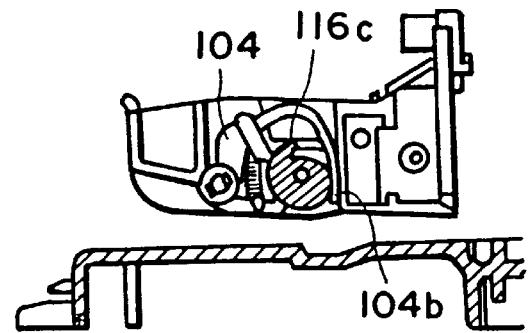
FIGS. 23(A–D) are side views which describe the operation of one embodiment of the automatic sheet feeder of an ink jet recording apparatus in accordance with the present invention.
Figure 23B:
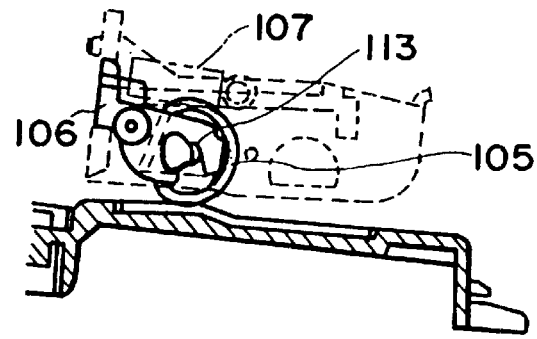
Figure 23C:
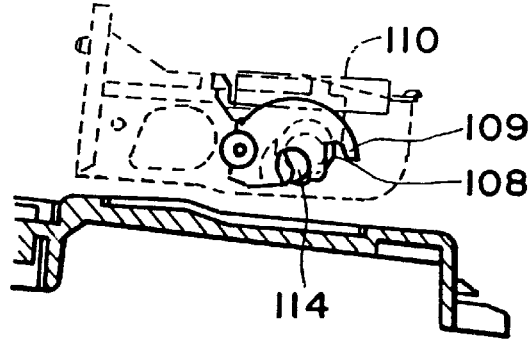
Figure 23D:
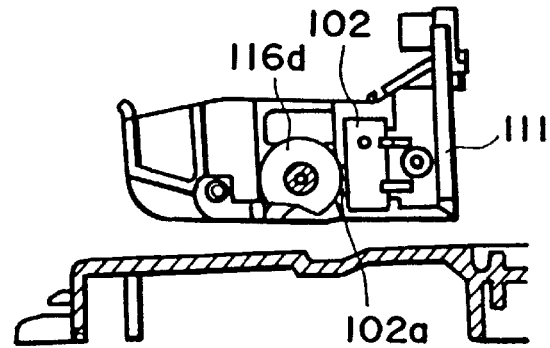
Figure 24A:
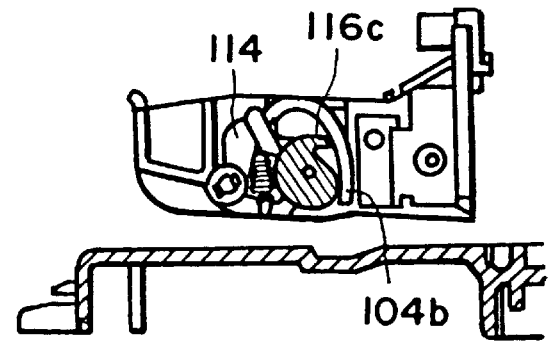
FIGS. 24(A–D) are side views which describe the operation of one embodiment of the automatic sheet feeder of an ink jet recording apparatus in accordance with the present invention.
Figure 24B:
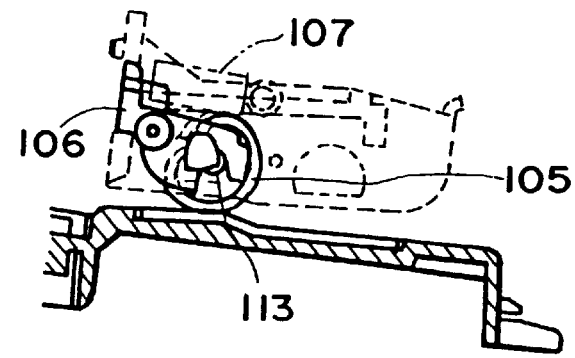
Figure 24C:
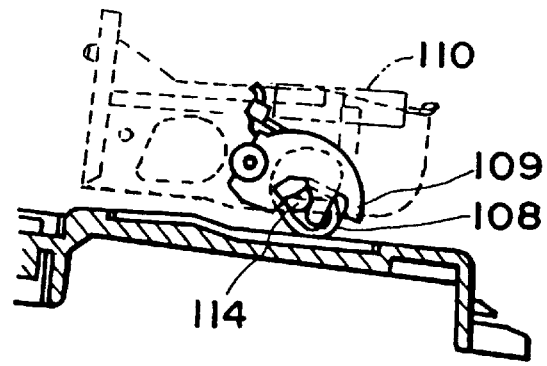
Figure 24D:
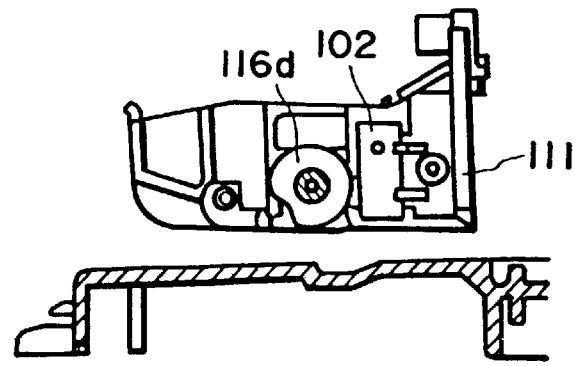
Figure 25A:
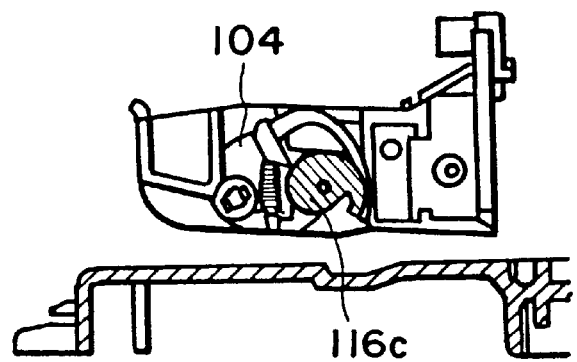
FIGS. 25(A–D) are side views which describe the operation of one embodiment of the automatic sheet feeder of an ink jet recording apparatus in accordance with the present invention.
Figure 25B:
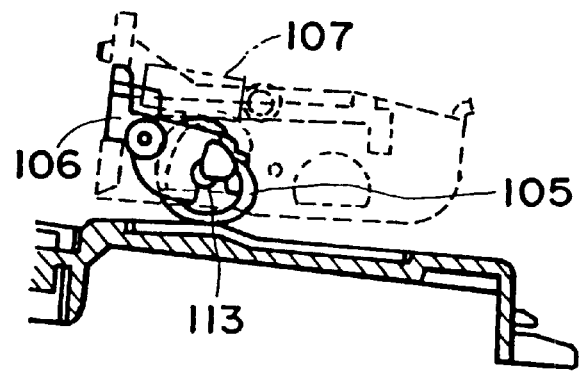
Figure 25C:
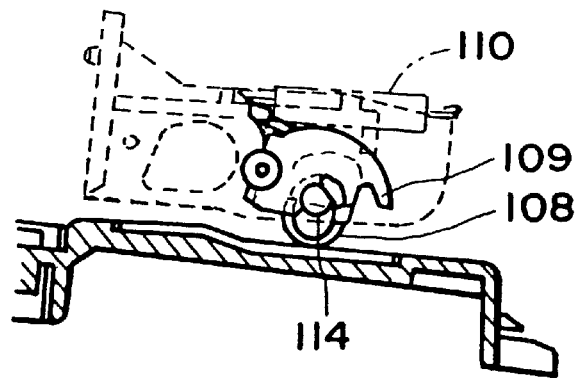
Figure 25D:
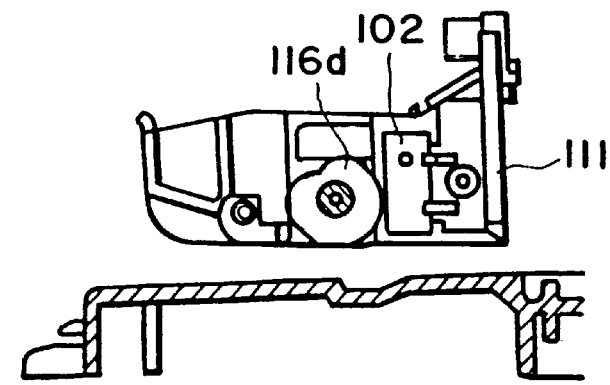

FIG. 20 is a perspective view which shows the automatic sheet feeder 100 of a recording apparatus represented in FIG. 1, observed in the sheet conveying direction. Also, FIGS. 21(A) to (D) are cross-sectional views of the automatic sheet feeder 100 represented in FIG. 20; FIG. 21(A) is a cross-sectional view of a sheet stopper unit; FIG. 21(B) is a cross-sectional view of a separation roller unit; and FIG. 21(C) is a cross-sectional view of a preliminary roller unit; and FIG. 21(D) is a cross-sectional view of a sheet feeding initial sensor unit. Here, in FIGS. 21(A) and (D), upstream of the conveying direction of the recording sheet 22 is shown on the left-hand side, and in FIGS. 21(B) and (C), upstream of the conveying direction of the recording sheet 22 is shown on the right-hand side.

A main holder 111 is fixed on the ink jet recording apparatus to support all the components of the automatic sheet feeder 100. The recording sheets 22 are stacked on a sheet feeding guide unit 14a of the base 14.

A cylindrical rubber separation roller 105, which separates the recording sheets 22 one by one and feeds each sheet to the contact surface of a sheet feeding roller 6 and a pinch roller 7 (hereinafter referred to as "sheet feeding inlet"), is press fitted over a separation roller shaft 113 formed integrally with a gear portion 113a and cam 113b. The separation roller 105 and the separation roller shaft 113 can rotate together.

The separation roller shaft 113 is rotatively supported by a separation roller holder 106. The separation roller holder 106 is axially and rotatively supported by a separation roller shaft 118 supported by the main holder 111. For the separation roller holder 106, a spring hook is provided, and between the hook and the main holder 111, a separation roller spring 107 is tensioned. The separation roller holder 106 is then biased in the direction indicated by an arrow P in (B) in FIG. 21.

The outer circumference of the cam 113b of the separation roller shaft 113 abuts upon the cam receiver 111a of the separation roller shaft to regulate the rotation of the separation roller holder 106 in the direction indicated by the arrow P.

When the maximum cam radius portion 113c of the separation roller shaft 113 abuts upon the cam receiver 111a of the separation roller shaft, the separation roller 105 is in a position parting from the separating sheets 112 to form a supply path between the separation roller 105 and the separating sheet 112. When the minimum cam radius portion 113d of the separation roller shaft 113 abuts upon the cam receiver 111a of the separation roller shaft, the separation roller 105 is able to be in contact with the separating sheet 112. At this juncture, if a recording sheet 22 is present between the separation roller 105 and separating sheet 112, it is possible to feed the recording sheet 22 to the sheet feeding inlet of the recording apparatus. The cylindrical rubber preliminary roller 108 feeds the top sheet of several recording sheets 22 stacked on the sheet guide unit 14a to the separation roller 105. The preliminary roller is press fitted over a preliminary roller shaft 114 formed integrally with a gear unit 114a and cam 114. The preliminary roller 108 and the preliminary roller shaft 114 can rotate together.

The preliminary roller shaft 114 is rotatively supported by a preliminary roller holder 109. The preliminary holder 109 is axially and rotatively supported by the main shaft 117 supported by the main holder 111. For the preliminary roller holder 109, a spring hook is provided, and between the hook and the main holder 111, a preliminary roller spring 110 is tensioned. The preliminary roller holder 109 is then biased in the direction indicated by an arrow Q in (C) in FIG. 21.

The outer circumference of the cam 114b of the preliminary roller shaft 114 abuts upon the cam receiver 111b of the preliminary roller shaft to regulate the rotation of the preliminary roller holder 109 in the direction indicated by the arrow Q.

When the maximum cam radius portion 114c of the preliminary roller shaft 114 abuts upon the cam receiver 111b of the preliminary roller shaft, the preliminary roller 108 is in a position parting from the separating sheet 112 to form a supply path between the preliminary roller 108 and separating sheet 112. When the minimum cam radius portion 114d of the preliminary roller shaft 114 abuts upon the cam receiver 111b of the preliminary roller shaft, the preliminary roller 108 is able to be in contact with the separating sheet 112. At this juncture, if a recording sheet 22 is present between the preliminary roller 108 and separating sheet 112, it is possible to feed the recording sheet 22 to the sheet feeding inlet of the recording apparatus.

A motor pinion (not shown) is installed on the leading end of the output shaft of an automatic sheet feeding motor 101, and fixed when engaging with the nail 115a of a gear box 115 that houses a speed reduction gear train 103 formed by a plurality of two staged gear trains. The automatic sheet feeding motor 101 is a pulse motor to be bipolar driven with two phased excitation, which completes one cycle by twenty steps. Also, the ratio of the total gears of speed reduction is approximately 1:74 from the automatic sheet feeding motor 101 to the driving gear 116. The driving force of the automatic sheet feeding motor 101, which is transmitted through the speed reduction gear train 103, is transmitted to the gear portion 114a of the preliminary roller shaft 114 via a driving gear mechanism. On both ends of the driving gear mechanism, gear units 116a and 116b are provided, and the driving force from the automatic sheet feeding motor 101 is transmitted to the gear unit 116a, while the transmission of the driving force to the gear unit 114a of the preliminary roller shaft 114 is conducted by means of the gear unit 116b. The gear ratio between the gear unit 116b and the gear unit 114a of the preliminary roller shaft is 1:1. When the driving gear mechanism completes one rotation, the preliminary roller shaft 114 also completes one rotation. Further, the gear unit 116b of the driving gear mechanism also transmits the driving force to the gear unit 113a of the separation roller shaft 113 through a separation idle gear 119 and a separation double gear 120. Then, the gear ratio between the gear unit 116b of the driving gear mechanism and the gear unit 113a of the separation roller shaft 13 is 1:1 as in the case of the gear unit 114a of the preliminary roller shaft 114. When the driving gear mechanism completes one rotation, the separation roller shaft 113 also completes one rotation.

When the separation roller 105 and the preliminary roller 108 are both in the positions where these rollers do not abut upon the separating sheets 112 (hereinafter referred to as "non-operative position"; also, the position where these rollers are in contact with the separating sheet 112 is referred to as "operative position"), a sheet topper 104 defines the leading position of a recording sheet 22 at the time that the operator sets the recording sheet 22. This stopper engages with the sheet topper shaft 111c of the main holder 111. By means of a sheet stopper spring 121, the stopper is biased in the direction indicated by an arrow S in FIG. 21(A).

The driving gear mechanism is provided with a sheet stopper cam 116c. On a portion of the sheet stopper 104 that faces the sheet stopper cam 116c, a cam unit 104a is formed. Usually, the cam unit 104a and the sheet stopper cam 116c are not in contact with each other in its initial positions. At this juncture, the leading end 104b of the sheet stopper 104 is inserted into the sheet stopper hole 14b of the sheet guide unit 14a on the base 14 arranged in the lower part of the automatic sheet feeder 100. The structure is arranged so that the recording sheet 22 is not allowed to advance beyond the sheet stopper 104.

Also, the leading end 104b of the sheet stopper 104 forms a circular shape centering on the sheet stopper shaft 111c of the main holder 111. This configuration is provided in order to prevent the sheet stopper 104 from being subjected to the floating force exerted by the advancing force of the recording sheet 22. Further, when the driving gear mechanism rotates, the supply path is formed by the gap created between the sheet guide unit 14a of the base 14 and the sheet stopper 104 as shown in FIG. 14A while the sheet stopper cam 116c lifts the cam unit 104a of the sheet stopper. Here, in the sheet stopper 104, the position where the leading end 104b enters the sheet stopper hole 14b is referred to as "non-operative position", while the position where the gap is created between the sheet stopper and the sheet guide 14a is referred to as "operative position".

Now, a description will be provided of the detection of the initial position (home position) of the automatic sheet feeder 100. As shown in FIG. 20 and FIG. 21(D), in a location on the driving gear mechanism that faces the detection unit 102a of the sheet feed initial sensor 102, the initial position detection cam 116d is arranged. This initial position detection cam 116d causes the sheet feed initial sensor 102 to output an ON signal when the initial position detection cam 116d parts once round from the detection unit 102a of the sheet feed initial sensor 102. Also, the structure is arranged so that the sheet feed initial sensor 102 is caused to output an OFF signal when the initial position detection cam 116 depresses the detection unit 102a. On the basis of the ON (OFF) signal from the sheet feeding initial sensor 102, the initial position (home position) of the automatic sheet feeder 100 is detected.

Figure 26:
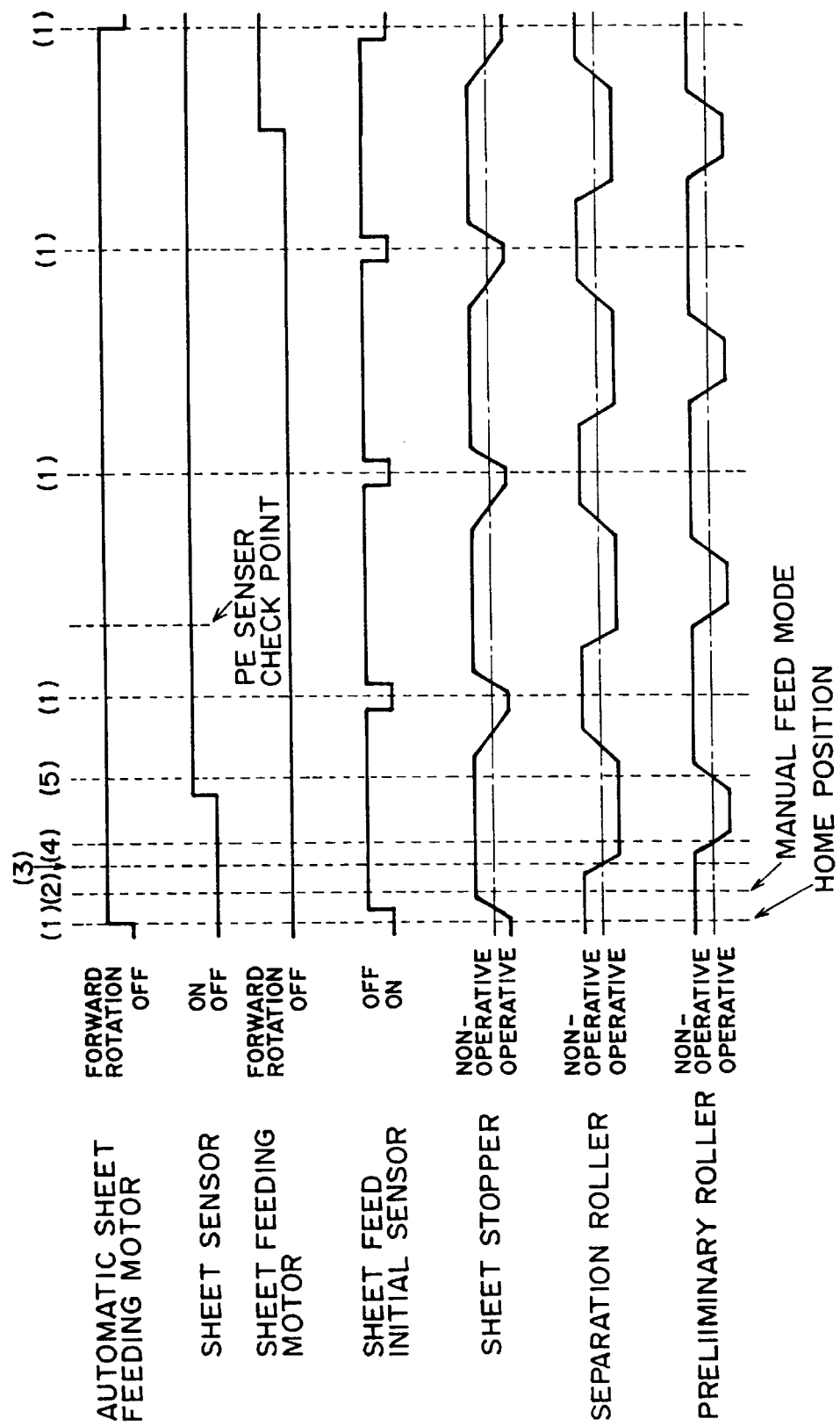
FIG. 26 is a timing chart which describes the operation of one embodiment of the automatic sheet feeder of an ink jet recording apparatus in accordance with the present invention.

Now, the series of the operation of the automatic sheet feeder 100 structured as above will be described with reference to FIG. 21 to FIG. 26. FIGS. 21 to 25 are views showing the operations of the parts shown in FIG. 21 as time elapses. FIG. 26 is a timing chart of each element.

The operation of the automatic sheet feeder 100 is divided into an automatic sheet feeding mode where the recording sheets 22 stacked on the sheet guide unit 14a is separated one by one for feeding, and a manual insertion mode where the operator himself directly supplies a recording sheet 22 into the sheet inlet for feeding. At first, the automatic sheet feeding mode will be described.

<Automatic Sheet Feeding Mode>

FIGS. 21(A)–(D) show the condition in the home position before any recording sheet 22 is set. At this juncture, each element of the automatic sheet feeder 100 is in the state at (1) in FIG. 26.

(A) The sheet topper 104 is inserted into the sheet stopper hole 14b of the sheet guide unit 14a of the base 14. Therefore, the leading end of the recording sheets 22 stacked on the sheet guide unit 14a is positioned by the sheet stopper 104.

(B) The maximum radius portion 113c of the cam of the cam unit 113b of the separation roller shaft 113 abuts upon the cam receiver 111a of the separation shaft, and the separation roller 105 in the non-operative position.

(C) The maximum radius portion 114c of the cam of the cam unit 114b of the preliminary roller shaft 114 abuts upon the cam receiver 111b of the preliminary roller shaft, and the preliminary roller 108 is in the non-operative position as the separation roller 105.

(D) The initial position detection cam 116d of the driving gear mechanism parts from the detection unit 102a of the sheet initial sensor 102. Thus, an ON signal is output from sheet initial sensor 102.

FIG. 22 shows the state that the automatic sheet feeding motor 101 starts its rotation, and the driving gear mechanism rotates at approximately 43 degrees from the home position. This is also the initial position of the manual insertion mode. At this juncture, each element of the automatic sheet feeder 100 is at the state (2) in FIG. 26.

(A) The sheet stopper 104 is retracted from the sheet stopper hole 14b of the sheet guide unit 14a of the base 14 and is in the non-operative position, and forms the supply path between the stopper and the sheet guide unit 14a.

(B) The separation roller 105 is still in the non-operative position.

(C) The preliminary roller 108 is also in the non-operative position.

(D) The initial position detection cam 116d of the driving gear mechanism rotates to depress the detection unit 102 of the sheet initial sensor 102. Thus the OFF signal is output from the sheet initial sensor 102.

FIG. 23 shows the state that the automatic sheet feeding motor 101 further rotates to cause the driving gear mechanism to rotate at approximately 93 degrees from the home position. At this juncture, each element of the automatic sheet feeder 100 is at the state (3) in FIG. 26.

(A) The sheet stopper 104 is in the non-operative position as described above.

(B) The separation roller 105 abuts upon the sheet 112 to be separated on the sheet guide unit 14a preceding the preliminary roller 108, and is in the operative position.

(C) The preliminary roller 108 is still in the non-operative position. The recording sheet 22 is still in the initial position and yet to be conveyed. The reason why the separation roller 105 is placed in the operative position earlier is that the separation mechanism of the separation unit is set definitely before the feeding of the recording sheet 22 takes place by means of the preliminary roller 105 so as to avoid any overlapped feeding of the recording sheets 22.

(D) The initial position detection cam 116d of the driving gear mechanism depresses the detection unit 102a of the sheet initial sensor 102 as described above to cause the sheet initial sensor 102 to output the OFF signal.

FIG. 24 shows the state that the automatic sheet feeder 100 further rotates, and the driving gear mechanism rotates at approximately 129 degrees from the home position. At this juncture, the automatic sheet feeder 100 is at the state (4) in FIG. 26.

(A) The sheet stopper 104 is in the non-operative position as described above.

(B) The separation roller 104 is in the non-operative position as described above.

(C) The preliminary roller 108 is in the operative position as described above. The feeding of the recording sheet 22 begins. When a plurality of recording sheets 22 are present on the separating sheet 112, the friction coefficient between the preliminary roller 108 and the recording sheet 22 is greater than the friction coefficient between the recording sheets 22. Therefore, only the recording sheet 22 on the top thereof begins to be fed. Also, the friction coefficient between the separating sheet 112 and the recording sheet 22 is greater than the friction coefficient between the recording sheets 22. Therefore, there is no possibility that a plurality of recording sheets 22 are fed at a time. Here, provided that:

the friction coefficient between the preliminary roller 108 and the recording sheet 22 is denoted by $\mu y$, the friction coefficient between the recording sheets is denoted by $\mu k$, and the friction coefficient between the recording sheet 22 and the separating sheet is noted by $\mu mb$, the relationship between them is:

$$\mu y > \mu k > \mu mb$$

(D) The initial position detection cam 116d of the driving mechanism depresses the detection unit 102a of the sheet initial sensor 102 as described above to cause the sheet initial sensor 102 to output an OFF signal.

FIG. 25 shows the state that the automatic sheet feeding 101 further rotates, and the driving gear mechanism rotates at approximately 233 degrees. At this juncture, each element of the automatic sheet feeder 100 is at the state (5) in FIG. 26.

(A) The sheet topper 104 is in the non-operative position as described above.

(B) The separation roller 105 is in the operative position as described above. The recording sheet 22 is beyond the separating portion, and being fed by means of the separation roller 105 toward the sheet inlet of the recording apparatus.

(C) The preliminary roller 108 begins to be in the non-operative position. The reason why the preliminary roller 108 is brought to be in the non-operative position earlier is the same as the description referring to the state shown in FIG. 23. The preliminary roller 108 is placed in the non-operative position earlier so that before the separation mechanism of the separation unit is released, the preliminary roller 108 is suspended to feed the recording sheet 22, thus avoiding any overlapping feed of recording sheets 22.

(D) The initial position detection cam 116d of the driving gear mechanism depresses the detection unit 102a of the sheet initial sensor 102 to cause the sensor 102 to output an OFF signal as described above.

After that, the process returns to the state shown in FIG. 21 to complete the one cycle of the operation. The apparatus of the present invention is small. The diameters of the separation roller 105 and the preliminary roller 108 is small, accordingly. As a result, the cycle operation is not sufficient to bring the recording sheet 22 to the sheet inlet. Usually, it is required to perform a four-cycle feeding for the purpose.

Also, the sheet sensor 25 (see FIG. 1) arranged in the vicinity of the sheet inlet detects whether or not the recording sheet 22 has been fed normally toward the sheet inlet. When the presence of the recording sheet is detected at the time of the driving gear mechanism having rotated at approximately 115 degrees from the initial position that is the second-cycle state between those represented in FIG. 22 and FIG. 23. Then, the automatic sheet feeding motor 101 is further driven at two cycles +78 degrees. From that position, the sheet feeding mechanism of the recording apparatus is actuated in cooperation with the automatic sheet feeder 100.

This operation is needed for aligning the leading end of the recording sheets 22 (removing resist), and also, the feeding is performed while pressing in the recording sheet 22 by means of the automatic sheet feeder 100. In this way, biting of the recording sheet 22 into the recording apparatus is effectuated in a better condition. At this juncture, the feeding speed of the automatic sheet feeder 100 is set substantially equal to that of the recording apparatus side. In this respect, depending on the kinds of the recording sheet 22, there are some cases that the recording sheet 22 is not carried to the position of the sheet sensor 25 even in the second cycle of the operation. Therefore, in accordance with the present invention, the detection is made by the sheet sensor until the fourth cycle thereof.

After the recording sheet 22 has been fed into the recording apparatus side, the operation of the automatic sheet feeder 100 returns to the initial state represented in FIG. 21.

<Manual Insertion Mode>

Until the position described above in conjunction with FIG. 22, the automatic sheet feeding motor 101 is caused to rotate, and then, to stop in that position. Since the separation roller 105, preliminary roller 108, and sheet stopper 104 are in the non-operative position, the operator can insert the desired sheet into or withdraw it from the sheet inlet of the recording apparatus directly.

This mode is used for the thick sheet that the automatic sheet feeder cannot handle for feeding, for example.

Figure 41:
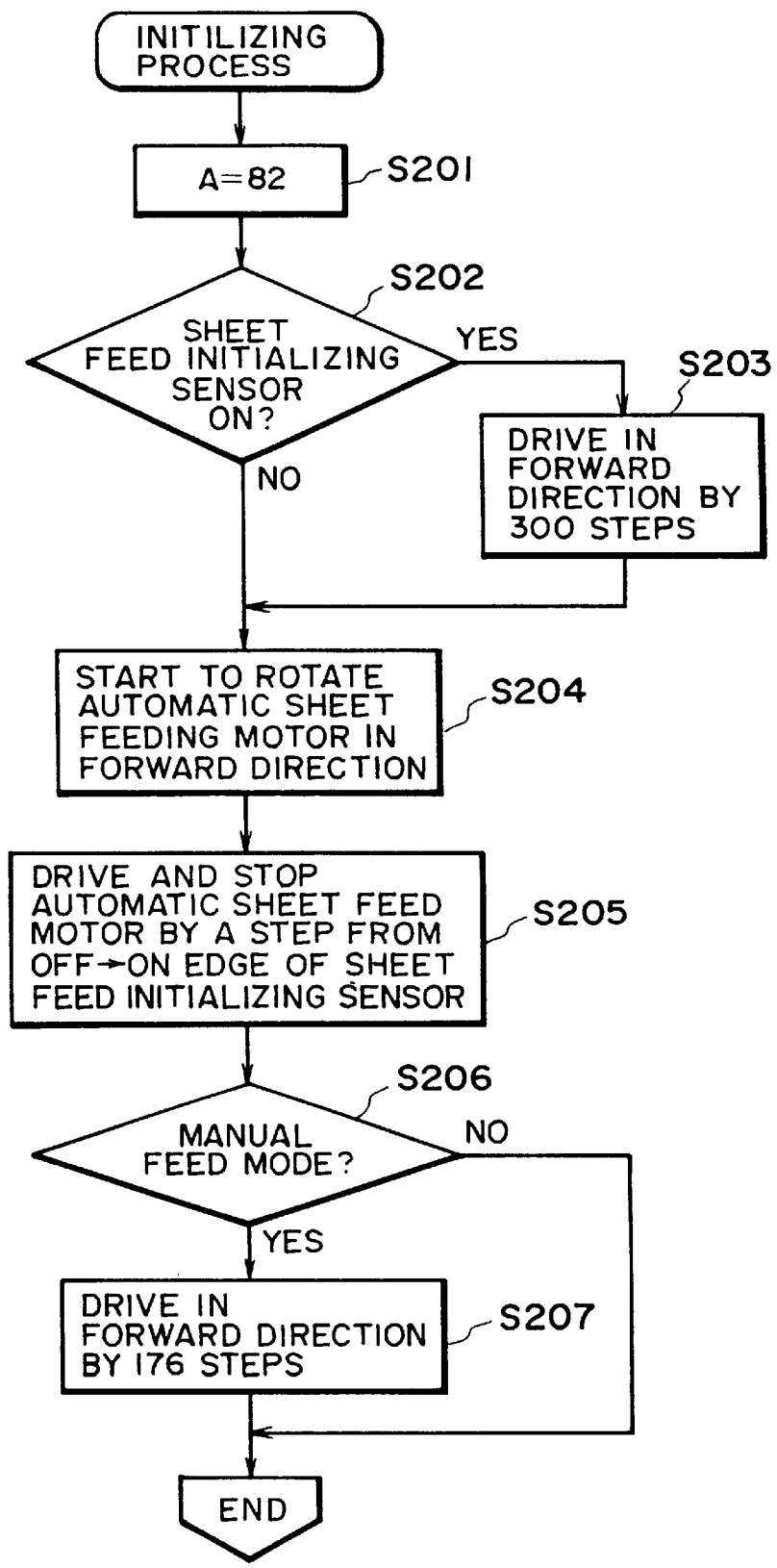
FIG. 41 is a flowchart which shows the initial operation of the automatic sheet feeding unit of an information processing apparatus incorporating therein an ink jet recording apparatus in accordance with the present invention.
Figure 45:
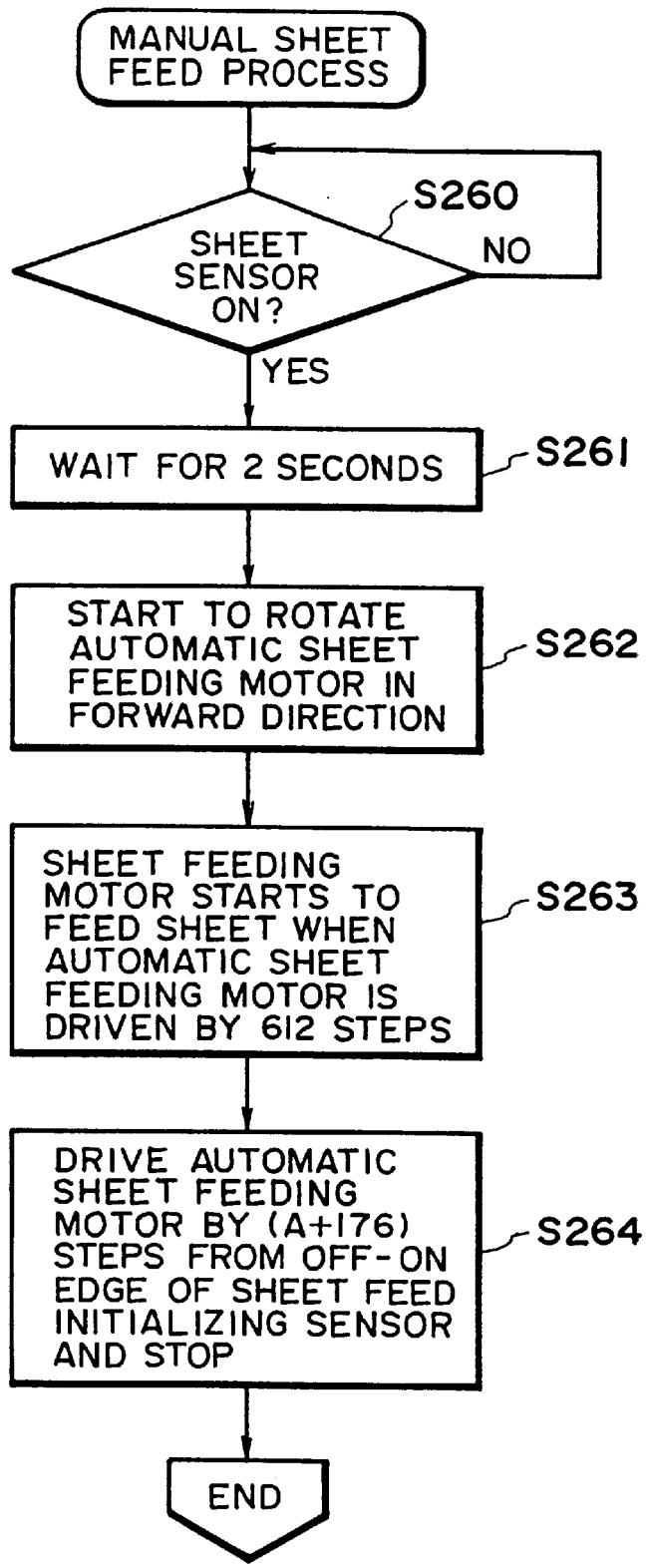
FIG. 45 is a flowchart which shows the manual sheet feeding operation for the automatic sheet feeding unit of an information processing apparatus incorporating therein an ink jet recording apparatus in accordance with the present invention.
Figure 46:
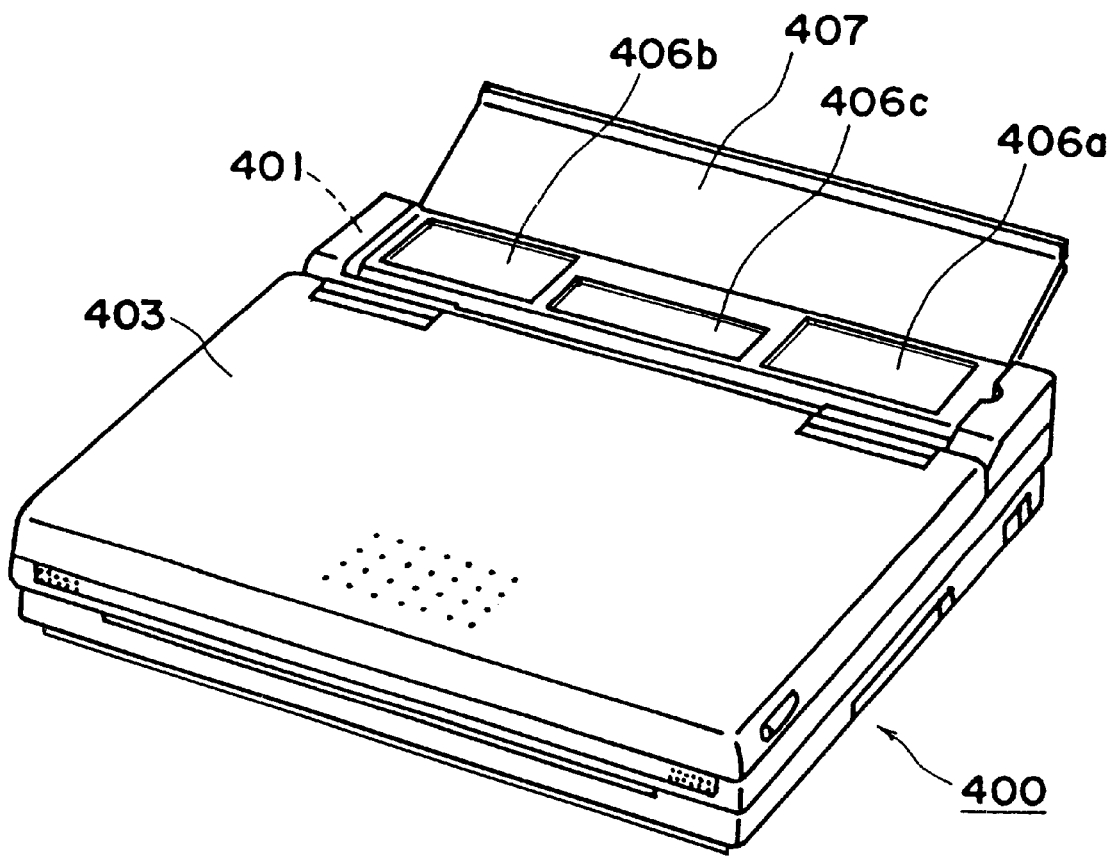
FIG. 46 is a perspective view which schematically shows the apertures of the housing of an information processing apparatus provided with the conventional ink jet recording apparatus.

Now, with reference to the flowcharts shown in FIG. 41 to FIG. to FIG. 45, a description will be provided of the control sequence of the automatic sheet feeder structured as described above.

FIG. 41 is a flowchart illustrating the process of the initial operation of the automatic sheet feeder at the time of the power-supply being ON for a recording apparatus or an information processing apparatus.

When the initialization of the automatic sheet feeder begins in step S201, a value equivalent to A=82 steps is set and stored in the initial step storage area in RAM as an initial value. This value serves to be a value that enables the automatic sheet feeder to be driven for a number of steps required from the OFF to ON edge (ON edge) of the sheet initial sensor 102 to the home position.

Then, in S202, it is determined whether or not the sheet initial sensor 102 is ON.

At this juncture, if the sheet initial sensor is ON, the automatic sheet feeding motor is driven for 300 steps in S203 in order to turn off the sheet initial sensor, and then, the process proceeds to the next step S204.

Also, if the sheet initial sensor is OFF, the process is assumed to proceed to S204 as it is.

In S204, the regular driving of the automatic sheet feeding motor 101 begins. In S205, the automatic sheet feeding motor is driven for the step numbers corresponding to the value A stored in the initial step storage area after the OFF to On edge of the sheet initial sensor 102 is detected, and then, the automatic sheet feeding motor is suspended. The process proceeds to S206.

In S206, it is determined whether the status is to designate the automatic sheet feeding mode or the manual insertion mode. If the mode is for the automatic sheet feeding, the initialization of the automatic sheet feeder is completed.

If the mode is found to be the manual insertion in the S206, the process proceeds to S207.

In S207, the automatic sheet feeding motor is driven for 176 steps to change the status of each component in the automatic sheet feeder to be in the position to deal with the manual insertion mode. The automatic sheet feeding motor is suspended to complete the initialization of the automatic sheet feeder.

Figure 42:
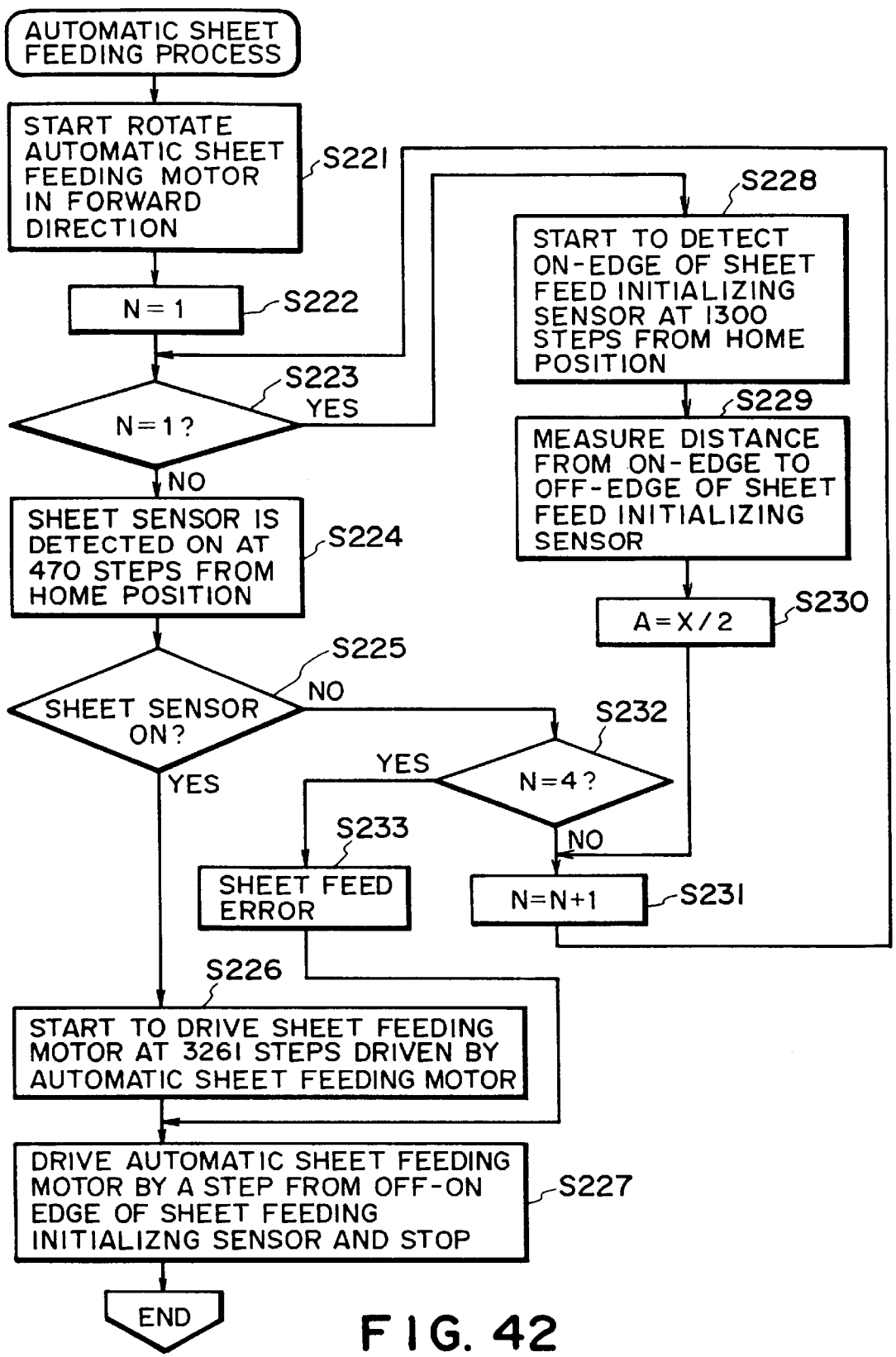
FIG. 42 is a flowchart which shows the feeding operation of the automatic sheet feeding unit of an information processing apparatus incorporating therein an ink jet recording apparatus in accordance with the present invention.

Now, FIG. 42 is a flowchart illustrating the process of the operation of the automatic sheet feeder until the driving of the sheet feeding motor starts in the automatic sheet feeding.

When a sheet feeding command is given in S221, the regular rotation of the automatic sheet feeding motor begins, and the automatic sheet feeding starts.

In S222, a value N=1 is set in the rotational number storage area in RAM as an initial value for determining the rotational numbers of the separation roller and preliminary roller. In the subsequent step S223, it is determined whether or not each of the rollers described above is in the first rotation after the automatic sheet feeding operation has begun.

In S223, if the rotation is found to be the first one, the process proceeds to S228. In S228, the detection of the OFF to ON edge of the sheet initial sensor begins at the position where the automatic sheet feeding motor is driven for 1,300 steps from the home position of the automatic sheet feeder in order to measure the area where the sheet initial sensor is ON at the time of the first rotational driving.

Then, in S229, the OFF to ON edge of the sheet initial sensor from the ON to OFF edge thereof is measured, and then, in the next S230, half a value of the OFF to ON edge of the sheet initial sensor to the ON to OFF edge therefore is stored in the initial step storage area. After that, the process proceeds to S231.

In S231, the content of the rotation number storage area is changed to 2 in order to prepare for the decision on entering the second rotation.

In S223, it is determined whether or not the driving of each of the rollers described above is in the first rotation. However, this time, the driving is in the second time. Therefore, it is determined that the driving is not in the first rotation. Then, the process proceeds to S224.

In S224, the ON detection of the sheet sensor 25 is conducted in the driving of the second rotation at the timing that the automatic sheet feeding motor is driven for 470 steps from the home position.

Then, in S225, if the sheet sensor is found to be ON, the process proceeds to S226 to start the driving of the sheet feeding motor when the automatic sheet feeding motor is driven for 3,261 steps.

Also, in 227, the automatic sheet feeding motor is driven for the portion of the value stored in the initial step storage area from the ON to OFF edge of the sheet initial sensor, and then, suspended. Thus, the sheet feeding operation is completed.

Also, in S225, if the sheet sensor is found to be OFF, the process proceeds to S232.

In S232, it is determined whether or not each of the rollers described above is driven to rotate four times.

At the time described above, each of the rollers has rotated two times. Therefore, the process proceeds to S231 to prepare for deciding on the third rotational driving, and the third rotational driving is performed and continues.

Then, in 223, it is again determined whether or not the driving is for the first rotation. However, since the driving is for the third rotation this time, the process proceeds to S224. In the third rotational driving, the ON detection of the sheet sensor is conducted in the location where the automatic sheet feeding motor is driven for 470 steps from the home position.

Then, in S225, if the sheet sensor is found to be ON, the process proceeds to S226. The same control as described above is conducted in S226 and S227.

Also, if the sheet sensor is found to be OFF in S225, the same control as described above in S232 is conducted. At the time as described above, each roller rotates three times. Therefore, the process proceeds to S231 to prepare for deciding on the fourth rotational driving, and the driving continues for the fourth rotation.

detection of the sheet sensor is conducted in the location where the automatic sheet feeding motor is driven for 470 steps from the home position.

Then, in S225, if the sheet sensor is found to be ON, the process proceeds to S226, and the same control as described above is conducted in S226 and S227.

Also, in S225, if the sheet sensor is found to be OFF, the process proceeds to S232.

This time, it is assumed that the sheet sensor is not ON even in the fourth rotational driving zone. As a result, the process proceeds to S233 to inform the user of the abnormal condition by indicating an error message on the display, sounding the buzzer, or the like. After that, the process proceeds to S227 to conduct the same control as described above in S227, thus terminating the process.

Figure 43:
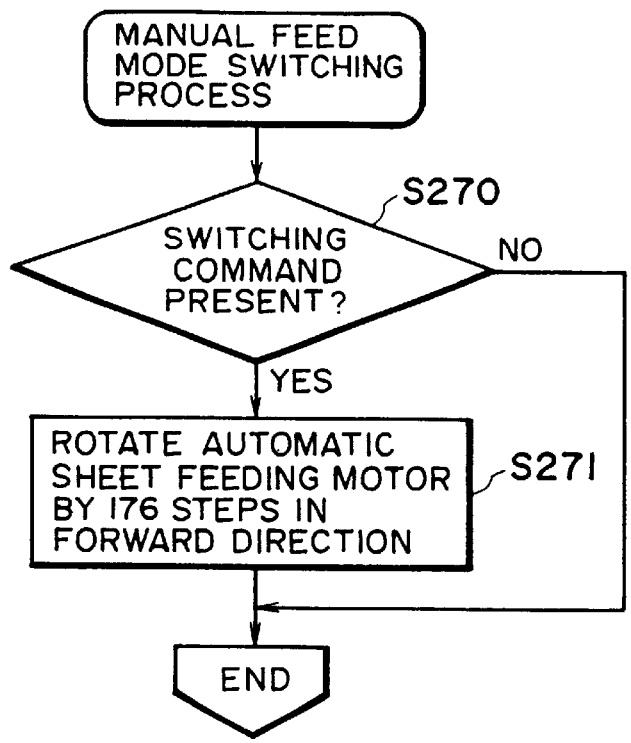
FIG. 43 is a flowchart which shows the operation of changing over from the automatic sheet feeding mode to the manual one for the automatic sheet feeding unit of an information processing apparatus incorporating therein an ink jet recording apparatus in accordance with the present invention.

Now, FIG. 43 is a flowchart illustrating the process of the operation of the automatic sheet feeder when the automatic sheet feeding mode is switched over to the manual insertion mode.

At first, in S270, it is determined whether or not there is any command from an information processing apparatus serving as a host to request switching over from the automatic sheet feeding mode to the manual insertion mode. If affirmative, the process proceeds to S271 where the automatic sheet feeding motor is driven regularly for 176 steps to complete the switching over from the automatic sheet feeding mode to the manual insertion mode. Also, in S270, if there is no command from the information processing apparatus serving as the host to request switching over from the automatic sheet feeding mode to the manual insertion mode, the process terminates as in the current status.

Figure 44:
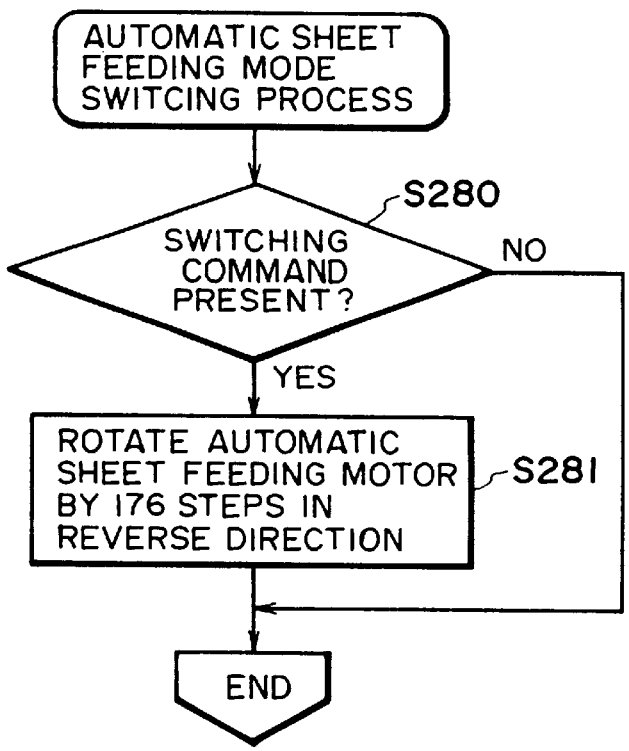
FIG. 44 is a flowchart which shows the operation of changing over from the manual sheet feeding mode to an automatic one for the automatic sheet feeding unit of an information processing apparatus incorporating therein an ink jet recording apparatus in accordance with the present invention.

Here, FIG. 44 is a flowchart illustrating the process of the operation of the automatic sheet feeder when switching over from the manual insertion mode to the automatic sheet feeding mode.

At first, in S280, it is determined whether or not there is any command from an information processing apparatus serving as a host to request the switching over from the manual insertion mode to the automatic sheet feeding mode. If affirmative, the process proceeds to S281, where the automatic sheet feeding motor is reversely driven for 176 steps, thus completing the switching over process from the manual insertion mode to the automatic sheet feeding mode. Also, in the S280, if there is no command from the information processing apparatus serving as the host to request any switching over from the manual insertion mode to the automatic sheet feeding mode, the process terminates as in the current status.

Now, the manual insertion feeding process will be described in conjunction with FIG. 45.

At the beginning, the operator causes the leading end of a recording sheet to pass below the automatic sheet feeder, and inserts that end into the sheet feeding inlet of the printer main body, thus allowing the leading end of the recording sheet to abut upon the sheet feeding roller and pinch roller to begin the manual insertion sheet feeding process.

Now, at first, in S250, it is determined whether or not there is any sheet feeding command by means of a key input or the like. If affirmative, the process proceeds to S251.

In the S251, the sheet sensor is found to be ON, the process proceeds to S252 where the automatic sheet feeding motor begins to be driven regularly. Then, in S253, when the automatic sheet feeding motor has been driven for 612 steps, the sheet feeding motor begins to be driven to bite the leading end of the sheet by means of the sheet feeding roller.

Also, in S254, the automatic sheet feeding motor is driven from the OFF to ON edge of the sheet feeding initial sensor for steps of a value A stored in the initial step storage area +176. After that, the motor is suspended to complete the manual insertion feeding operation.

Also, in S250, if there is no sheet feeding command by means of the key board input or the like, the process returns again to the S250 to wait for a sheet feeding command.

Further, in S251, the sheet sensor is found to be OFF, the process proceeds to S255 where an error process is executed to terminate the current process.

Now, a description will be provided of the outline of an information processing apparatus 400 in which a printer unit 401 embodying the present invention is incorporated.

Figure 27:
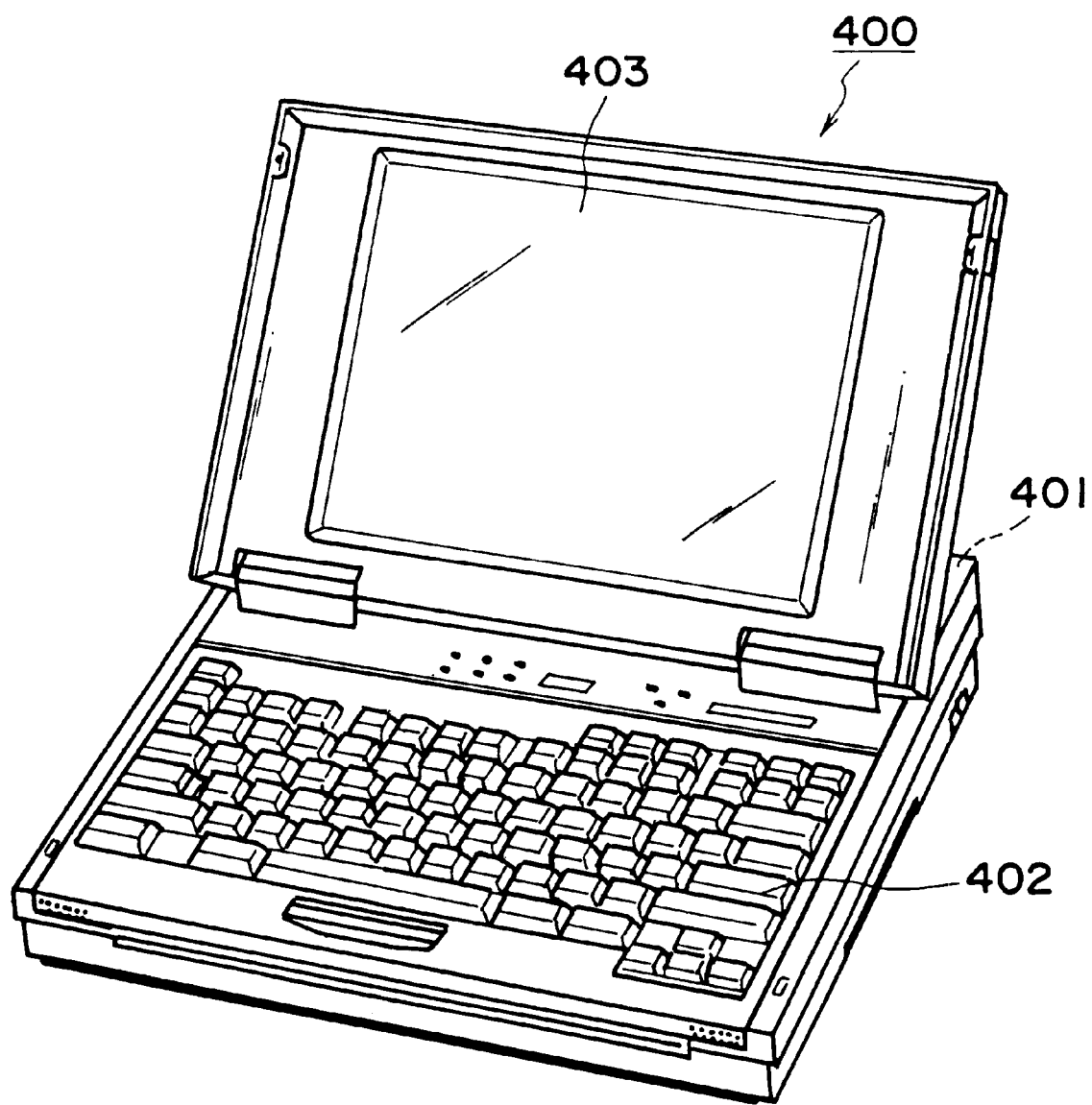
FIG. 27 is a perspective view which schematically shows a first state of an information processing apparatus incorporating therein one embodiment of an ink jet recording apparatus in accordance with the present invention.
Figure 28A:
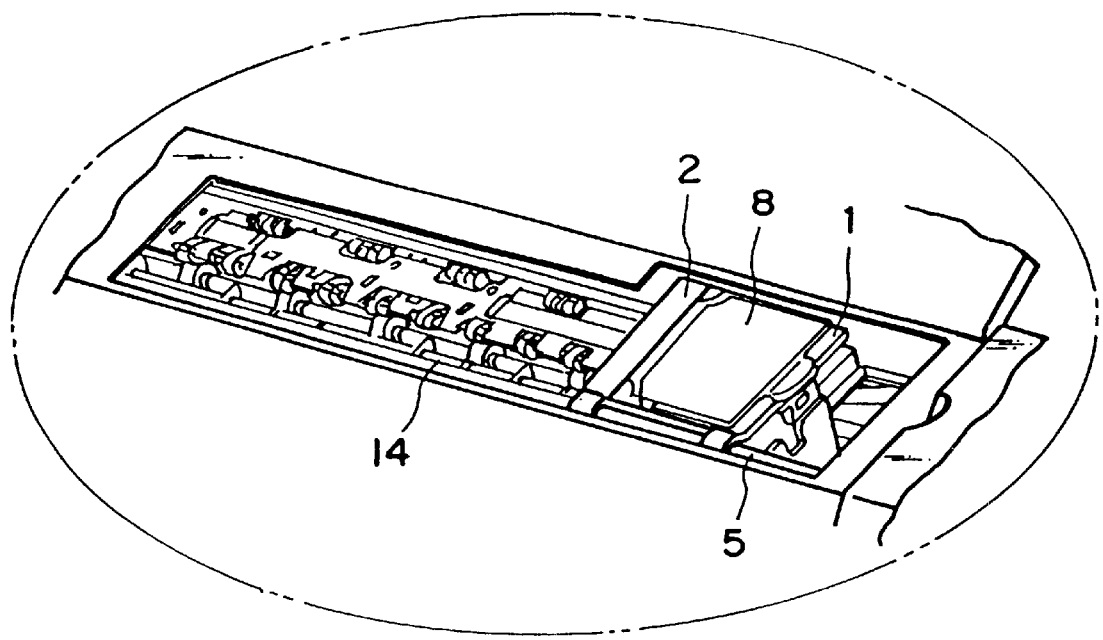
FIGS. 28(A–B) are perspective views which schematically show a second state of an information processing apparatus incorporating therein one embodiment of an ink jet recording apparatus in accordance with the present invention.
Figure 28B:
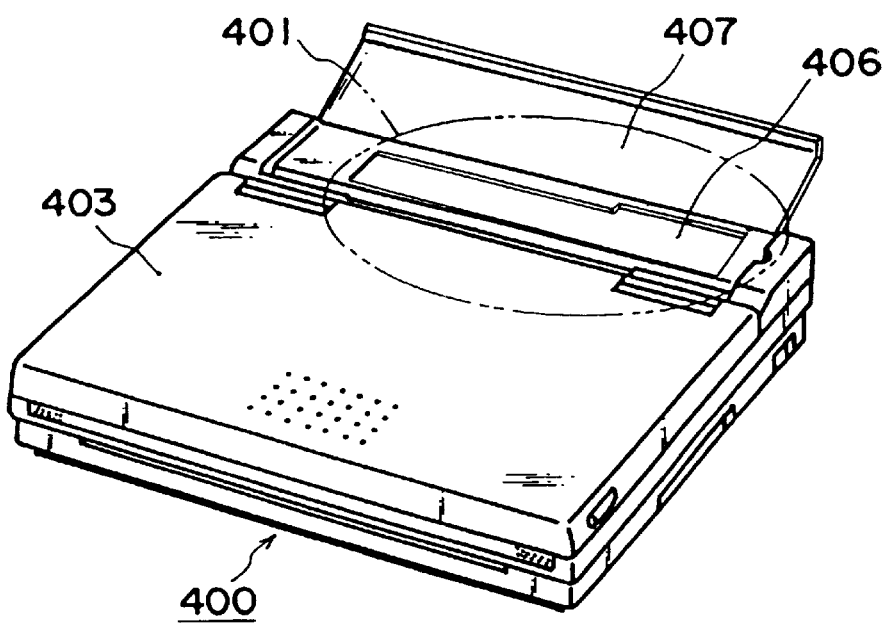

FIG. 27 and FIG. 28 are perspective views which schematically illustrate the outer appearance of the information processing apparatus 400. Also, FIG. 30 is a cross-sectional view which schematically shows the information processing apparatus 400, observed from its side. In FIGS. 27 to 30, a reference numeral 401 designates a printer unit; 402 denotes a key board unit provided with keys for inputting letters, numbers, and other characters, and the keys for inputting various commands; 403 denotes an indication unit provided with a display; 406 denotes a printer aperture arranged on the housing of the information processing apparatus 400 for operating the printer unit 401; 407 denotes a cover to close the printer aperture when no operation is needed for the printer unit 401; and 410 denotes an overlapped feeding preventive sheet provided for the information processing apparatus to avoid any overlapped feeding of the lowest sheet when a plurality of recording sheets are set and fed by an automatic sheet feeder 100.

Also, FIG. 27 illustrates the status of the information processing apparatus 400 where the indication unit 403 is able to execute its display, and the key board unit is ready for use. Further, FIG. 28 illustrates the status where the indication unit 403, which serves dually to be a protection cover of the main body of the information processing apparatus 400, is closed to be in a stored condition, while the printer cover 407 is open for operating the printer unit 401.

As shown in FIG. 30, the printer unit 401 is incorporated in the deepest location of the information processing apparatus, for example, but the direction in which it is installed enables the automatic sheet feeder 100 to be arranged on the key board unit 402 side, and the sheet exhausting roller 15 to be arranged on the trailing end side of the information processing apparatus 400. In other words, the conveying direction of a recording sheet is the one in which the sheet is inserted from the key board side of the information processing apparatus 400, and exhausted toward the rear side of the housing. Also, the sheet path is arranged to enable the sheet to pass the gap between the lower end of the key board unit 402 and the upper surface of the housing of the information processing apparatus 400, and to arrive at the printer unit 401.

Figure 29:
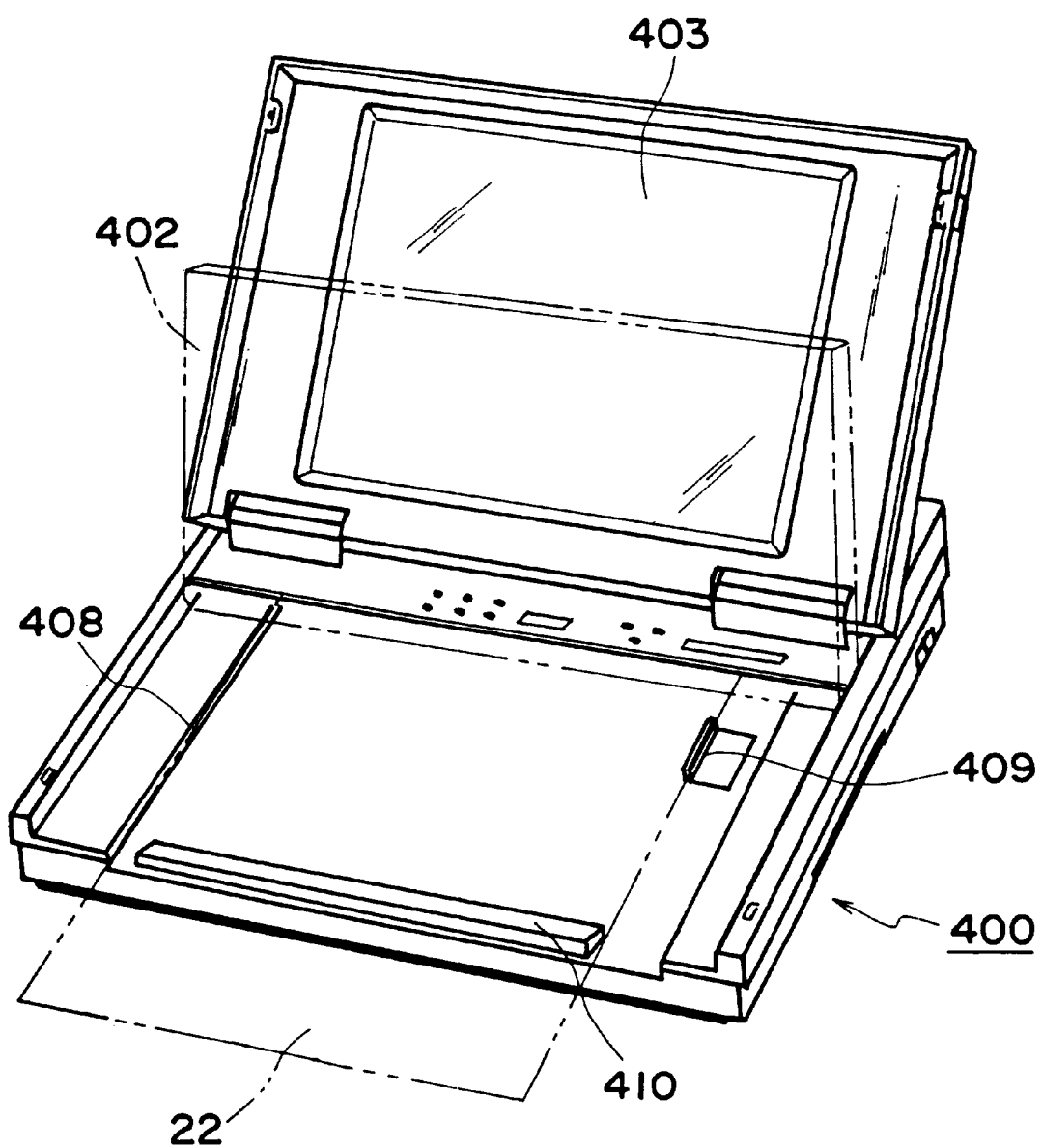
FIG. 29 is a perspective view which schematically shows a recording state by means of an information processing apparatus incorporating therein one embodiment of an ink jet recording apparatus in accordance with the present invention.
Figure 30:
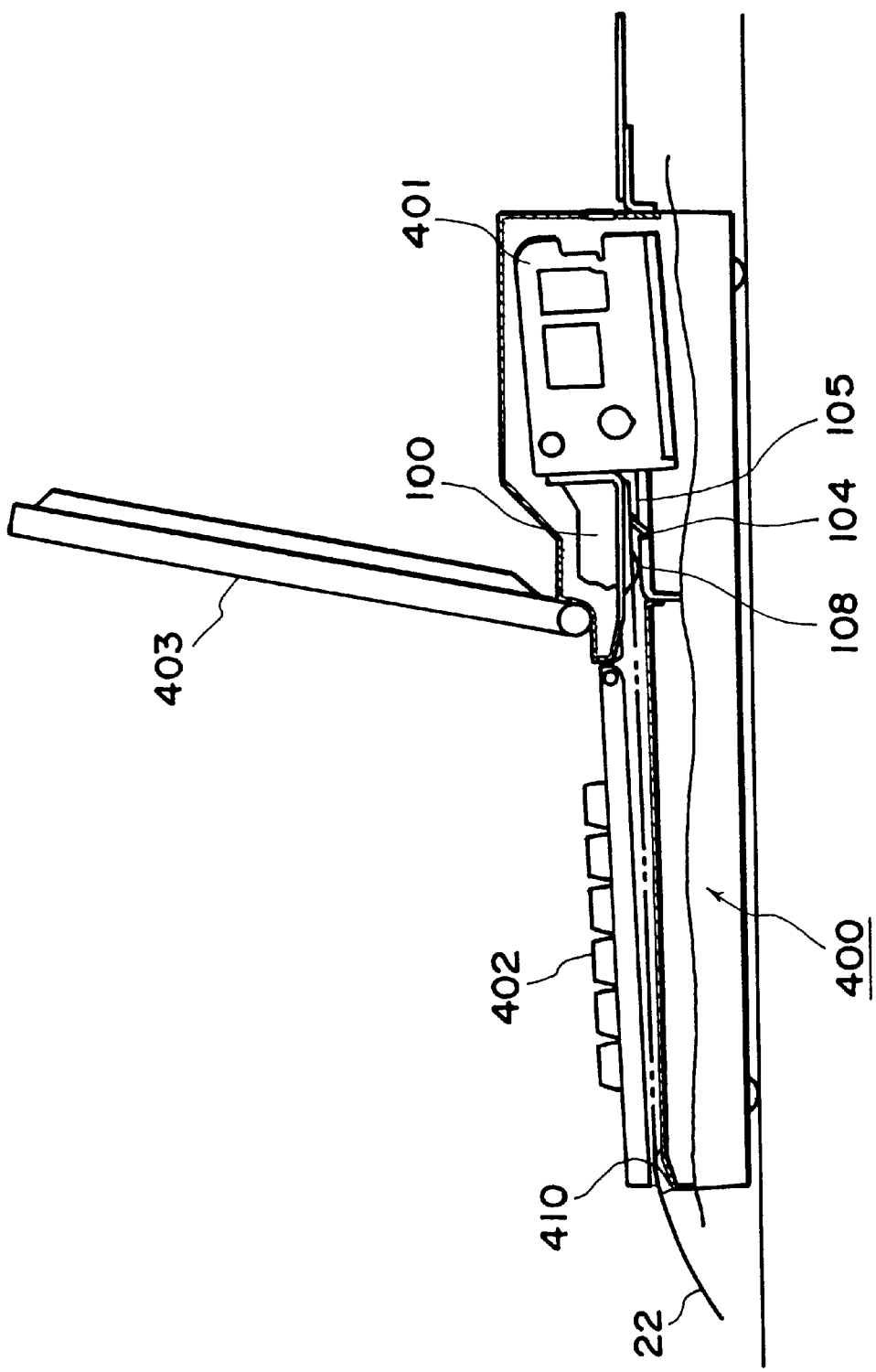
FIG. 30 is a sectional side view schematically showing an information processing apparatus incorporating therein one embodiment of an ink jet recording apparatus in accordance with the present invention.

FIG. 29 is a view which shows the state that a recording sheet 22 is set for the information processing apparatus 400. For the rear end of the key board unit shown in FIG. 27, that is, the side closer to the indication unit 403, a hinge (not shown) is provided, and the key board unit is structured to be rotative centering on this hinge. Usually, when the key board unit 402 is used, it is in the state shown in FIG. 27. When a recording sheet 22 is set, the front end of the key board unit 402 is lift to be rotated as shown in FIG. 29 to make it possible to facilitate setting of the recording sheet 22. At this juncture, it is also possible to fix the key board unit 402 in the released condition by use of a stopper (not shown).

After the recording sheet is set, it is possible to operate recording while the key board unit 402 is kept in the released condition or to operate recording after closing the key board unit 402 to be in the state shown in FIG. 27. In order to operate recording in the latter state, a sufficient gap is secured between the lower end of the key board 402 and the upper surface of the housing of the information processing apparatus so as not to hinder the movement of recording sheet 22 even if a plurality of recording sheets are stacked in such gap.

Also, the stacking portion for recording sheets 22 on the upper surface of the housing of the information processing apparatus 400 is provided with a guide member so that the recording sheets can be stacked in a given position at all times. For the present information processing apparatus, the left-hand side of the recording sheet is made a reference position at the time of recording operation. Therefore, when recording sheets are set, it is practiced to cause the recording sheets 22 to abut upon the sheet guide 408 on the left side, and then, shift the sheet guide 409 on the right side in the allowable range to match the width of the recording sheet. The guide on the right-hand side is arranged to be movable in the width direction of the recording sheet in accordance with the width of a recording sheet to be used. In this way, it is possible to feed recording sheets stably.

Now, a description will be provided of the procedures that the operator is required to take when the printer unit 401 should be operated from the outside.

The operation that the operator should conduct with respect to the printer unit 401 is conceivably as follows among some others:

first, he should remove an installed recording head cartridge 1, an ink tank 8, or a scanner head 200 from the carrier 2 or install each of them on the carrier as required;

second, he should clean the white reference 9 installed on the base 14 when it is contaminated for some reason;

third, he should remove from the printer unit 401 a recording sheet 22 if it has been jammed due to some cause, and the recording sheet 22 is left in the printer unit; and fourth, he should clean the base 14 if recording ink spreads for some cause over the location out of the area where the recording sheet 2 is present, and the base is stained.

In the first case, when the operator operates an exchange key (not shown), the carrier 2 is caused to move to the exchanging position (the carrier position in the enlargement surrounded by one-dot chain line in FIG. 28) by means shown in the flowchart which will be described later. In the exchanging position, the carrier 2 is positioned at the printer aperture 406 of the housing of the information processing apparatus 400. The printer aperture is configured so that the operator can touch the carrier directly by his fingers in this exchanging position. Hence, the operator can remove the recording head cartridge 1 or others from or install each of them on the carrier through the printer aperture 406.

On the contrary, when the carrier 2 is in the home position, it is not desirable to carry out any exchanging operation of the recording head cartridge 1 or others, because there is a possibility that the circumference of the ink discharge ports of the recording head cartridge 1 will be damaged at that time. Therefore, when the carrier 2 is in the home position, the printer aperture 406 is closed so that no operator can touch the carrier 2 directly by his hand.

In the second case, the operator conducts the required operation when the carrier 2 is in the home position. The white reference 9 of the printer unit 401 of the present embodiment is installed in the vicinity of the exchanging position, which is on the side opposite to the home position in the scanning range of the carrier 2. Then, the printer aperture 406 is configured so that the operator can touch the white reference with his hand while the carrier is in the home position.

In accordance with the present embodiment, the exchanging position is near the location where the white reference 9 is installed. Therefore, the space that allows the operator to put in his fingers is sharable with the printer aperture used for the carrier operation in the first case. There is no need for making the printer aperture 406 unnecessarily larger, which contributes to preventing the rigidity of the housing of the information processing apparatus 400 from being lowered.

In the third case and fourth case, it is possible to conduct the required operations while the carrier 2 is in the home position. As described above, the printer aperture located near the home position of the carrier 2 is closed. Therefore, it is impossible to touch the entire part of the recording sheet 22 and the recordable area of the base 14, but it is still possible to touch most parts thereof for disposing the jammed recording sheet 22 or clean the base 14. In this case, the aperture is not necessarily formed as wide as the one adopted for use in the first and second cases. Therefore, it is possible to make its width narrower than the printer aperture in the exchanging position of the carrier, hence preventing the rigidity of the housing of the information processing apparatus 400 from being lowered.

Now, in conjunction with an electric circuit diagram, and a software flowchart, a description will be provided of items related to the recording operation among those operations of the information processing apparatus that uses a recording apparatus of the present embodiment.

Figure 31:
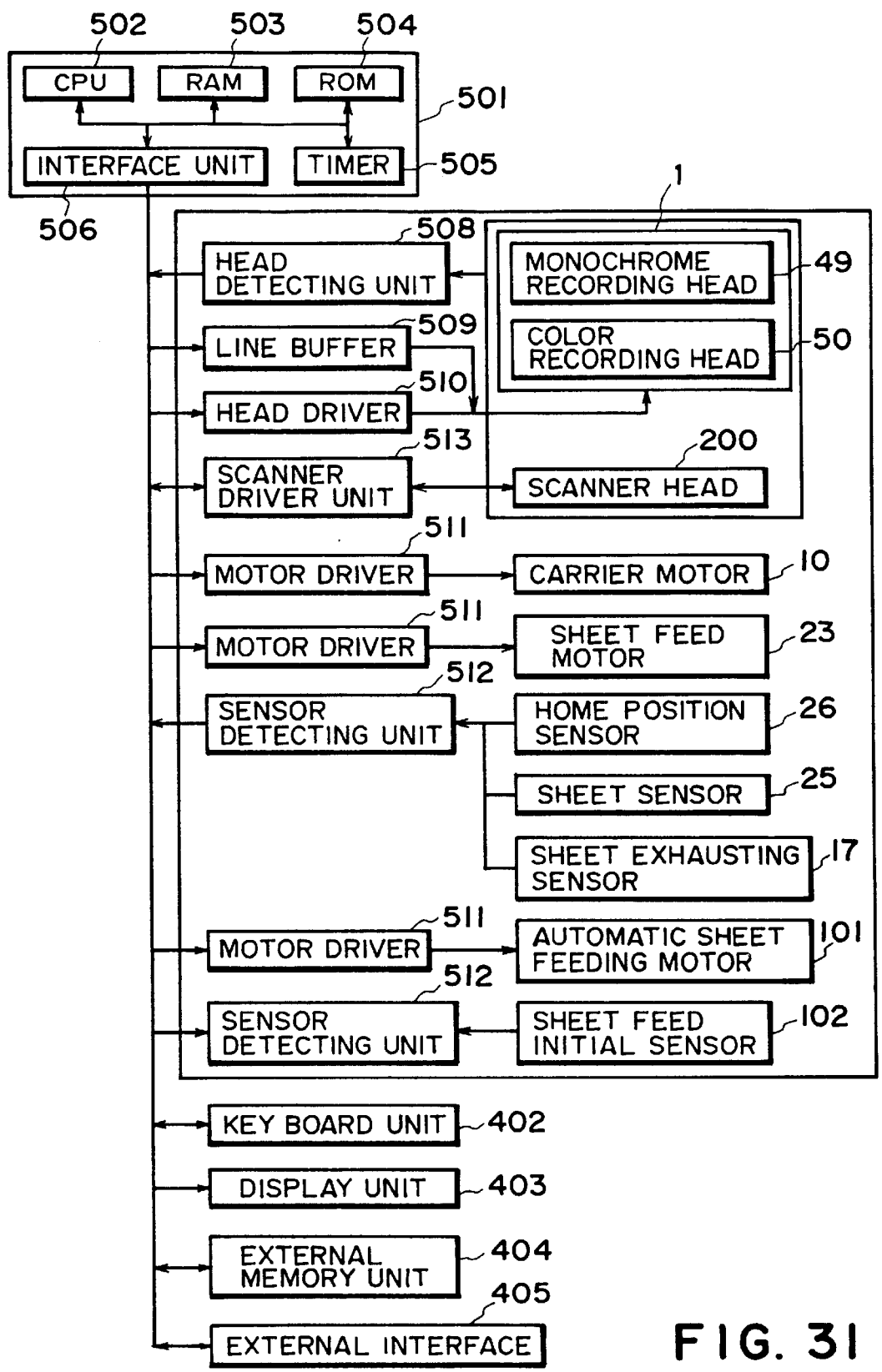
FIG. 31 is a block diagram which shows the structure of an electric circuit of an information processing apparatus incorporating therein one embodiment of an ink jet recording apparatus in accordance with the present invention.

FIG. 31 is a block diagram showing the electric circuit formation of the information processing apparatus related to the present embodiment. In FIG. 31, a reference numeral 501 designates a controller that performs the main controlling; 502 denotes a CPU that executes certain procedures in the mode of a micro-computer, for example; 503 denotes a RAM in which the developing area of text data and image data, and work area are provided; 504 denotes a ROM in which a program for the aforesaid procedures, the font data, and other fixed data are stored; 502 denotes a timer required for providing the execution cycle for the CPU 502, and generating timing for the recording operation of the printer unit 401; and 506 denotes an interface unit for connecting the signals from the CPU with the peripheral devices.

Also, a reference numeral 507 designates the controller of the printer unit 401; 508 denotes a head detection unit that detects the information of recording head, such as the output value of the sensor that detects the presence and absence, and the kinds of the recording head cartridge 1, and the temperature of the recording head cartridge 1, and the output and others of the sensor that detects the presence and absence of ink in the ink tank 8; 509 denotes the line buffer that accumulates recording data of the recording head cartridge 1; 510 denotes the head driver that transmits the recording signals and electric power to the recording head cartridge 1; 511*a*, 511*b*, and 511*c* denote a carrier motor 10, sheet feeding motor 23, and the motor driver that transmits the signals and electric power required for driving the automatic sheet feeding motor 101; and 512 denotes a sensor detection unit for detecting the sensor output of the sheet feeding initial sensor 102 and others. Further, a reference numeral 404 designates the external storage devices such as FDD, HDD, and RAM card; and 405 denotes the external interface required for communicating with other information processing apparatuses, and controlling the peripheral devices through the direct connection to the internal bus. In this respect, although not included in the block diagram shown in FIG: 23, there is a power-supply unit for supplying power to the electric circuit. For this unit, there is prepared a rechargeable battery, disposable dry cell or AC power-supply converter that is fixed on the information processing apparatus main body for use.

With the electric circuit described above, the recording unit performs recording on a recording sheet 22. Now, in conjunction with the flowchart shown in FIG. 32 and those to follow, a description will be provided of the outline of the control sequence of the recording operation.

Figure 19A:
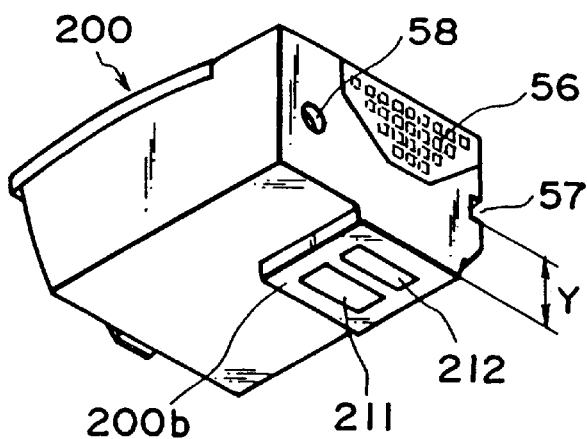
FIG. 19(A) is a perspective view which schematically shows the scanner head.
Figure 19B:
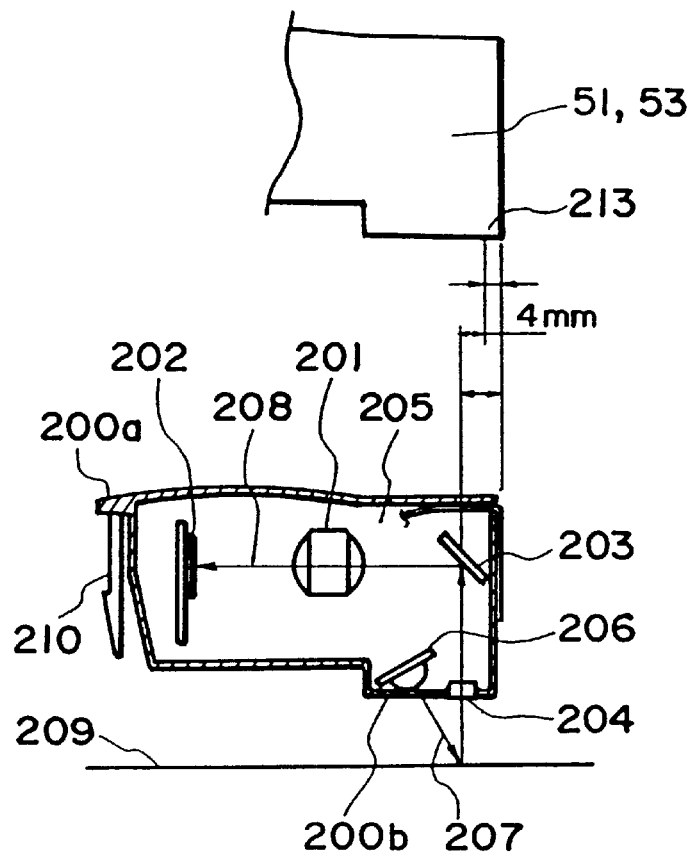
FIG. 19(B), a schematically cross-sectional view thereof.

FIG. 32 is a flowchart illustrating the processes at the time of turning on and off a recording apparatus or an information processing apparatus. In S1, the system is in the power-off condition. With the exception of a timer 505 (see FIG. 31), all the functions of the system are suspended. From the power-off condition, the operation begins when the power-on signal is given, that is, it begins when the power-supply switch is turned on. Thus, at first, the power-on process is executed for the recording apparatus in S2. When the process in S2 is completed, it proceeds to S3 where the power-supply is turned on. In this power-on state, recording and other operations are performed. If the power-off signal is detected in the power-on state, the process proceeds to S4 to execute the power-off process. When the process in S4 is completed, it returns to S1 where the system is the power-off condition. Therefore, at the time of turning on and off the power-supply, the system is in the power-supply on or off condition. Also, in S3, if the signal of temporary suspension is detected, the process proceeds to S5 to execute the temporary suspension. The temporary suspension signal is the one to be output by the sensor that detects the opening and closing of the indication unit 403 or the sensor and the like that detects the attachment and detachment of a battery, for example, when the operator acts as if he is in the non-operative state despite the fact that he is still in the operative state, such as when he folds the indication unit 403 shown in FIG. 19 over the key board unit 402 while the system is still in the power-on condition or he replaces the batteries. Also, the temporary suspension is the process to be executed for preventing the apparatus from being damaged or preventing any defects from occurring if any use is committed other than the fundamental ones. The details will be described later. In S5, when the temporary suspension process is completed, the process proceeds to S6 where the system is in the temporary suspension. In the state of the temporary suspension, the functions of the elements other than necessary are suspended or the system is in the power-off condition. In the state of the temporary suspension, if the releasing signal of the temporary suspension is detected, the process proceeds to S7 to release the temporary suspension. The temporary suspension releasing signal is the one that makes a pair with the temporary suspension signal described above, that is, the signal indicating that the apparatus is restored to the state that it is operative, such as the indication unit 403 changes from the closing state to the opening state or the battery which has been removed is now installed. Also, the temporary suspension releasing process is the one to restore the system to the condition before the temporary suspension is executed. All the details will be described later. In this way, even when the operator should open or close the indication unit 403 carelessly while the apparatus is in operation or attach or detach the battery to or from the apparatus, it is possible to restore the apparatus to the original state. In the S7, when the temporary suspension releasing process is completed, the process returns to S3 to be in the power-on condition. For the temporary suspension signal, it may be possible to select whether or not the temporary suspension process is executed at the time such signal is detected. For example, as a sheet handling should be carried out while the recording apparatus is in operation, it may be desirable to close the indication unit 403. In such case, the selection may be arranged so that the system of the apparatus is set to disable the temporary suspension process while the indication unit 403 is opened or closed.

Figure 33:
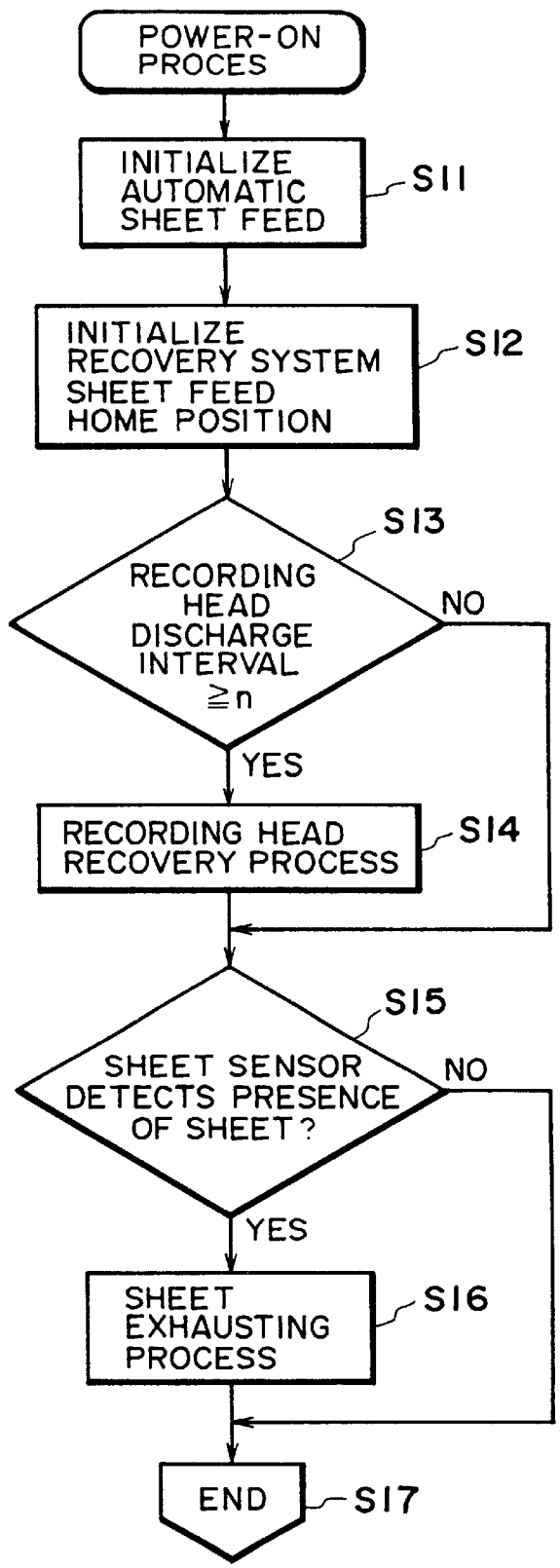
FIG. 33 is a flowchart which shows the on-off process of an information processing apparatus incorporating therein an ink jet recording apparatus in accordance with the present invention.

FIG. 33 is a flowchart to illustrate the power-on process in S2. At first, in S11, the automatic sheet feeder is initialized. The details are the same as described earlier.

Then, in S12, initialization is executed with respect to the recovery system, the sheet feeding, and the home position. More specifically, the sheet feeding motor 23 and carrier motor 10 are initialized for the recovery system. After that, the sheet feeding motor 23 is driven to remove the backlash of the sheet feed driving mechanism by rotating the sheet feeding motor 23 in the reverse direction and forward direction for a given driving amount, respectively. Then, the home position initialization is conducted to set the position of the carrier 203 definitely. More specifically, the carrier motor is driven to define the position where the output of the home position sensor 26 is switched over as a reference position, and then, the sheet feeding motor 23 and carrier motor 10 are driven to close the discharge ports of the recording head cartridge 1 by the cap 301, and keep the cartridge in the capping state.

Then, in S13, the time is measured by means of the timer 505 for the period from the last discharge of the recording head cartridge 1 or the last execution of suction to the preset, and the measured interval is more than a given period n, the process proceeds to S14 where the recovery process of the recording head is executed. If such interval is less than the given period, the process proceeds to S15. In the S14, the discharge to the interior of the cap 301 of the recording head cartridge 1, the cleaning of the discharge port unit of the recording head cartridge 1 by means of the blade 302, the ink suction from the recording head cartridge 1 by means of the pump unit, and some other operations are performed as the recovery process of the recording head cartridge 1. If the recording head cartridge 1 is not used and left intact for a long time, defective ink discharges may ensue because of the increased viscosity of ink brought about by the evaporation of ink in the discharge ports of the recording head cartridge 1. This condition can be prevented by means of the recovery process. The recovery process is completed in S14, and it is checked in S15 whether or not the sheet sensor detects the presence of the recording sheet. If affirmative, the process proceeds to S16. If negative, it proceeds to S17. In S16, the detected sheet is exhausted. In other words, after the sheet sensor detects the absence of the recording sheet, the sheet feeding motor 23 is driven for a given amount in the forward direction. Then, in S17, the power-on process is terminated.

Figure 34:
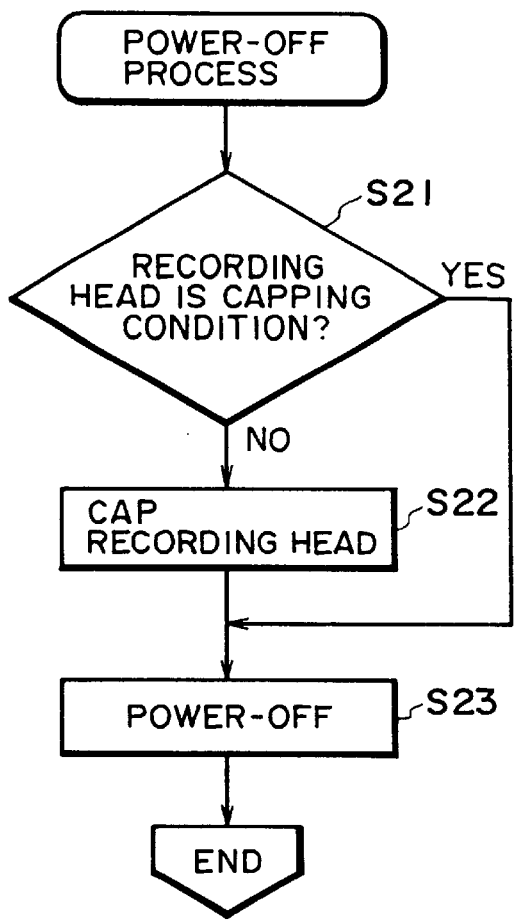
FIG. 34 is a flowchart which shows the on-off process of an information processing apparatus incorporating therein an ink jet recording apparatus in accordance with the present invention.

FIG. 34 is a flowchart illustrating the power-off process in S4. At first, in S21, it is examined whether or not the recording head cartridge 1 is in the capping state. If negative, the process proceeds to S22. If affirmative, it proceeds to S23. In the S22, the carrier motor 10 and sheet feeding motor 23 are driven to set the recording head cartridge 1 in the capping state. Then, in S23, the power-supply of the recording apparatus is turned off, thus suspending the functions thereof. By means of this process, it is arranged to prevent defective discharges from taking place due to the increased viscosity of ink brought about by its evaporation when the discharge port surface of the recording head cartridge 1 is exposed to the atmosphere, because the power-supply is turned off after the recording head cartridge 1 is reliably brought to the capping state even when the recording head cartridge 1 is not in the capping state at the moment, that is, the power-supply is turned off while recording is being executed in the similar condition.

Figure 35:
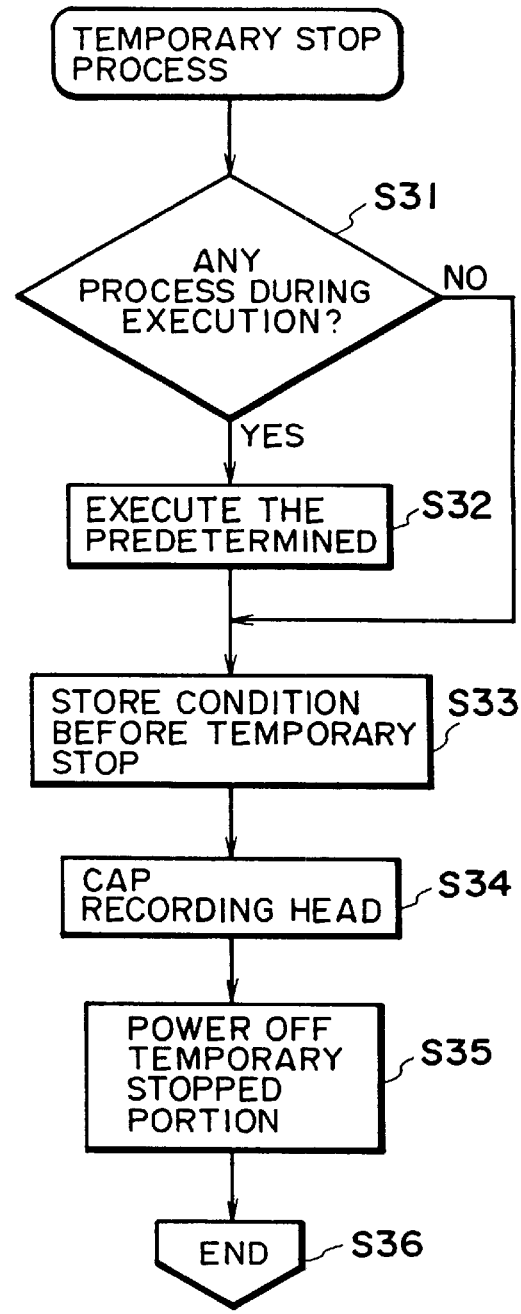
FIG. 35 is a flowchart which shows the halt process of an information processing apparatus incorporating therein an ink jet recording apparatus in accordance with the present invention.

FIG. 35 is a flowchart illustrating the temporary suspension process in S5. At first, in S31, it is checked whether or not there is any process currently being executed. If affirmative, the process proceeds to S32. If negative, it proceeds to S33. In the S32, the current process is executed for a given portion. More specifically, the processes are executed until the recording of the current line is completed if any recording is in execution or until the current sheet feeding or automatic sheet feeding is completed if such operation is in progress. Also, if the sheet exhausting process is in progress, this process is suspended immediately. Then, in S33, the current status is stored in the memory. In other words, if there is any process that has been suspended, the suspended state is stored in the memory. Likewise, the current status of indication unit 403, that of an operation panel (not shown), the statuses of on-line or off-line are stored or the status of saving mode is also stored if such mode is available for the power-supply from the battery. Then, in S34, the recording head cartridge 1 is brought to be in the capping state. If it is already in the capping state, no process will be executed at all. Then, in S35, the power-supply for any unnecessary parts is turned off in the temporary suspended condition. Then, in S36, the temporary suspension process in the S5 is terminated. In this process, even if the temporary suspension signal is detected while the recording is in execution, the capping of the recording head cartridge 1 is reliably performed to prevent the recording head cartridge 1 from being left intact without capping, thus avoiding any resultant defective discharges.

Figure 36:
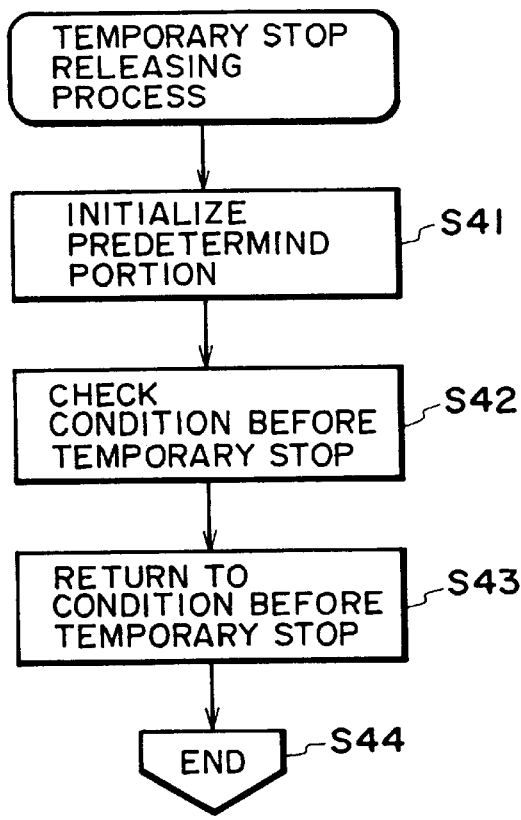
FIG. 36 is a flowchart which shows the halt releasing process of an information processing apparatus incorporating therein an ink jet recording apparatus in accordance with the present invention.

FIG. 36 is a flowchart illustrating the temporary suspension releasing process in S7. At first, in S41, the initialization is executed for given units. More specifically, as shown in S11 and S12, the position of the carrier 203 is defined, and backlash is removed for the sheet feeding motor 23, the initial position is set for the automatic sheet feeding mechanism, among others. Then in S42, the stored state prior to the temporary suspension is examined. Then, in S43, the process is executed to restore the current condition to the state prior to the execution of the temporary suspension process. More specifically, if there is any process that has been suspended, such process is completed to restore the states of the indication unit 403 and operation panel. Then, in S44, the temporary suspension releasing process is terminated. As a result, even if the process is temporarily suspended while the recording apparatus carrying it on, such process can be continued, as in the state prior to the temporary suspension, once it has been restored.

Figure 37:
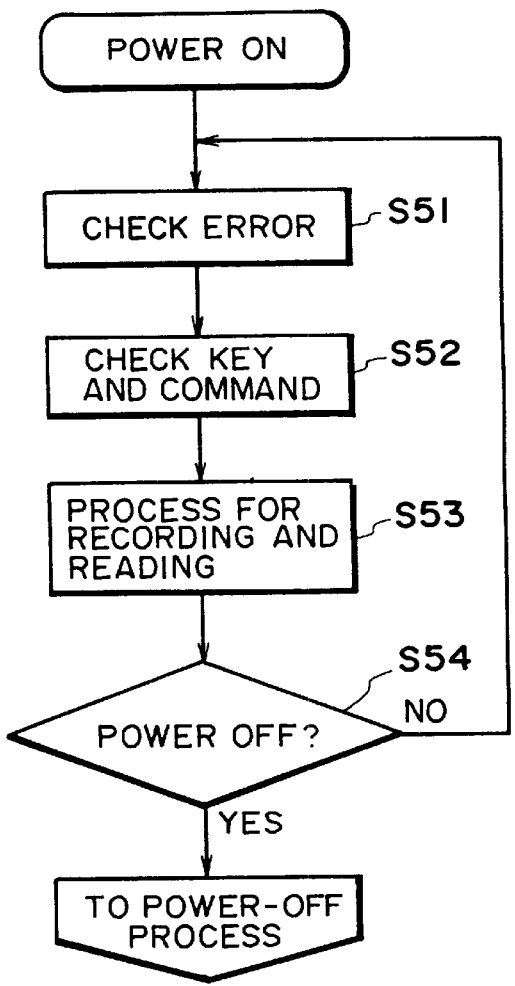
FIG. 37 is a flowchart which shows the power-on process of an information processing apparatus incorporating therein an ink jet recording apparatus in accordance with the present invention.

FIG. 37 is a flowchart illustrating the process in the power-on condition in S3.

At first, in S51, various errors are checked, and error process is executed. More specifically, if there is no recording sheet in the recording apparatus, there is no installation of the recording head cartridge 1 or in tank 8, no ink remains in the ink tank 8, a sheet jamming is detected, while a recording execution is in progress, the temperature of the recording head cartridge 1 rises abnormally, and scanning errors of each kind of motors are detected, for example. In each of such cases, an error message is displayed in the indication unit 403 or on the operation panel, or a warning buzzer is sounded. Then, in S52, any key operations and command reception signals from the key board 402, the operation panel, the external interface 405 and others are checked to execute each of the corresponding processes. More specifically, if the sheet feeding key is depressed, the sheet insertion, exhaustion, sheet feeding for a given amount, or the like is executed as the case may be. Also, if the on-line key is depressed or on-line and off-line commands are received, the error status is examined, and the on-line and off-line state processes are executed. Also, commands are received with respect to recording and others, the corresponding processes are executed. Further, if the key input is detected as to the exchanges of the recording head cartridges 1 or ink tanks 8 or if it is detected that no ink remains in the ink tank 8, the carrier motor 10 is driven to cause the carrier 203 to move to the location where such exchanges can be made easily, and then, when the exchange is completed, the carrier motor 10 and sheet feeding motor 23 are driven to cause the recording head 201 to move so that it is covered by the cap 301 for the execution of ink suction from the discharge ports of the recording head cartridge 1 by means of the pump unit.

When the ink tanks 8 are exchanged, the air may be intermingled in the ink path between the recording head cartridge 1 and the ink tank 8. However, it is possible to remove such intermingled air to the outside by sucking ink, and to prevent any defective discharge from taking place due to such air intermingled in the recording head cartridge 1. Then, in S53, the recording process is executed. The details will be described later. Then, in S54, the power-off signal is examined. If affirmative, the process proceeds to S4 where the power-off process is executed as described earlier. If negative, the process returns to the S51.

Figure 38:
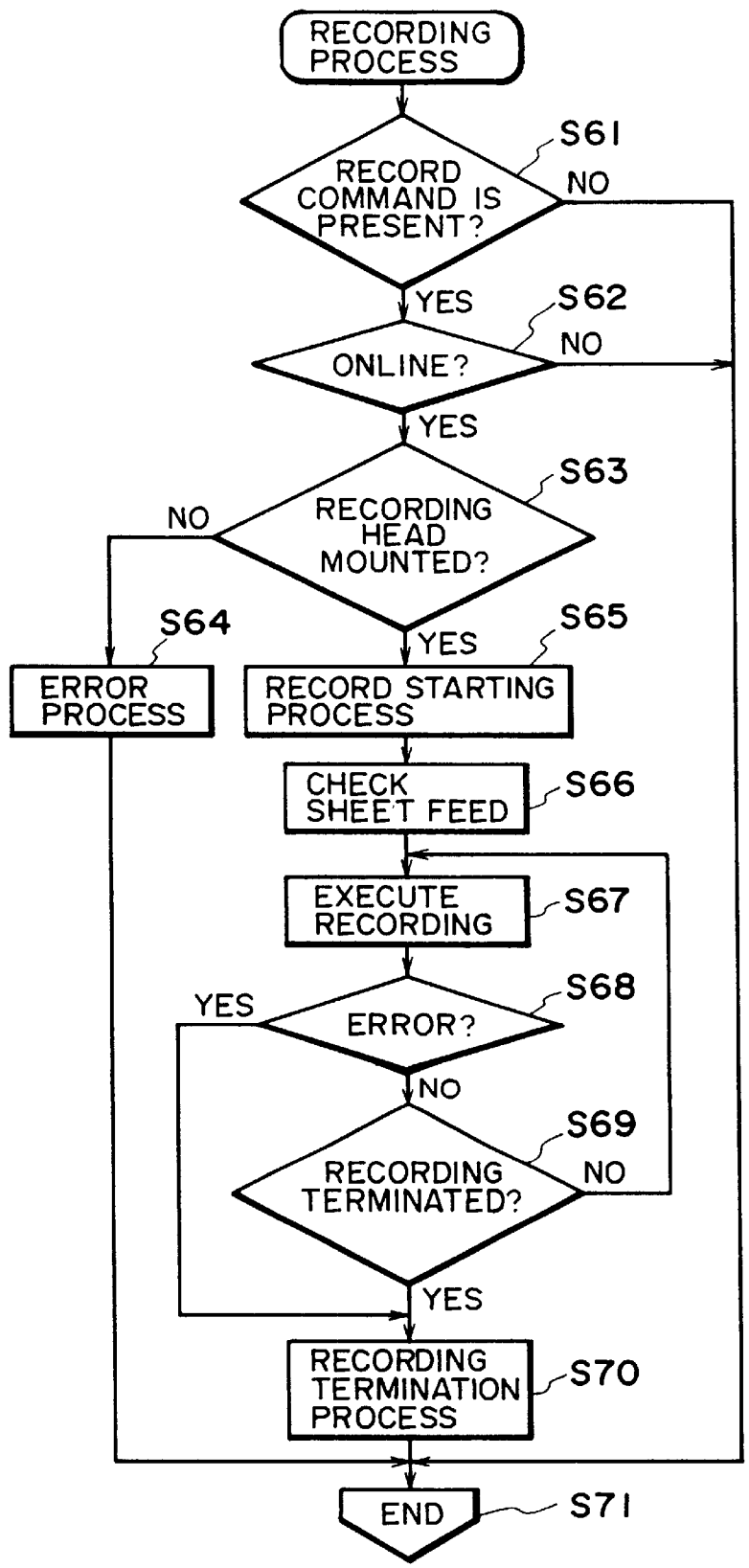
FIG. 38 is a flowchart which shows the recording process of an information processing apparatus incorporating therein an ink jet recording apparatus in accordance with the present invention.

FIG. 38 is a flowchart illustrating the recording process among those in S53. At first, in S61, it is examined if there is any command to request the execution of recording, such as a sheet feeding command, and also, the presence and absence of the data signals received for recording are examined. If affirmative, the process proceeds to S62. If negative, it proceeds to S71 where the current process is terminated. In S62, the on-line state is checked. If the on-line state is found, the process proceeds to S63. If the off-line state is found, it proceeds to S71 where the current process is terminated. In S63, it is examined if the recording head cartridge 1 is installed on the carrier 2. If affirmative, the process proceeds to S65. If negative, it proceeds to S64. In S64, an error message is displayed in the indication unit 403 or on the operation panel, or a warning buzzer is sounded. In S65, the process is executed to start recording. More specifically, the temperature of the recording head cartridge 1 is adjusted by means of heaters in the recording head cartridge 1, the discharge adjustment is made by discharging to the outside of the recording area of the recording head cartridge 1, the deviation amount of the carrier motor 10 at the time of forward and reverse scans measured by means of the home position sensor, and the misregistration in the bidirectional recording is corrected. Then, in S66, the sheet feeding is checked. If there is no sheet inserted in the recording position at the time of automatic sheet feeding mode, the automatic sheet feeder 101 is driven to execute sheet feeding. Then, in S67, recording is performed for the unit of one line. More specifically, the carrier motor 10 is driven, and ink is discharged by means of the recording head cartridge 1 to perform recording. When one-line recording is completed, the recording sheet is fed for a given amount, and then, the process proceeds to S68. In the S68, errors are checked. If there is no error, the process proceeds to S70. If not, it proceeds to S69. The error checking is to include the detection of the lower end of the recording sheet, the detection of a jammed sheet, the detection of the presence and absence of ink, and the examination of scanning errors of each motor. The detected errors are processed in the S51 described earlier. In the S69, the reception of a command indicating the completion of recording, such as the sheet exhaust command, is examined. If the recording is completed, the process proceeds to S70. If not, it returns to S67 to continue recording. In the S70, the process is executed to terminate recording. More specifically, the sheet exhaust, the capping of the recording head cartridge 1, and others are executed. Then, in S71, the recording process among those in S53 is terminated.

Figure 39:
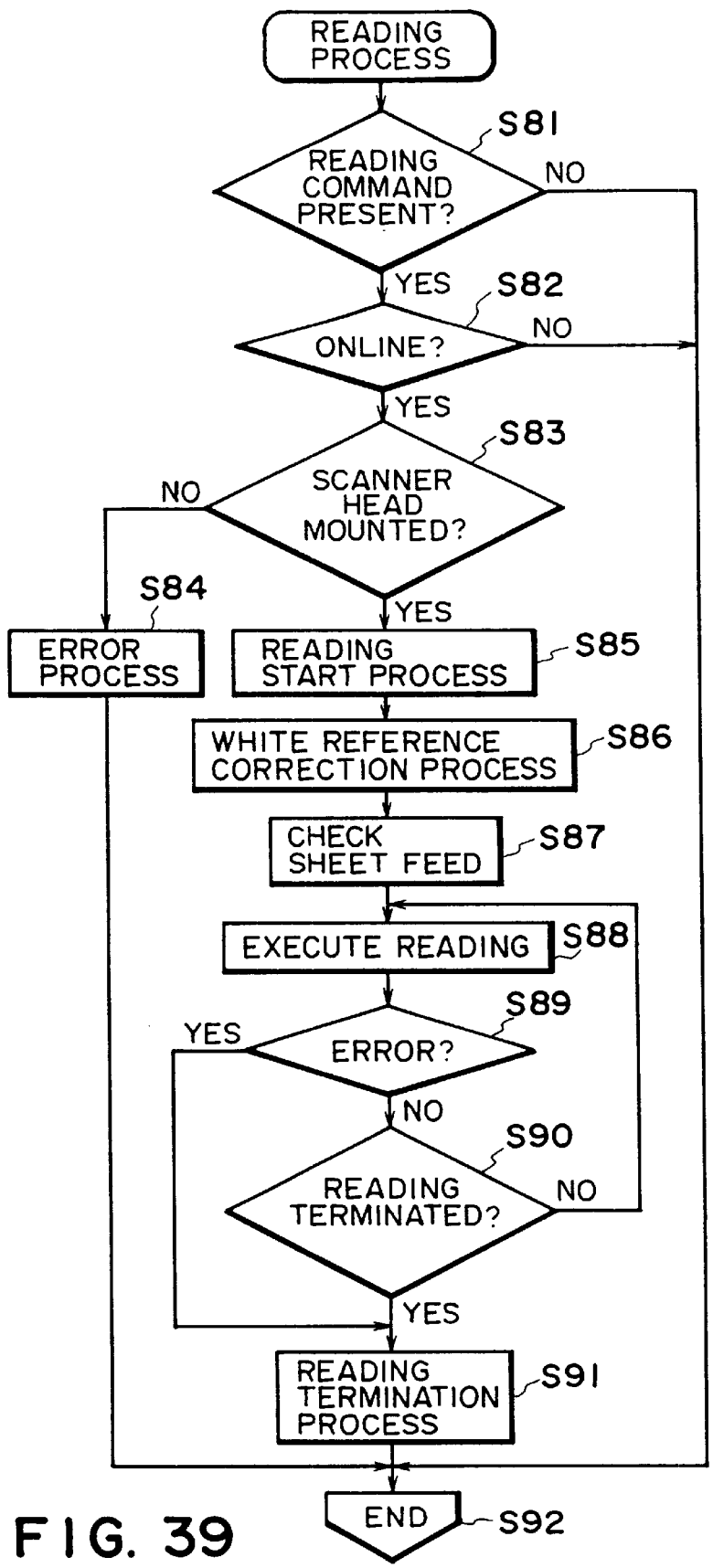
FIG. 39 is a flowchart which shows the reading process of an information processing apparatus incorporating therein an ink jet recording apparatus in accordance with the present invention.

FIG. 39 is a flowchart illustrating the reading process among those in S53. At first, in S81, it is examined if there is any command to request the execution of reading. For example, the presence and absence of a command is checked in order to start reading. If affirmative, the process proceeds to S82. If negative, it proceeds to S92 to terminate the current process. In S82, the on-line state is checked. If the state is on-line, the process proceeds to S92. If it is off-line, the current process is terminated in S92. In S83, the installation of the scanner head 200 on the carrier 2 is examined. If affirmative, the process proceeds to S85. If negative, it proceeds to S84. In S84, the error message is displayed on the indication unit 403 and operation panel or the warning buzzer is sounded. In S85, the process is executed to start reading. More specifically, the LED in the scanner head 200 is illuminated, the deviation amount of the carrier motor 10 at the time of forward and reverse scanning is measured by means of the home position sensor, and the misregistration in the bidirectional recording is corrected. In S86, the white reference correction process is executed. More specifically, the carrier motor 10 is driven to cause the reading unit of the scanner head 200 to move to the location where the white reference 9 is installed on the base 14, and then, the white reference 9 is scanned to read the white level. The level thus read is stored as a correction value for the levels to be read thereafter depending on the current level thus read out. In S87, the sheet feeding is checked. If there is no recording sheet inserted in the recording position in the automatic sheet feeding mode, the automatic sheet feeding motor 101 is driven to feed a recording sheet. Then, S88, the reading is executed per unit of one line. More specifically, the carrier motor is driven to cause the scanner head 200 to perform reading. When one-line reading is completed, the recording sheet is fed for a given amount, and then, the process proceeds to S89. In S89, errors are checked. If there is any error, the process. proceeds to S91. If no errors are detected, the process proceeds to S90. The error check is to include the detection of the lower end of the recording sheet, the detection of jammed sheet, and the detection of scanning errors of each motor. The detected errors are processed in the S51 as described earlier. In the S90, the reception of command to indicate the termination of reading, such as the sheet exhaust command, is examined. If the reading should be terminated, the process proceeds to S92. If not, it returns to the S88 to continue reading. In S91, the recording termination process is executed. More specifically, the recording sheet is exhausted, and the scanner head 200 is returned to the home position, among others. Then, in S92, the reading process among those in S53 is terminated.

Figure 40:
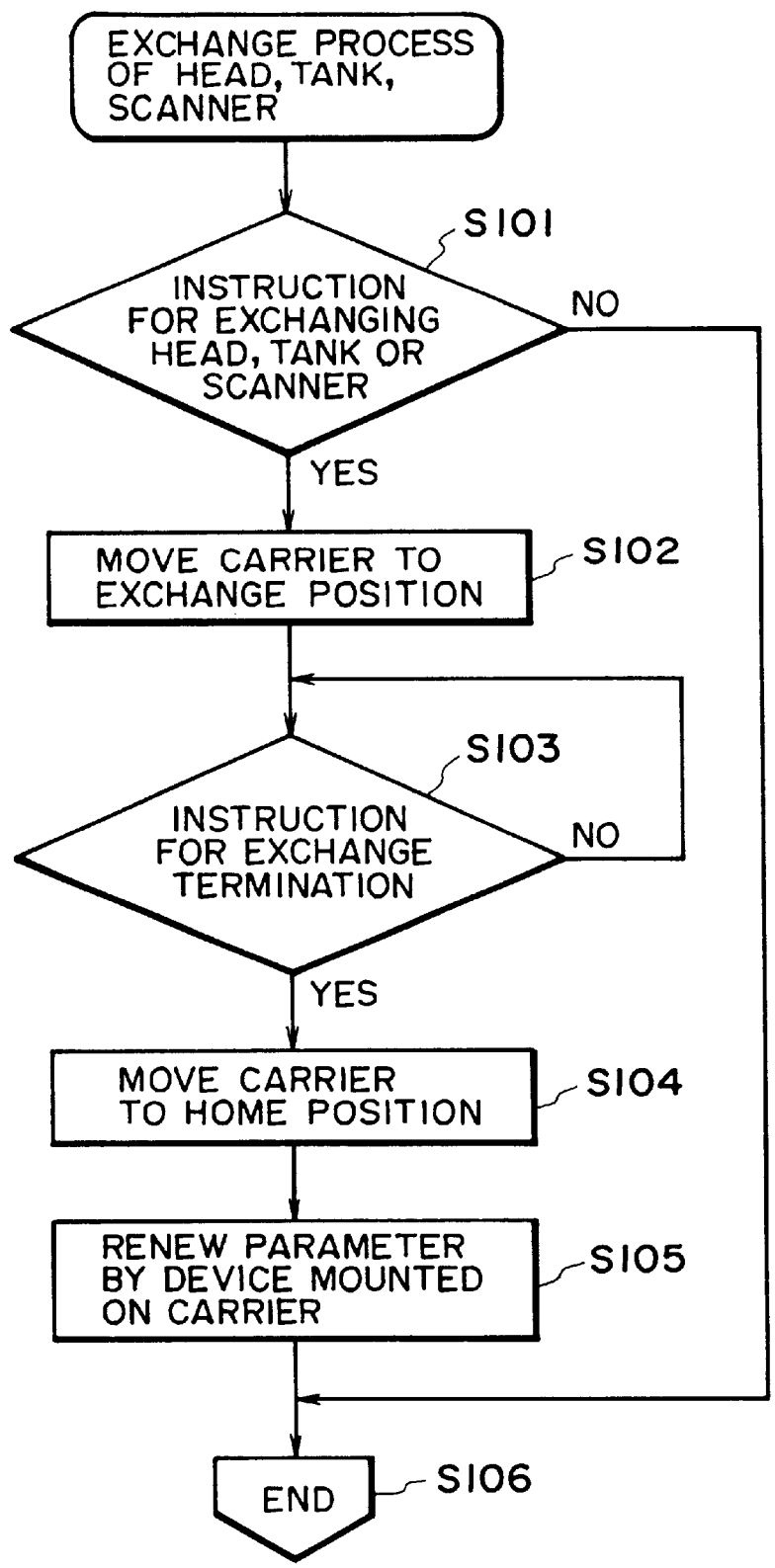
FIG. 40 is a flowchart which shows the head exchanging process of an information processing apparatus incorporating therein an ink jet recording apparatus in accordance with the present invention.

FIG. 40 is a flowchart illustrating the device exchange process for the carrier 2 to perform recording and reading in S53. This process is executed when an interrupt is called by an exchange key (not shown) provided for the key board unit 402, for example, while the recording apparatus is in the power-on state in S3. At first, in S101, it is determined whether or not there is any command to install the recording head cartridge 1, an ink tank 8, or scanner head 200 on the carrier 2 or to exchange them. If affirmative, the process proceeds to S102. If negative, it proceeds to S106 to terminate the current process. In the S102, if the carrier 2 is in the home position, the sheet feeding motor 23 is driven to release the fixation of the carrier 2, and then, to drive the carrier motor 10 to cause the carrier 2 to move to a given exchanging position. In the exchanging position, the operator exchanges the monochromatic recording head cartridges 51 or the color recording head cartridges 53, or the ink tank 8 having no ink remaining in it with another ink tank 8 or exchanges the recording head with the scanner head to execute reading, among other operations. Then, in S103, when the exchange completion key is depressed or a given period of time elapses, it is determined whether or not there is any command indicating the exchange completion. If affirmative, the process proceeds to S104. If negative it returns to S103 to be on standby until such command is given. In S104, the carrier motor 10 is driven to cause the carrier 2 to move to the home position. Then, in S105, the recording head cartridge 1, scanner head 200, or other device that has been installed newly on the carrier 2 is detected in accordance with its kind. Then, the process is executed to set parameters needed for use of each of the devices in the RAM 503 through the interface unit 506. At this juncture, the locations of the home position are changed depending on whether the scanner head 200 is installed on the carrier 2 or the recording head cartridge 1 is installed on it. When the scanner head 200 is installed, the home position is set in the location closer to the recovery unit (blade and cap) side than the carrier position at the time of the recording head cartridge 1 being installed. In accordance with the present embodiment, the line segment 214 shown in FIG. 2 represents the standard stopping position of the carrier 2 when the scanner head 200 is installed on it. Then, in S106, the exchanging process for the carrier 2 is terminated.

As described above, the present embodiment is simply structured to make the distance from one face of the recording sheet to the reading unit of the scanner head greater than the distance from one face of the recording sheet to the discharge port surface of the recording head cartridge so that the position of the reading portion surface of the scanner head is set further away from the discharge port surface of the recording head with respect to the recording sheet feeding path. Hence, there is no need for the provision of any circuit for discriminating one head from another. Also, even when the scanner head is installed, there is no need for any consideration that should be given especially its control. Further, if the user erroneously installs a recording head in place of a scanner head, there is no possibility that the scanner head is stained. Therefore, it is possible to provide a small and light recording apparatus having a high reliability at lower costs.

Also, the present embodiment is an ink jet recording apparatus structured by providing an optical image reading means to be exchanged with the recording means of the ink jet recording apparatus or installing it in on the carrier, and at least two white references are arranged each in and out of the printing area of recording means installed on the carrier, respectively and separately, thus making it possible to discriminate the contaminated conditions of the two white references due to printing.

Moreover, the present embodiment is a recording apparatus in which the white reference capable of being read by a scanner head is arranged within the scanning range of the carrier on the side opposite to the home position where the ink discharge ports of the recording head cartridge are capped, and in the vicinity of such white reference, the exchanging position is set for the recording head cartridge or scanner head to be removed from the carrier or installed on it. In this way, an aperture for operating the attachment or detachment of the recording head cartridge or scanner head to or from the carrier, and an aperture for cleaning the white reference are arranged to be sharable with each other. Hence, there is no need for the provisions of the individual apertures for cleaning the white reference and carrying out the exchange operations as in the prior art, making it possible to reduce the number of the apertures and to demonstrate an effect that a recording apparatus is provided with its housing whose rigidity is made higher.

What is claimed is:

1. An ink jet recording apparatus of a serial type provided with a carrier detachably installing a recording head cartridge and a scanner head to cause them to travel selectively for recording on a recording medium when said recording head cartridge is installed, and reading a source document being fed in the same sheet path as said recording medium when said scanner head is installed, wherein the gap between a source document and the closest part of said scanner head to said source document is larger than the gap between a recording medium and the closest part of said recording head cartridge to said recording medium.

2. An ink jet recording apparatus according to claim 1, wherein said apparatus is provided with a cap formed by an elastic material to airtightly close the discharge port surface of said recording head cartridge.

3. An ink jet recording apparatus according to claim 1, wherein said apparatus is provided with a blade formed by an elastic material to wipe the discharge port surface of said recording head cartridge.

4. An ink jet recording apparatus according to claim 1, wherein said apparatus is provided with a cap formed by an elastic material to airtightly cover the discharge port surface of said recording head cartridge, and a blade formed by an elastic material to wipe the discharge port surface of said recording head cartridge.

5. An ink jet recording apparatus according to claim 4, wherein the difference in said distance is the difference in the distance enabling said cap or said blade or said cap and said blade to be in contact with the discharge port surface of said recording head cartridge, while neither said cap nor said blade being allowed to be in contact with the surface of said scanner head facing said source document.

6. An ink jet recording apparatus according to claim 1, wherein the gap is a difference between a dimension from a positioning standard of the recording head cartridge with respect to the carrier to a discharge port surface, and a dimension from a positioning standard of the scanner head with respect to the carrier to a surface of the scanner head facing the source document.

7. An ink jet recording apparatus according to claim 6, wherein the respective positioning standards of the recording head cartridge and the scanner head of the carrier are the same.

* * * * *

UNITED STATES PATENT AND TRADEMARK OFFICE
CERTIFICATE OF CORRECTION

PATENT NO.   : 6,342,956 B1
DATED        : January 29, 2002
INVENTOR(S)  : Koh Hasegawa et al.

It is certified that error appears in the above-identified patent and that said Letters Patent is hereby corrected as shown below:

Drawings,
Sheet 38, FIG. 43, "SWITCING" should read -- SWITCHING --.

Column 17,
Line 10, "602" should read -- 601 --; and
Line 23, "It if" should read -- If it --.

Column 26,
Line 37, "cycle" should read -- one-cycle --.

Column 28,
Line 56, "rotation." should read -- rotation.
      Then, in S223, it is again determined whether or not the driving is for the first rotation. However, if it is the fourth rotational driving this time, the process proceeds to S224. In the fourth rotational driving, the ON detection of the sheet sensor is conducted in the location where the automatic sheet feeding motor is driven for 470 steps from the home position. --; and
Lines 57-59, "detection of the sheet sensor is conducted in the location where the automatic sheet feeding motor is driven for 470 steps from the home position." should be deleted.

Signed and Sealed this

Twenty-seventh Day of August, 2002

Attest:

*Attesting Officer*

JAMES E. ROGAN
*Director of the United States Patent and Trademark Office*